(12) United States Patent
Nishida et al.

(10) Patent No.: US 12,390,989 B2
(45) Date of Patent: Aug. 19, 2025

(54) METHODS AND APPARATUSES FOR HOLLOW AND MULTI-MATERIAL STEREOLITHOGRAPHY

(71) Applicant: University of Florida Research Foundation, Incorporated, Gainesville, FL (US)

(72) Inventors: Toshikazu Nishida, Gainesville, FL (US); Aftab Bhanvadia, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 109 days.

(21) Appl. No.: 18/167,194

(22) Filed: Feb. 10, 2023

(65) Prior Publication Data
US 2023/0256668 A1 Aug. 17, 2023

Related U.S. Application Data

(60) Provisional application No. 63/309,479, filed on Feb. 11, 2022.

(51) Int. Cl.
*B29C 64/135* (2017.01)
*B29C 64/40* (2017.01)
(Continued)

(52) U.S. Cl.
CPC ............ *B29C 64/135* (2017.08); *B29C 64/40* (2017.08); *B33Y 10/00* (2014.12); *B33Y 40/20* (2020.01);
(Continued)

(58) Field of Classification Search
CPC ............ B29K 2101/00; B29K 2867/06; B29C 64/40; B29C 64/124–135; B29C 64/218
See application file for complete search history.

(56) References Cited

U.S. PATENT DOCUMENTS

2012/0195994 A1* 8/2012 El-Siblani ............. B29C 64/357
15/320
2017/0106594 A1* 4/2017 Gardiner ............... B29C 64/124
(Continued)

FOREIGN PATENT DOCUMENTS

CN        111231321 A   *  6/2020

OTHER PUBLICATIONS

English translation of CN-111231321-A by EPO. (Year: 2020).*
(Continued)

*Primary Examiner* — Xiao S Zhao
*Assistant Examiner* — Inja Song
(74) *Attorney, Agent, or Firm* — ALSTON & BIRD LLP

(57) ABSTRACT

Described herein are stereolithographic methods for preparing 3D objects comprising hollow regions and/or multiple materials. In certain embodiments, the methods comprise applying a blocking composition to fill hollow regions in the 3D printed object. In certain embodiments, an absorbent is applied to dispense material into the 3D printed objects and to remove unwanted resin from the hollow regions. Additionally, in certain embodiments, the modular stereolithographic apparatuses described herein contain an invertible, double vat, which enables users easy access to multiple materials throughout the 3D printing process.

22 Claims, 54 Drawing Sheets

(51) Int. Cl.
  *B29K 101/00* (2006.01)
  *B33Y 10/00* (2015.01)
  *B33Y 40/20* (2020.01)
  *B33Y 50/02* (2015.01)
  *B33Y 70/10* (2020.01)
  *B33Y 80/00* (2015.01)

(52) U.S. Cl.
  CPC .............. *B33Y 50/02* (2014.12); *B33Y 70/10* (2020.01); *B33Y 80/00* (2014.12); *B29K 2101/00* (2013.01); *B29K 2867/06* (2013.01)

(56) References Cited

U.S. PATENT DOCUMENTS

| | | | | |
|---|---|---|---|---|
| 2017/0182708 A1* | 6/2017 | Lin | .......................... | B29C 64/35 |
| 2018/0326416 A1* | 11/2018 | Buttner | .............. | B29C 71/0009 |
| 2018/0361666 A1* | 12/2018 | Adzima | .............. | B29C 35/0888 |
| 2019/0111616 A1* | 4/2019 | Watanabe | .............. | B33Y 10/00 |
| 2021/0016497 A1* | 1/2021 | Measor | ................. | B33Y 80/00 |
| 2022/0106478 A1* | 4/2022 | Sugimoto | .............. | B33Y 70/00 |

OTHER PUBLICATIONS

Grigoryan, Bagrat et al. "Development, Characterization, and Applications of Multi-Material Stereolighography Bioprinting," *Scientific Reports*, vol. 11, No. 1:3171, (13 pages), Dec. 2011, DOI: 10.1038/s41598-021-82102-w.

Kowsari, Kavin et al. "High-Efficiency High-Resolution Multimaterial Fabrication for Digital Light Processing-Based Three-Dimensional Printing," *3D Printing and Additive Manufacturing*, vol. 5, No. 3, pp. 185-193, Sep. 2018, DOI: 10.1089/3dp.2018.0004.

Jin, Jie et al. "Highly Removable Water Support for Stereolithography." *Journal of Manufacturing Processes*, vol. 28, Part 3, pp. 541-549, Aug. 1, 2017, 45th SME North American Manufacturing Research Conference, NAMRC 45, LA, USA, DOI: 10.1016/j.jmapro.2017.04.023.

* cited by examiner

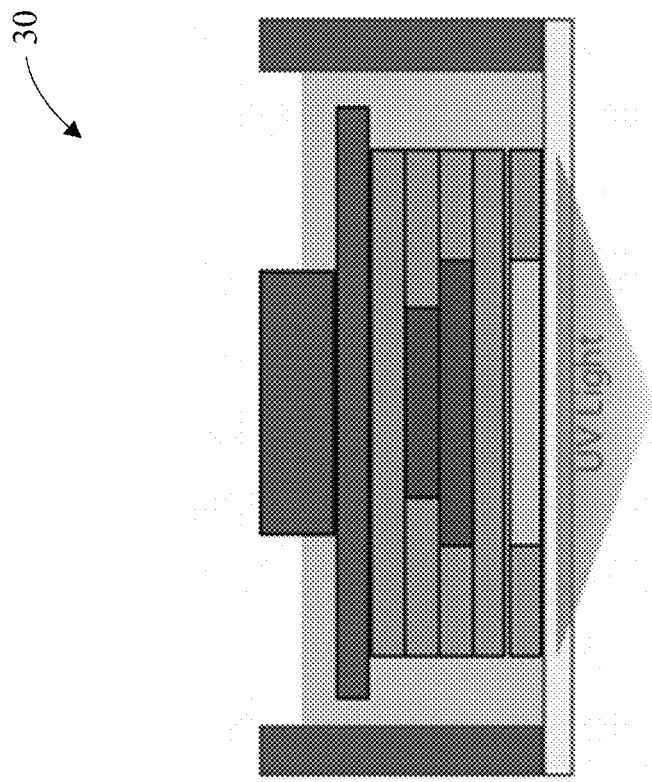
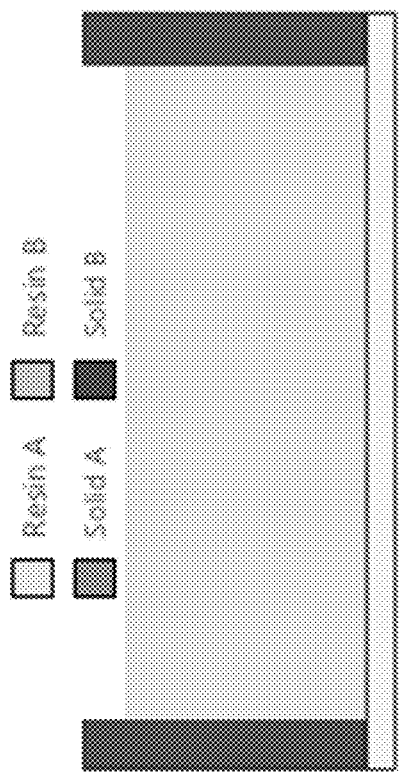
Fig. 3A
Fig. 3B

Cross-sectional view of the CAD model
W = Channel width, H = Channel height, L = Channel length, C = Capping height

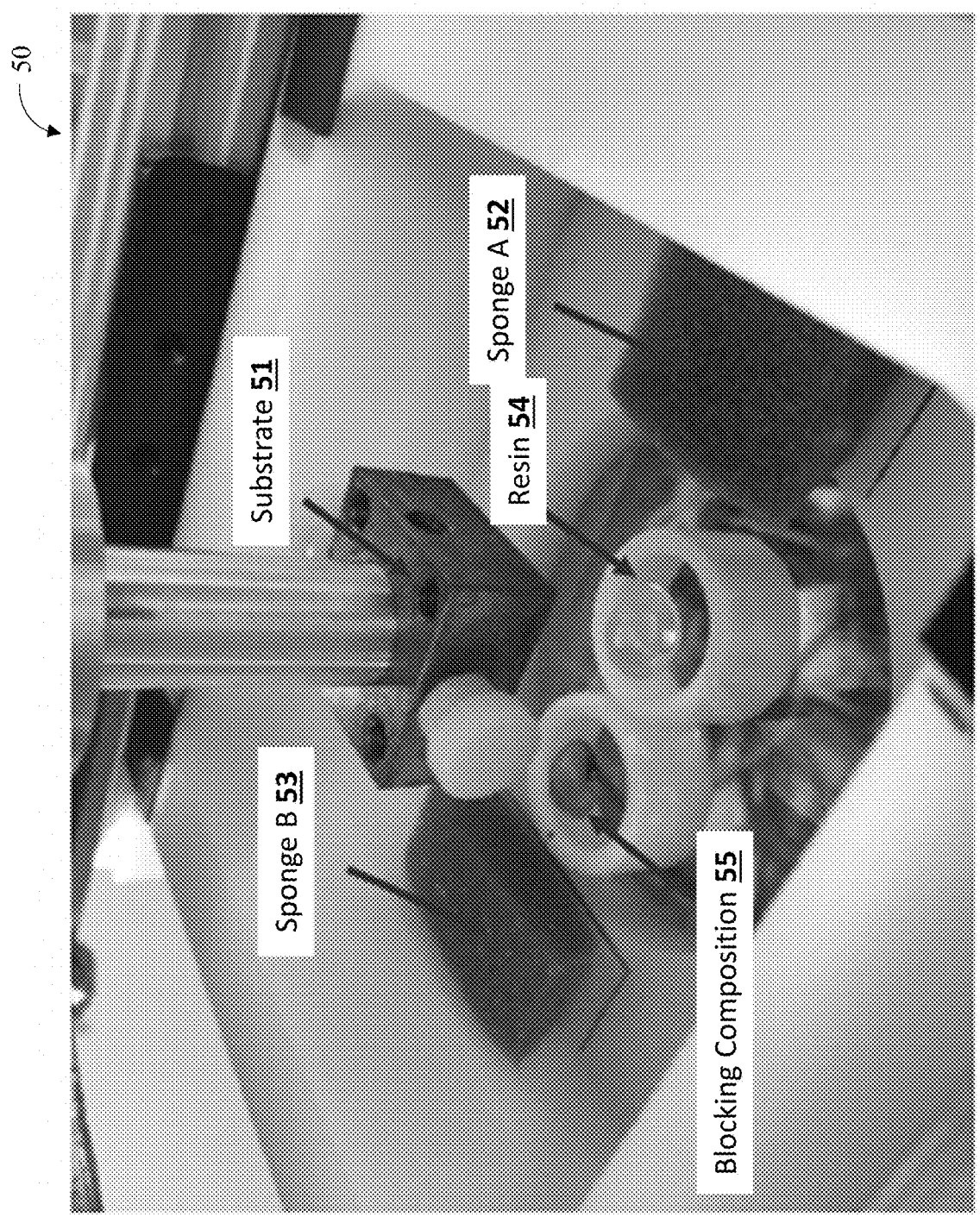

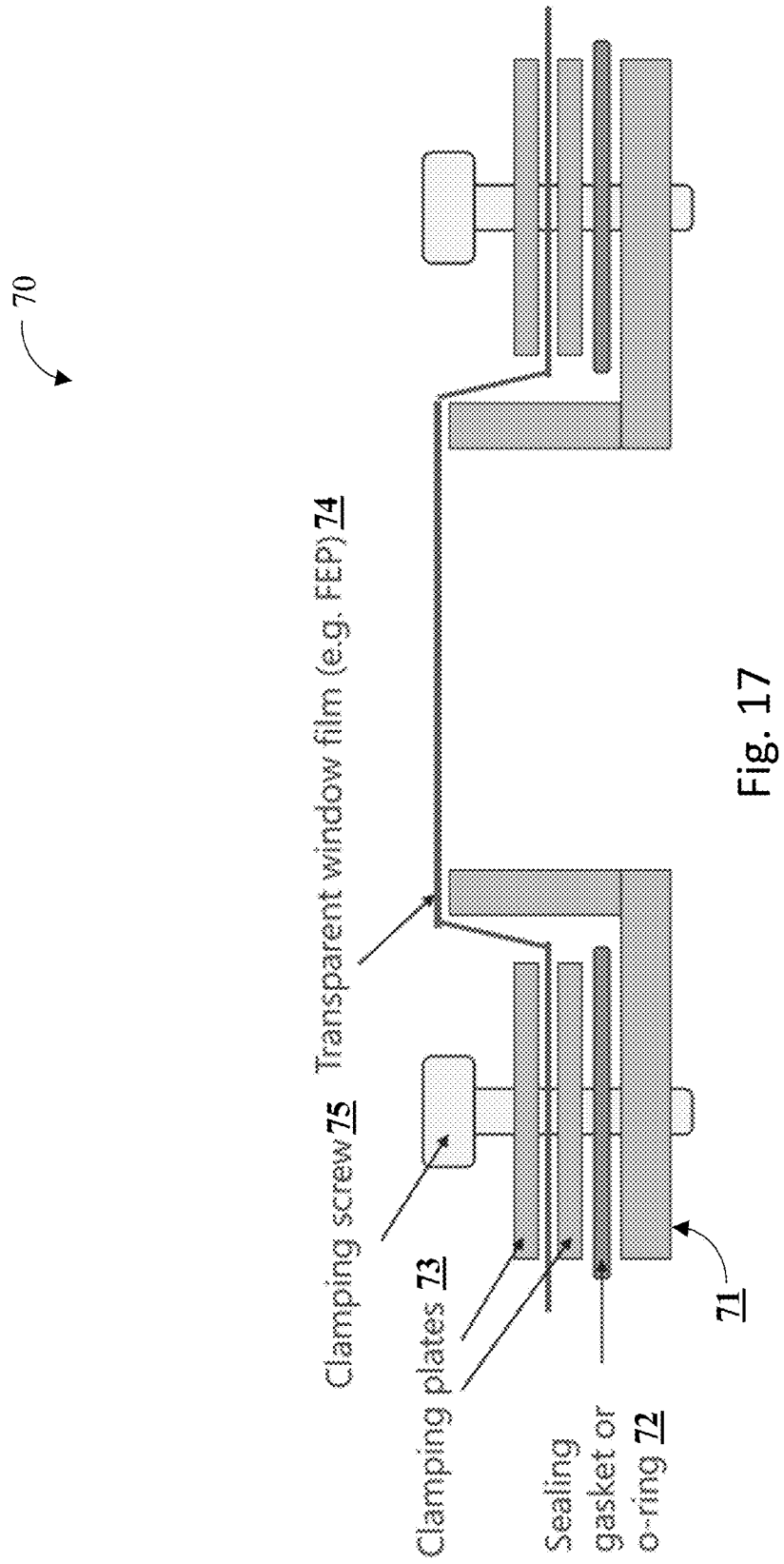

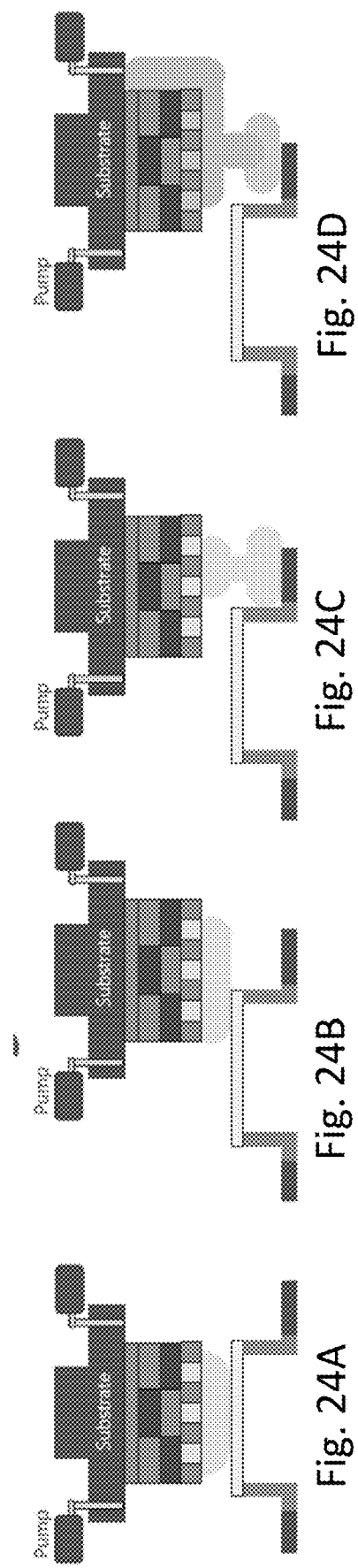

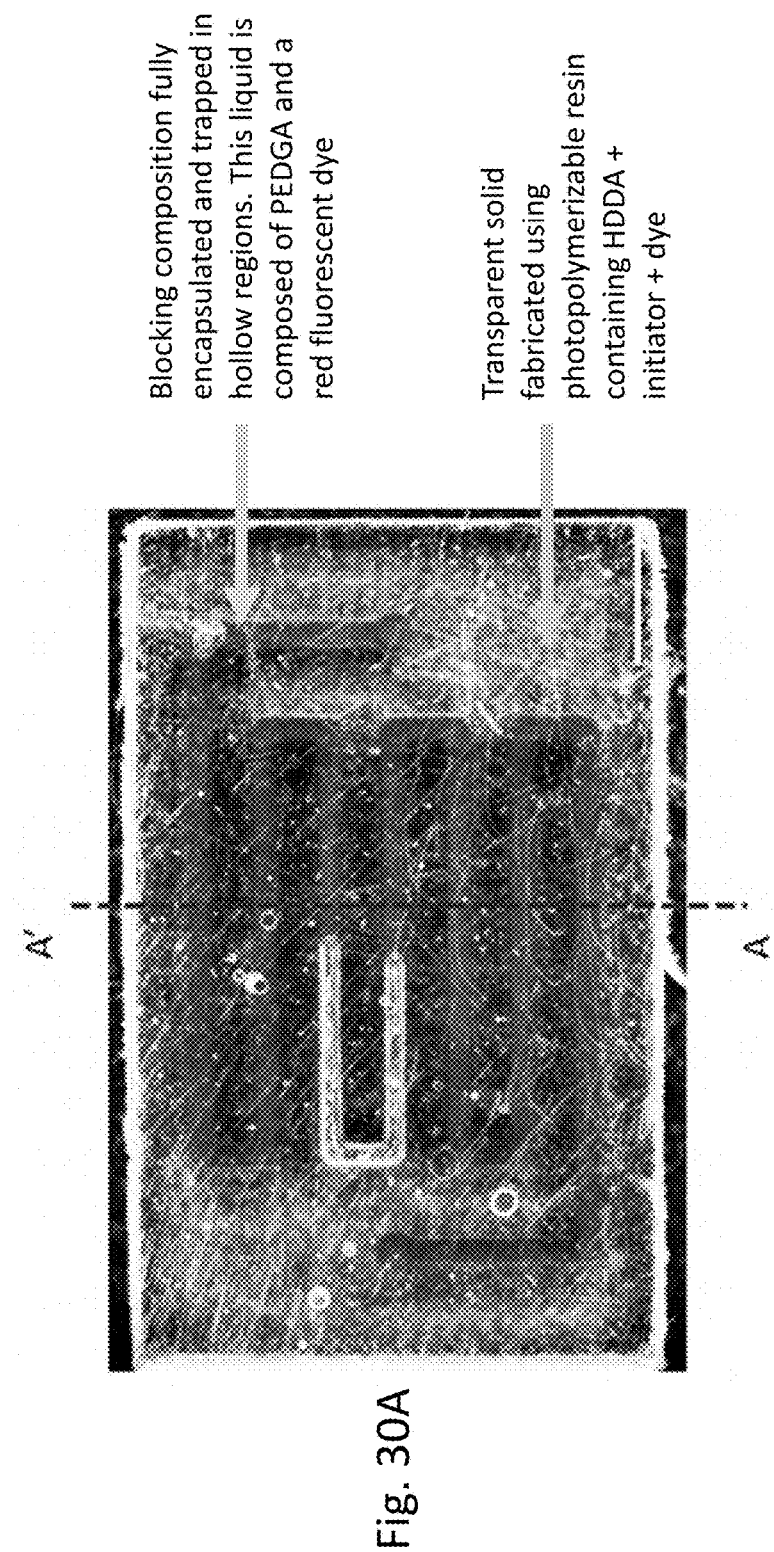
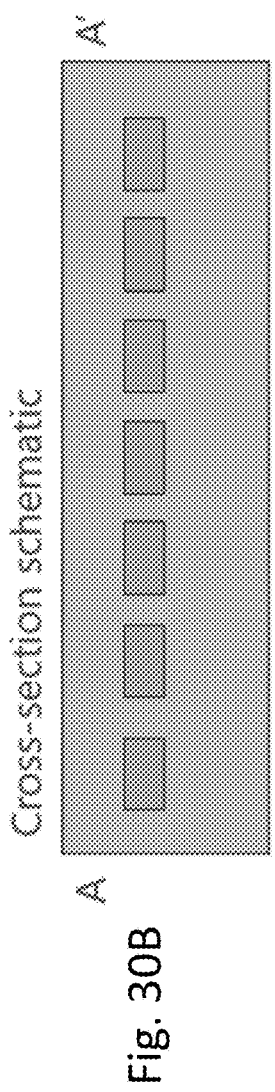
Fig. 30A
Blocking composition fully encapsulated and trapped in hollow regions. This liquid is composed of PEDGA and a red fluorescent dye
Transparent solid fabricated using photopolymerizable resin containing HDDA + initiator + dye
Fig. 30B
Cross-section schematic

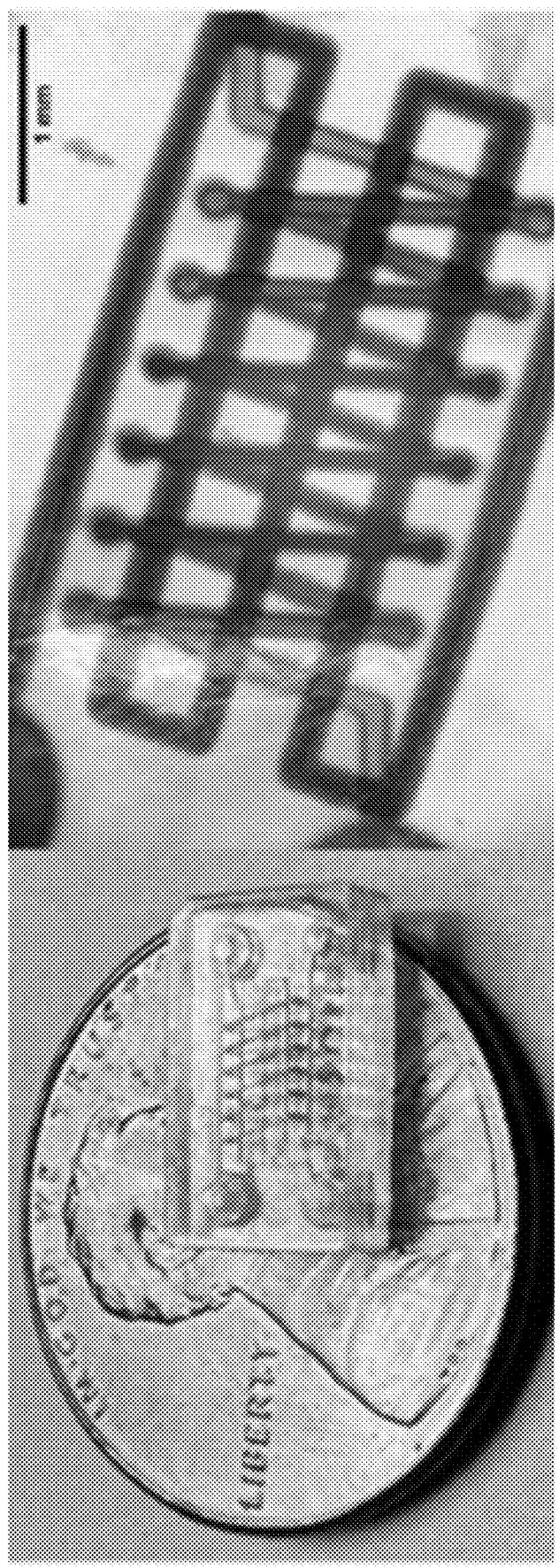

METHODS AND APPARATUSES FOR HOLLOW AND MULTI-MATERIAL STEREOLITHOGRAPHY

CROSS-REFERENCE TO RELATED APPLICATIONS

The present application claims the benefit of priority to U.S. Provisional Application Ser. No. 63/309,479, filed Feb. 11, 2022 and entitled "Methods and Apparatuses for Hollow and Multi-Material Stereolithography," the entire disclosures of each of which are hereby incorporated herein by reference in their entireties for all purposes.

GOVERNMENT SUPPORT

This invention was made with government support under Grant IIP-1939009, awarded by the Multi-functional Integrated System Technology (MIST) Center of the National Science Foundation. The government has certain rights in the invention.

FIELD

The presently disclosed subject matter relates generally to stereolithographic methods for preparing 3D objects, wherein the 3D objects in certain embodiments contain hollow regions or a composition comprising more than one type of material.

BACKGROUND

Stereolithography is a 3D printing or additive manufacturing technique in which optical radiation is used to photopolymerize suitable raw material to produce a desired object. The raw material comes to the process in the form of a resin. A vat is used to hold an amount of resin, and a build platform is moved in the vertical direction so that the object to be produced grows layer by layer onto a build surface of the build platform. The optical radiation used for photopolymerizing may come from above the vat, in which case the build platform moves downwards through the remaining resin as the manufacturing proceeds.

While 3D printing has developed over the years and proved valuable in many fields, ranging from biomedical engineering to aerospace applications, preparing useful objects with hollow regions or with multi-material compositions, for example, has presented several challenges. Indeed, issues such as material failure can proceed while attempting to print 3D objects with hollow regions. Further, preparing multi-material objects comprising materials with varying physical properties has presented additional difficulties. What is needed in the art are facile and efficient methods for preparing 3D objects with hollow regions and/or with multiple compositions. The subject matter described herein meets this need.

BRIEF SUMMARY

In one aspect, the presently disclosed subject matter is directed to a stereolithographic method for preparing a 3D object having one or more hollow regions, comprising:
  preparing one or more layers of cured polymer by exposing a first resin to UV light;
  wherein the one of more layers are prepared having one or more trenches;
  filling the one or more trenches with a blocking composition to form one or more blocking composition-filled trenches;
  contacting the surface of the blocking composition of the one or more blocking composition-filled trenches with a second resin;
  exposing the second resin to UV light to prepare a first cured polymer capping layer, wherein the first cured polymer capping layer encapsulates the one or more blocking composition-filled trenches; and
  removing the blocking composition;
  wherein a 3D object having one or more hollow regions is prepared.

In another aspect, the presently disclosed subject matter is directed to a stereolithographic method for preparing a multi-material 3D object, comprising:
  preparing one or more layers of cured polymer by exposing a first resin to UV light;
  wherein the one of more layers are prepared having one or more trenches;
  filling the one or more trenches with a blocking composition to form one or more blocking composition-filled trenches;
  wherein the filling the one or more trenches with a blocking composition to form one or more blocking composition-filled trenches comprises contacting the one or more trenches with a blocking composition-infused absorbent, wherein blocking composition is extracted from the absorbent and inserted into the one or more trenches;
  contacting the surface of the blocking composition of the one or more blocking composition-filled trenches with a second resin; and
  exposing the second resin to UV light to prepare a first cured polymer capping layer, wherein the first cured polymer capping layer encapsulates the one or more blocking composition-filled trenches;
  wherein the blocking composition is different from the first resin and the second resin;
  and wherein a multi-material 3D object is prepared.

In another aspect, the presently disclosed subject matter is directed to a stereolithographic method for preparing a 3D object having one or more hollow regions, comprising:
  preparing one or more layers of cured polymer by exposing a first resin to UV light;
  wherein the one of more layers are prepared having one or more trenches;
  contacting the one or more trenches with an absorbent to remove remnant first resin;
  contacting the one or more trenches with a second resin; and
  exposing the second resin to UV light to prepare a first cured polymer capping layer, wherein the first cured polymer capping layer encapsulates the one or more trenches;
  wherein a 3D object having one or more hollow regions is prepared.

In another aspect, the subject matter described herein is directed to a method for dispensing or sourcing a resin in preparing a 3D object by stereolithographic means, comprising:
  i) contacting a resin-infused absorbent with a semi-prepared 3D solid polymer object part, wherein resin is released from the resin-infused absorbent to form a resin coating on a surface of the semi-prepared 3D solid polymer object part;

ii) applying UV light to the resin coating, wherein the UV light solidifies the resin coating to prepare an additional polymer layer on the semi-prepared 3D solid polymer object part;
wherein i) and ii) are carried out one or more times to prepare a 3D object.

In another aspect, the subject matter described herein is directed to a modular stereolithography apparatus, comprising:
a substrate; and
a central vat, wherein the central vat comprises two or more invertible sub-vats;
wherein each of the invertible sub-vats can independently be inverted to form a raised surface or upright to remain a vat.

In another aspect, the subject matter described herein is directed to a stereolithographic method for preparing a multi-material 3D object, comprising:
preparing one or more layers of cured polymer by exposing a first resin to UV light;
wherein the one of more layers are prepared having one or more trenches;
filling the one or more trenches with a blocking composition to form one or more blocking composition-filled trenches;
contacting the surface of the blocking composition of the one or more blocking composition-filled trenches with a second resin;
exposing the second resin to UV light to prepare a first cured polymer capping layer, wherein the first cured polymer capping layer encapsulates the one or more blocking composition-filled trenches;
wherein the blocking composition is different from the first resin and the second resin;
wherein the blocking composition does not undergo polymerization; and
wherein a multi-material 3D object is prepared.

In another aspect, the subject matter described herein is directed to a method for cleaning and/or priming a part when alternating between different materials in fabrication of a multi-material 3D object, wherein the method leverages surface tension of a polymerization surface and a stereolithography apparatus comprising a central vat comprising at least one invertible sub-vat, the method comprising:
preparing one or more layers of cured polymer by exposing a first resin on a raised, invertible sub-vat comprising a polymerization surface to UV light;
wherein a liquid bridge comprising the first resin forms between the first resin on the polymerization surface and a part comprising one or more cured polymer layers;
laterally translating the part or the polymerization surface;
wherein the translating causes the liquid bridge comprising the first resin to translate with the part, but separate itself from the part once it reaches an edge of the raised, invertible sub-vat, and then fall into the central vat;
optionally, injecting a solvent from an external pump to remove remnant first resin from the part comprising one or more cured polymer layers; wherein the solvent rinses away remnant first resin from the part and falls into the central vat;
injecting a second material from an external pump to remove remnant first resin from the part, wherein excess second material falls into the central vat;
wherein delivery of the second material to the part primes the part with the second material.

These and other aspects are described fully herein.

BRIEF DESCRIPTION OF THE DRAWINGS

FIGS. 3A and 3B show a diagram for preparing a multi-material 3D object.

FIG. 7 shows an experimental setup for filling trenches with a blocking composition, as described herein.

FIGS. 11A and 11B show, respectively, a top view and a bottom view of the fabricated part. FIG. 11C shows a side view of the fabricated part. In FIG. 11C, the fabricated part is submerged in isopropanol to show which area is hollow and which is solid.

As shown in FIG. 13A the application of a blocking composition is not needed to create helical-shaped hollow regions.

In FIG. 16A, an example of a modular vat design is shown.

FIG. 17 shows an exemplary sub-vat design that can be inverted and placed in a larger, main vat.

FIGS. 24A-24E show a schematic of a series of steps of a method for providing, rinsing, and removing materials in a 3D stereolithography process that leverages the surface tension of the polymerization surface.

FIGS. 30A and 30B show, respectively, a top view and a cross-sectional view of an exemplary part fabricated using the methods described herein.

In FIG. 38, the plot shows the maximum polymerization thickness (cured depth, $C_d$) that is expected for a given incident exposure dose, E. The trendline is fitted to the fundamental "working curve" equation of stereolithography, where $D_p$ is the characteristic penetration depth of light and $E_c$ is the critical energy dose required for the onset of polymerization. The dashed horizontal line at 25 µm is the layer thickness and the dashed vertical line at $E_{reg}$ is the exposure dose of the regular layers for the results shown in FIGS. 39 and 40.

In FIGS. 39 and 40, the horizontal dashed lines represent the designed channel height, and the error bars represent standard deviation of process repeatability for n=3 trials.

FIG. 41B is a magnified image of a portion of the cross-sectional view in FIG. 41A, and shows that the principal layer contains unpolymerized areas that are adjacent to the trenches. These unpolymerized areas occur because of the reduced polymerization caused by the blocking liquid that has diffused from Region I into Region II and III of the principal layer. The unpolymerized area corresponding to Region II results in hollow channel heights to be greater than the designed channel height. The unpolymerized area corresponding to Region III is an indication of poor adhesion of the principal layer.

FIG. 44A illustrates a perspective view of the device where the solid portion of the device is transparent in order to show the internal hollow regions that are colored red, green and blue. FIG. 44B illustrates a cross-sectional view of the CAD model. The horizontal dashed lines correspond to the bottom boundary of the principal layers. Prior to polymerization of the principal layer, the hollow spaces are substituted with the blocking liquid.

FIG. 47A illustrates a device comprising channels (blue) with connected paths that form hexagonal geometric patterns (designed height of 100 µm and width of 75 µm). FIG. 47B illustrates devices fabricated using a HDDA based resin. The hollow regions of these devices were characterized using Nano-CT imaging, for which the renderings are shown in FIGS. 47A and 47C.

FIG. 47C illustrates a device comprising multiple channels (designed height of 150 µm and width of 100 µm) spanning across all three-dimension of the device (multilevel channels). Each continuous channel path is colorized (red, green, blue) to illustrate that the intricate channels are separate but are interlocked.

FIGS. 48A and 48B illustrate 3D printed microdevices comprising complex hollow geometries. FIG. 48A is a microscope picture of an optically transparent device comprising of multilevel channels (designed height of 250 µm and width of 125 µm) fabricated using a PEGDA based resin. FIG. 48B illustrates channels of the device shown in FIG. 48A that are filled with colored food dyes to illustrate functionality for microfluidic applications.

DETAILED DESCRIPTION

Figure 1:
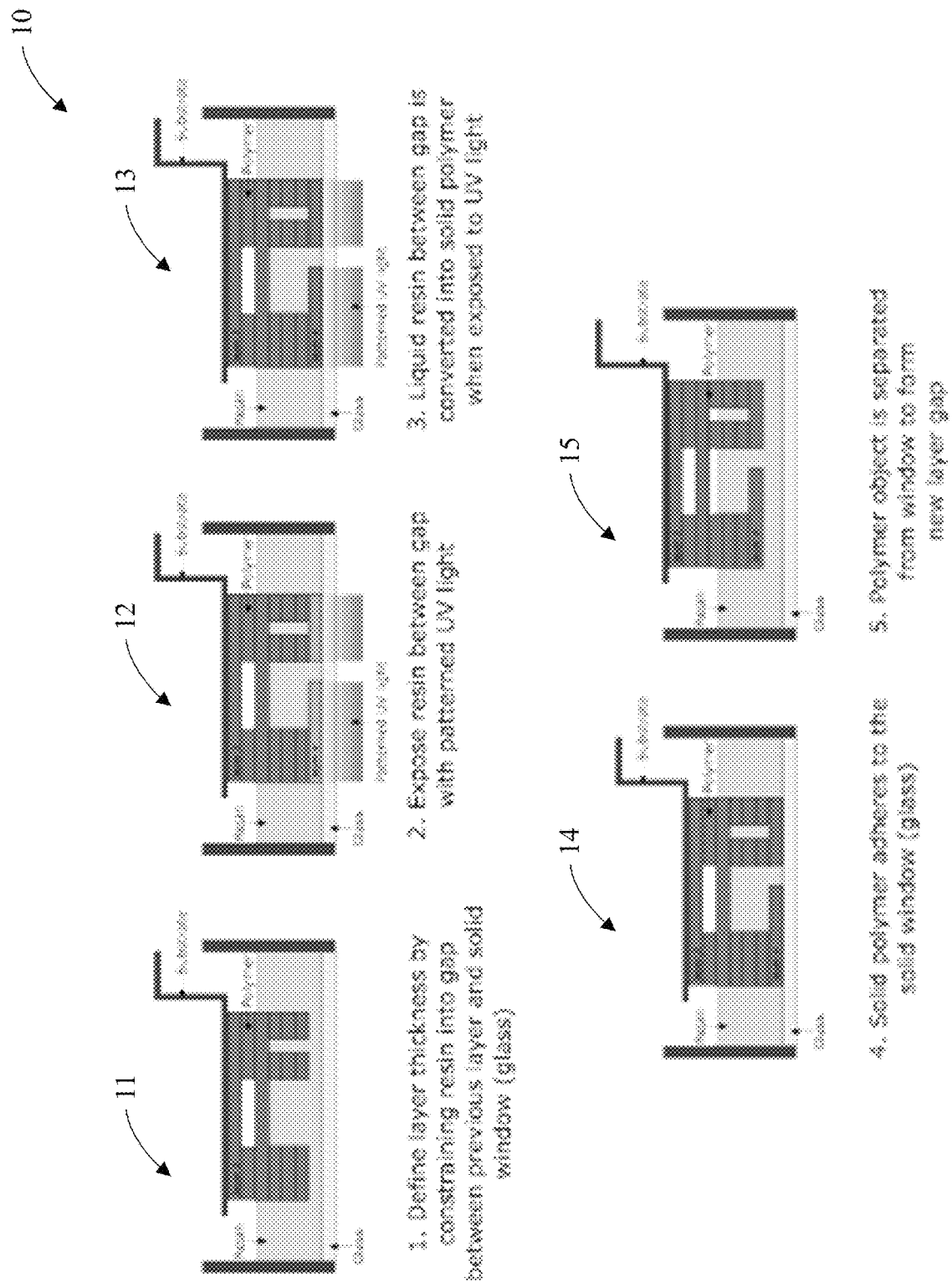
FIG. 1 shows a general overview of 3D printing using stereolithography (SL).

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As used herein, the terms "instructions," "file," "designs," "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, and infrared waves. Signals include man-made transient variations in amplitude, frequency, phase, polarization, or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments. By way of example only, a design file for a printed article may be stored on a computer-readable medium and may be read by a computing device, such as described hereinbelow, for controlling part or all of a 3D printing process and associated apparatuses and components, according to various embodiments described herein.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the terms "about," "substantially," and "approximately" generally mean plus or minus 50% of the value stated, e.g., about 200 µm would include 100 µm to 300 µm, about 1,000 µm would include 500 µm to 1,500 µm. Any provided value, whether or not it is modified by terms such as "about," "substantially," or "approximately," all refer to and hereby disclose associated values or ranges of values thereabout, as described above.

Micrometer scale arbitrary hollow geometries within a solid are needed for a variety of applications including microfluidics, thermal management and metamaterials. A major challenge to 3D printing hollow geometries using stereolithography is the ability to retain empty spaces in between the solidified regions. In order to prevent unwanted polymerization of the trapped resin in the hollow spaces—known as print-through—significant constraints are generally imposed on the primary process parameters such as resin formulation, exposure conditions and layer thickness. Here, we report on a stereolithography process which substitutes the trapped resin with a UV blocking liquid to mitigate print-through. We investigate the mechanism of the developed process and determine guidelines for the formulation of the blocking liquid. The reported method decouples the relationship between the primary process parameters and their effect on print-through. Without having to optimize the primary process parameters to reduce print-through, hollow heights that exceed the limits of conventional stereolithography can be realized. We demonstrate fabrication of a variety of complex hollow geometries with cross-sectional features ranging from tens of micrometer to hundreds of micrometers in size. With the framework presented, this method may be employed for 3D printing functional hollow geometries for a variety of applications, and with improved freedom over the printing process (e.g. material choices, speed and resulting properties of the printed parts).

Accordingly, the subject matter described herein relates to stereolithographic methods for preparing 3D objects comprising hollow regions and/or multiple materials. The methods presented herein help solve many challenges that exist in the art for fabricating hollow regions and incorporating more than one type of material into an object during 3D printing.

Miniaturization of and the ability to manufacture complex hollow geometries spanning across all three-dimensions (3D) is a key challenge. Hollow spaces (i.e. empty spaces, channels, cavities or voids) are necessary for a variety of device applications, for example, microfluidics (e.g. mixing and organ-on-chip), metamaterials (e.g. acoustic, optical and mechanical), circuit cooling, chemical synthesis and 3D printed circuit components. To realize hollow spaces, various microfabrication techniques can be utilized such as soft-lithography, sacrificial templates, micromilling and lasers. However, these methods are slow because of the need to make photomasks and molds, or they require multiple steps that increase process integration complexities (e.g. stacking, alignment, bonding or template removal).

Alternatively, arbitrary hollow geometries can be directly printed using additive manufacturing (3D printing), such as stereolithography. While stereolithography offers high resolution and scalability to large areas, the ability to retain micrometer scale hollow features between the solidified regions is challenging because of excess polymerization caused by "print-through".

In stereolithography, print-through is the polymerization of regions beyond the resin thickness (i.e. layer thickness) that is intended to be photopolymerized. These regions include the previously solidified layers and desired hollow spaces which contain the trapped resin. While the incident ultraviolet (UV) light attenuates with distance, according to the Beer-Lambert law, the cumulative exposure dose penetrating into the hollow spaces over the course of the fabrication can lead to polymerization of the trapped resin and reduce the fidelity of the hollow geometries. In addition, print-through can result in a higher viscosity of the trapped resin due to partial polymerization, thus making removal of the resin challenging after the part is fabricated.

Reduction in print-through, consequently an improvement to the vertical resolution of the process, requires optimization of the primary stereolithography process parameters—resin formulation, UV exposure dose and layer thickness of the printed parts. The complex trade-offs between these parameters and their effect on print-through has been modeled. In some instances the practical hollow channel height limit is ~3.5-5.5 Dp, where Dp is the characteristic penetration depth of UV light in the resin. Therefore, the primary method to reduce print-through requires increasing the light absorbance of the resin, to reduce the value of Dp, by tailoring the concentration of photoinitiator and absorber in the monomer. However, decreasing the exposure dose or increasing the layer thickness can also reduce the total light exposure penetrating into the hollow spaces. Various methods to mitigate print-through have been reported. Food dyes can be used as potent absorbers to fabricate biocompatible hydrogels that contain 1-mm cylindrical channels. A high-resolution resin can be used for fabrication of 18 μm×20 μm microfluidic flow channels by selecting an optimal absorber and layer thickness to achieve the smallest channel height. For example, a high-resolution resin can be used to fabricate 15 μm×15 μm valves by a combination of using a high-resolution resin, variable exposure doses for features within the same layer, and by using variable layer thicknesses throughout the fabrication of the device. In-situ transfer techniques can reduce the total exposure dose absorbed by the trapped resin, in which the capping layer which encapsulates the hollow trenches is polymerized separately, then it is transferred and bonded to the part containing the trenches using a second exposure.

These and other reported methods attempt to modulate one or more of the primary process parameters in order to reduce the cumulative exposure dose penetrating into the hollow spaces. Focusing on optimizing the primary process parameters to reduce print-through imposes significant constraints on the device development lifecycle and the properties of the printed parts. For example, the choice of materials can be restricted by the practical feasibility and manufacturability of the end application (e.g. wavelength of light source, solubility limit, cost, or biocompatibility and transparency. Usage of high absorbance resins enforces fabrication of parts with smaller layer thickness—even for the non-critical device features (e.g., inlet/outlet ports of a microfluidic device)—consequently causing the total fabrication time to be increased. Mechanical properties (e.g. hardness and Young's modulus) are highly dependent on the process parameters, therefore obtaining desired mechanical functionalities from certain geometries within a part or from the bulk device while also reducing print-through can become challenging. Decreasing the photoinitiator concentration or exposure dose can cause the part to have a weaker green strength, thus requiring additional post-fabrication curing steps. Furthermore, the lateral resolution, lateral fidelity and speed of polymerization are also affected by the resin formulation and exposure dose.

Described herein is a stereolithography process that mitigates print-through by substituting the trapped resin in the hollow spaces with a "blocking liquid"—a liquid that attenuates the UV light, is non-polymerizing, or both. The blocking liquid is designed to reduce or eliminate polymerization within the hollow spaces to improve fidelity of the hollow geometries. Mechanisms are described herein for the developed process to determine the formulation of the blocking liquid and the process capabilities are presented. Substituted blocking liquid can enable the vertical resolution of the hollow spaces to exceed the practical limits of a conventional method without having to optimize the primary process parameters for print-through reduction. Independent of the process parameters, shown herein is the ability to fabricate complex hollow 3D geometries with cross-sectional feature sizes ranging from tens of micrometer to hundreds of micrometers. The methods described herein can be adapted for a variety of device applications that require high resolution structured hollow geometries.

Hollow regions in 3D-printed objects are intentionally designed to serve specific functions in the object's end application. Such hollow regions can be used as microfluidic channels and diaphragms in MEMS devices, for example. However, resin often gets trapped inside these hollow regions when attempting to print 3D objects. This trapped resin in the negative space then becomes polymerized because the UV light penetrates further than the thickness of the resin that is desired to be polymerized. The polymerized resin in the hollow region therefore minimizes the intended size of the vacancy in the 3D object (see, e.g., FIG. 2). This phenomenon is often known as "print through" (Gong, Hua, et al. *RSC Advances* 5, no. 129 (2015): 106621-32).

Furthermore, it is often desirable to print 3D functional materials comprising more than one type of material. In such objects, each material serves a specific function in the fabricated part. For example, multi-material 3D printing technology is useful in the production of 3D-printed prosthetics. Such 3D printing enables the use of different materials, like a soft polyurethane on contact points with the body and a stiff carbon fiber material for the corpus of the prosthetics. The prosthetics can therefore be adjusted to suit the varying needs and desires of an individual. However, the design of such multi-material 3D objects often requires complicated stereolithography hardware systems and processes. Different vats are typically necessary for each material resin, and the methods invoke complicated cleaning and rinsing steps in between the switchover to different materials. One further problem encountered is how to print multi-material 3D objects when one of the materials may not be photopolymerizable.

In certain embodiments, the methods described herein enable the formation of hollow regions and the integration of multiple materials in the preparation of a 3D-printed object by fabricating and filling trenches with a blocking composition throughout the stereolithographic printing process. As described herein, contacting the trenches with an absorbent, such as a sponge, prior to filling the trench with a blocking composition, helps absorb remnant resin from the trench to produce clean, hollow regions of a desirable size. In the formation of 3D-printed objects containing hollow regions, the blocking composition is removed after preparing the object. For preparing multi-material 3D-printed objects, the blocking composition is one that is desired to be integrated into the 3D-printed object; therefore, the blocking composition is not removed after preparing the object, but instead remains in the final, printed object. Depending on the type of blocking composition used, the blocking composition can undergo a phase change, for example, from liquid to solid (e.g. if the blocking composition is a thermally curable resin, but a poorly photopolymerizable resin). In certain embodiments, when the blocking composition is not photopolymerizable, but can be cured with heat, after fabrication of the 3D printed part, the part is placed in a furnace to solidify the blocking composition. In certain other embodiments, the blocking composition is a liquid, and is incorporated in its liquid state into the final, 3D printed object. In this case, the blocking composition (blocking liquid) is trapped in the 3D printed part and does not solidify. Accordingly, multi-material heterogenous 3D-printed parts, wherein the parts are part solid state and part liquid state, can be realized using the methods described herein. An exemplary multi-material heterogenous 3D part might require, for example, different refractive indexes, where the solid part which is photopolymerized from the resin has a refractive index different from the blocking composition. Optical lenses are one example of a type of material that requires different refractive indexes.

In certain other embodiments, hollow materials can be prepared by simply using an absorbent, without the need for a blocking composition. This method is particularly useful for printing 3D materials containing vertical, spiral, or helical hollow channels, as well as hollow features that are not fully encapsulated by a capping layer. In this method, trapped, remnant resin is absorbed by the absorbent due to capillary forces to produce desirable, hollow, well-defined regions. A capping polymer layer is prepared that encapsulates all or a portion of the hollow regions, as described herein.

Further described herein are methods for dispensing or sourcing a resin in preparing a 3D object by stereolithographic means through an absorbent, such as a sponge. In these methods, a sponge is infused with a material, such as a resin or a blocking composition, and is used to source or replenish desired materials throughout the printing process. In conventional stereolithography printing, the resin is contained in a large vat or a pool above the polymerization surface. In certain embodiments, the methods described herein for dispensing materials by an absorbent eliminate the need for a large vat or tank, as well as the pumps, syringes, and injectors often employed in conventional stereolithography. As such, these methods have the potential to reduce the contamination footprint of different materials in the system and simplify rinsing or cleaning steps when switching between different materials.

The methods described herein further enable the fabrication of large area 3D objects with high resolution and the capability of integrating one or more functional materials into the object. The 3D objects prepared by the methods described herein can serve many industries through various applications, such as metamaterials, energy storage and harvesting, optical interconnects, waveguides, micro-optics, electrical interconnects, interposers, printed PCBs, flexible electronics, IoT devices, sensors, actuators, microrobotics, radio frequency (RF) devices; biomedical/healthcare devices, point of care screening devices, and microfluidic-based devices.

In certain embodiments, the subject matter described herein is directed to a modular hardware apparatus for multi-material 3D stereolithography, which applies an invertible double vat design. In certain embodiments, the hardware also contains an absorbent for absorbing, cleaning, or providing resins, solvents, or other materials to be applied during the 3D printing process. In certain embodiments, the hardware utilizes surface tension and hardware translation to achieve high resolution hollow features in 3D objects through application of a blocking composition. Additionally, the apparatus can source materials by further application of an absorbent.

The presently disclosed subject matter will now be described more fully hereinafter. However, many modifications and other examples of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to specific examples disclosed and that modifications and other examples are intended to be included within the scope of the appended claims. In other words, the subject matter described herein covers all alternatives, modifications, and equivalents. Unless otherwise defined, all technical and scientific terms used herein have the same meaning as commonly understood by one of ordinary skill in this field. All publications, patent applications, patents, and other references mentioned herein are incorporated by reference in their entirety. In the event that one or more of the incorporated literatures, patents, and similar materials differs from or contradicts this application, including but not limited to defined terms, term usage, described techniques, or the like, this application controls.

Definitions

As used herein, "and/or" refers to and encompasses any and all possible combinations of one or more of the associated listed items, as well as the lack of combinations when interpreted in the alternative ("or").

As used herein, conditional language used herein, such as, among others, "can," "could," "might," "may," "e.g.," and the like, unless specifically stated otherwise or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

As used herein, "stereolithographic" or "stereolithography" refers to a form of 3D printing technology (also known as additive manufacturing) used for creating models, prototypes, patterns, and production parts in a layer-by-layer fashion using photochemical processes by which light causes chemical monomers and oligomers to cross-link together to form polymers. These polymers then comprise the body of a three-dimensional solid. As described herein, hollow regions or blocking compositions that are not photopolymerizable can be introduced into the three-dimensional solids prepared using stereolithographic means.

Figure 26:
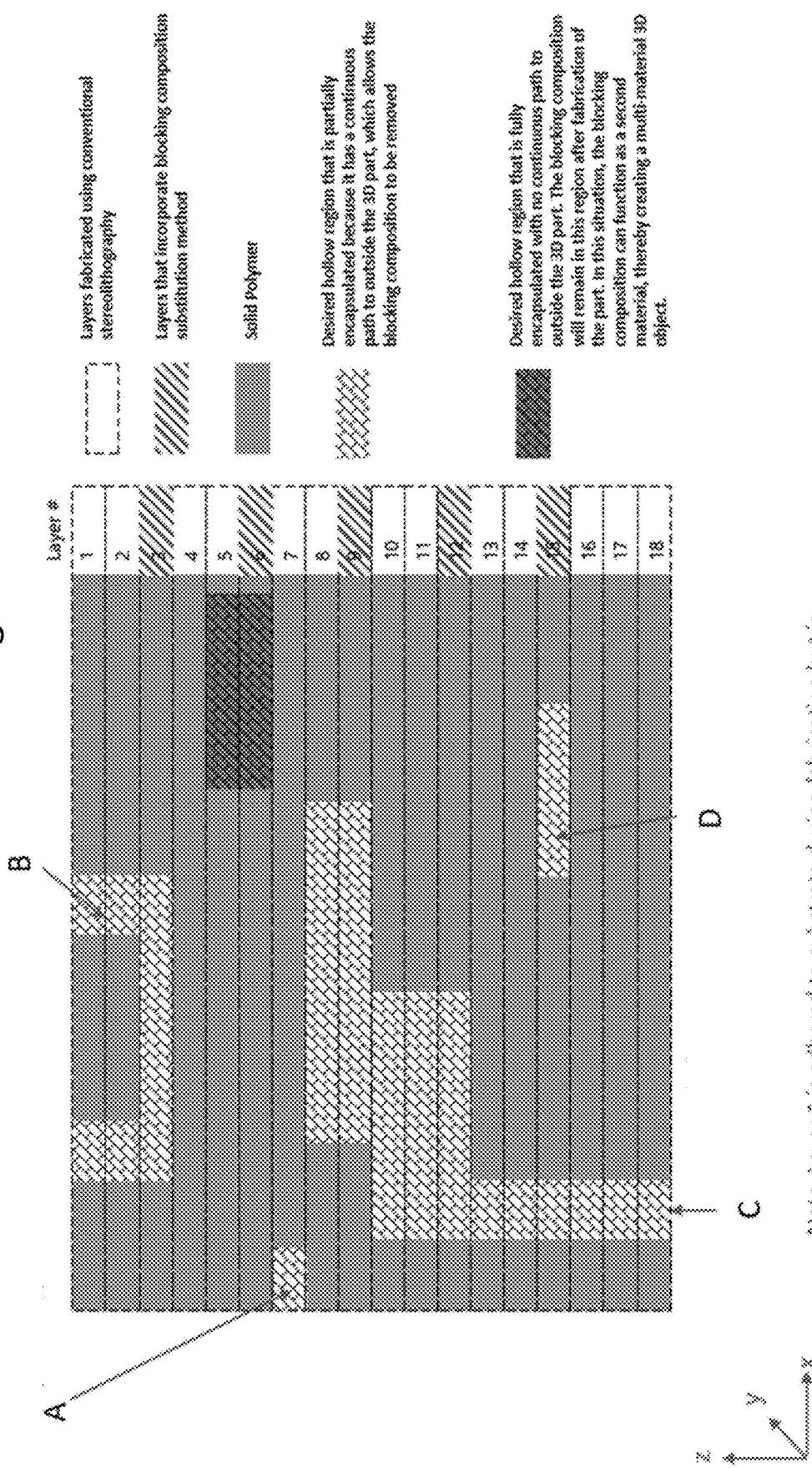
FIG. 26 shows a schematic of a 3D printed object containing various hollow regions and other regions containing a blocking composition. A) because the hollow region is on the edge of the part, the hollow region may not require the creation of the region using a blocking composition method, but may only necessitate incorporation of the sponge method, described herein. B) Layer 4 fully encapsulates the hollow region of layer 3; however, the drain path allows for removal (i.e., draining) of the blocking composition. C) removal path (i.e., drain path) for blocking composition. D) There is a drain path for the blocking composition in this region; however, it is in a different plane and is therefore not shown. Additionally shown at layers 5 and 6 is a region occupied by another material that is fully encapsulated and remains in the 3D printed object after printing, thereby allowing for the formation of a multi-material 3D printed object.
Figure 28B:
FIGS. 28A-28D show different views of a modular vat setup. The modular vat setup allows for the ability to insert two tensioning rings (shown as white rings), which act as two raised surfaces, in accordance with the apparatuses and methods described herein for stereolithography. The central vat, in which the two tensioning rings sit, is able to collect waste throughout the stereolithography process.
Figure 28D:
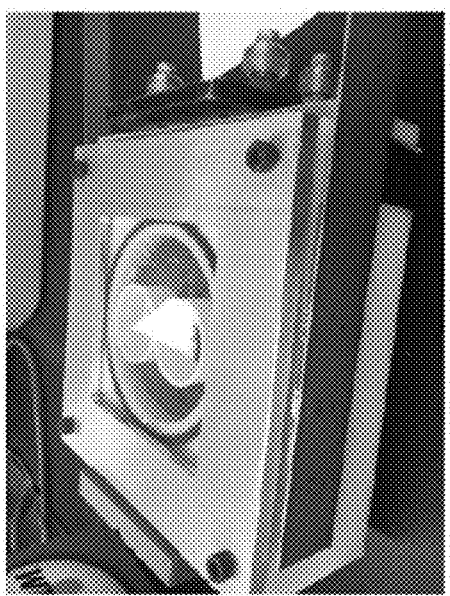
Figure 28A:
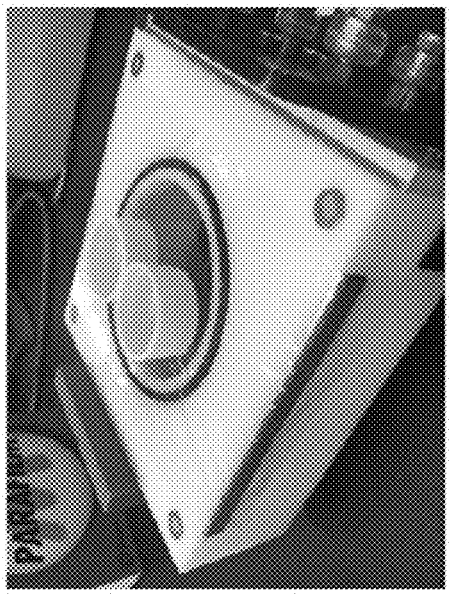
Figure 28C:
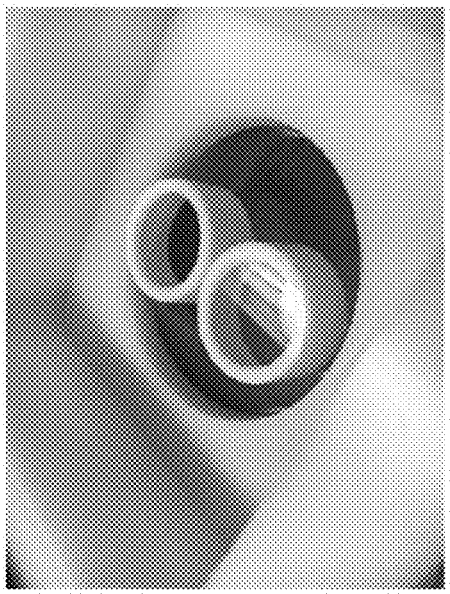
Figure 27:
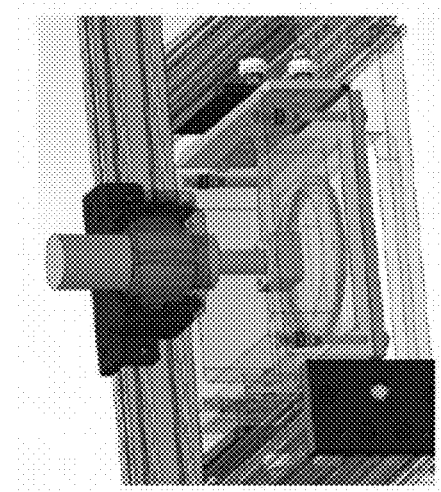
FIG. 27 shows a CAD drawing of an exemplary substrate and containment vat for stereolithography apparatuses described herein. The vat is translucent in order to show the modular assembly provided in FIGS. 28A-28D.
Figure 29B:
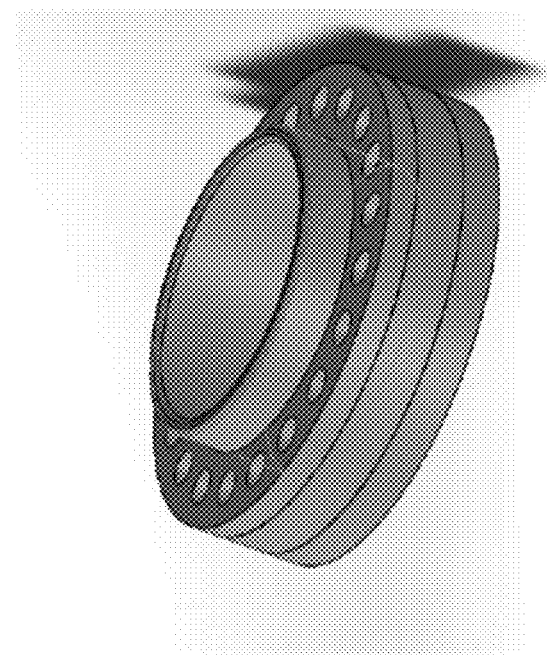
FIGS. 29A and 29B show different views of an exemplary concept of an invertible vat, described herein.
Figure 29A:
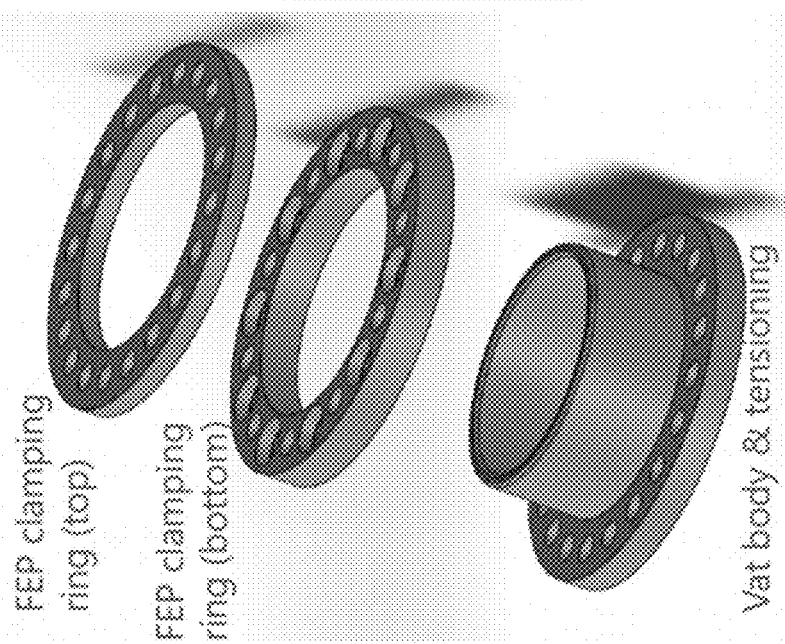

As used herein, "trenches" refer to intentionally unpolymerized depressions or troughs created while printing a 3D object. Once the trenches are partially or fully encapsulated with one or more capping layers, they become hollow regions in the 3D object. The trenches can be designed by computer-aided designs (CAD), such as those shown in FIG. 4A. In some embodiments, a trench path can extend to outside the part. For example, in FIG. 26, the trenches in layers 8/9 are partially encapsulated by layer 10, while the trenches in layer 3 are fully encapsulated by layer 4.

Figure 5:
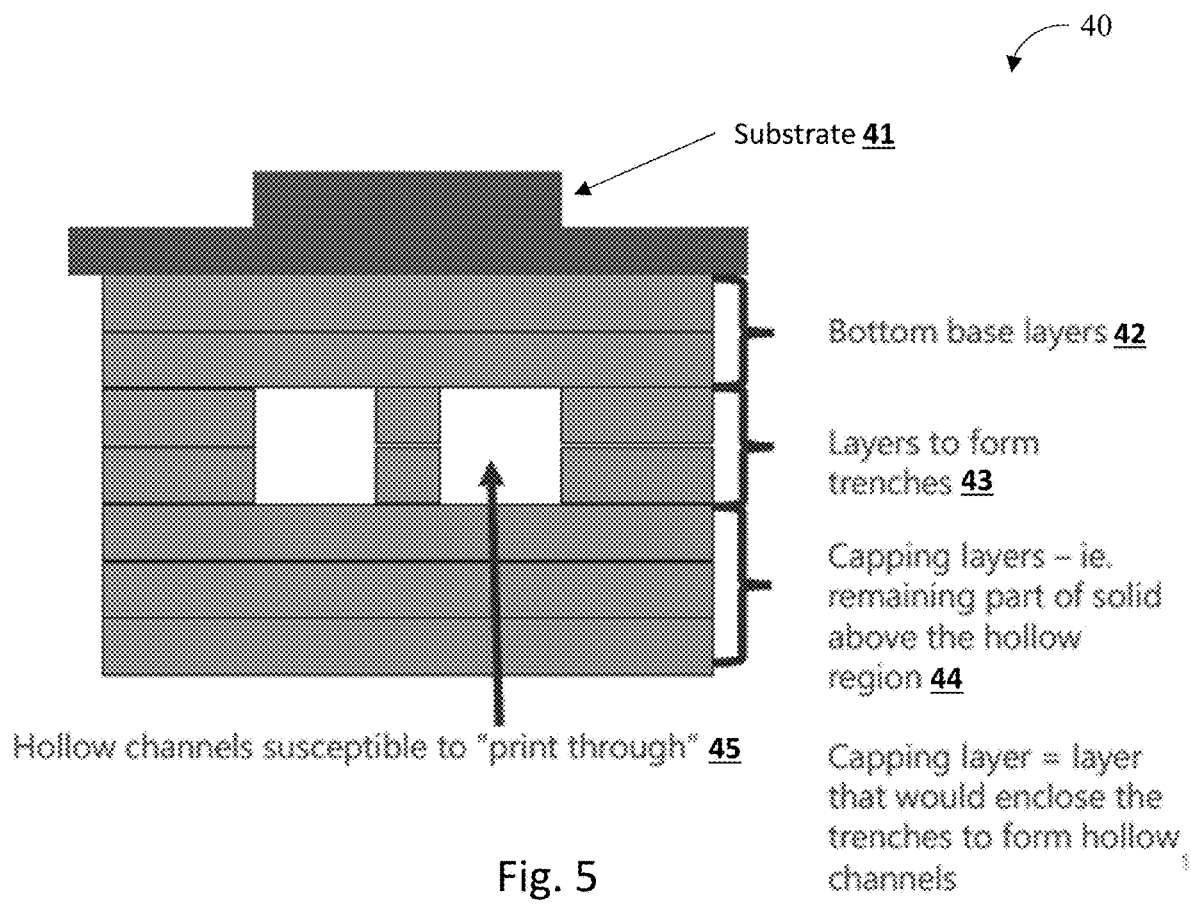
FIG. 5 shows the basic elements comprising a "part" as described herein.

As used herein, "part" refers to the substrate and however many bottom base layers, layers to form trenches, blocking composition (if applicable), and capping layers above the trenches exist in a 3D printed solid (e.g., as shown in FIG. 5). The number of such layers varies in the process of printing a 3D object, but the printed combination of layers, including the substrate, comprise a "part."

As used herein, "bottom base layers" refers to layers of polymer nearest the substrate that are formed prior to formation of trench layers (e.g., as shown in FIG. 5).

As used herein, "trench layers" refer to layers of polymer that are horizontally adjacent to hollow regions in a 3D-printed object (e.g., as shown in FIG. 5). In certain embodiments, one or more printed layers can comprise one or more trenches.

As used herein, "capping layer" refers to a layer of solidified polymer that encloses the trenches in the 3D printed object. The trenches may be hollow regions or filled with a blocking composition that is different from the bottom base layers and the capping layer (e.g., as shown in FIG. 5).

As used herein, "hollow regions" refers to areas in a 3D solid object where no material resides. In certain embodiments, a hollow region can be referred to as a channel. In certain embodiments herein, trenches are fabricated during the process of preparing a 3D object, which are then finalized in the preparation process to form hollow regions. Hollow regions can be fully or partially encapsulated by a capping layer. If the continuous path of the channels leading to the last polymerized layer is open and allows blocking composition (i.e. a fluid) trapped in the hollow region to leak out onto a sponge, then that hollow region is not fully encapsulated. In certain embodiments, the first capping layer can fully or partially encapsulate the trenches. See, for example, FIGS. 30A and 30B, where layer 4 is fully encapsulating the trenches in layer 3. However, the hollow region, "B" is not completely sealed, as there is a continuous drainage path toward the outside of the 3D part. In this case, the drainage path is located near layer 1. However, layer 10 only partially encapsulates the trenches of layers 8 and 9. This is because in the subsequent fabrication of the layer, the continuous drainage path will lead to the last layer (layer 18). For multi-material objects made using the methods described herein, wherein the blocking composition remains in the material after fabrication of the 3D object, the blocking composition will at some point need to be fully encapsulated such that it cannot be removed after fabrication of the part. However, during the fabrication (i.e., when preparing the part), the capping layers may only partially encapsulate the part. If a trench is partially or fully encapsulated will depend on, for example, the geometry of the trench and the final, desired object to be printed.

As used herein, "helical-shaped," when referring to a hollow region of a 3D object, refers to a hollow region that has at least a slight curvature. In this regard, the hollow region need not form a full helix; only a slight bending in the region is required.

As used herein, "semi-prepared 3D solid polymer object part" refers to an unfinalized 3D-printed object that requires one or more additional polymer layers to be complete.

As used herein, "FEP" refers to fluorinated ethylene propylene. In certain embodiments, the polymerizable surfaces applied in the methods described herein comprise a FEP film.

As used herein, "liquid communication" refers to a material, (i.e., a liquid, such as an inert immiscible liquid) that is located in two different sub-vats, wherein the sub-vats are directly next to each other, wherein a slit is present in the wall separating the two sub-vats, and where the liquid can easily flow through the slit from one sub-vat to the other. The slit can also be a hole, perforation, porous membrane, or sieve.

As used herein, "exposure surface," also referred to herein as a "polymerization surface," refers to an interface or surface to which resin is constrained and where the incident UV light begins polymerizing the resin. The polymerization surface is used to "constrain" the unpolymerized resin into a pre-defined thickness. The gap between the constraining interface and the previous polymerized layer determines the "layer thickness" for the unpolymerized resin that will be polymerized.

As used herein, "trapped resin" refers to resin residing in trenches that is still in liquid form but may contain partially polymerized oligomers as a result of UV exposure sequences.

As used herein, "modular" refers to a collection of building blocks in a stereolithographic apparatus, such as vats and raised surfaces, which can be configured in different ways, adapting for the specific needs of the 3D object to be prepared.

As used herein, a "resin" may be composed of monomer, initiator, dye, photo-absorber, inhibitor, and/or loaded micro/nano particles. The "resin" is generally used to refer to the fluid in a containment vessel that is used to form the solid polymer and may include the before-mentioned components. The "initiator" is responsible for reacting with UV light to create a free-radical and start the crosslinking reaction of the monomers. The UV light spatially controls where the resin will solidify. The photo-absorbers/dyes reduce the UV light penetration depth. The initiator is generally a "photo-initiator" because UV light is needed to initiate the reaction. However, other initiators (e.g. thermal initiators) can be added to the resin composition. The polymerization reaction is generally exothermic, so the presence of a thermal initiator can also affect the polymerization process. Furthermore, other additives e.g. nanoparticles, dyes, and fillers can be added to bring additional functionality to the fabricated part (e.g. color or mechanical strength). For example, the resin can include fumed silica particles.

As used herein, "polymerization" refers to the process of converting a resin into a "solid polymer."

Reference may be made throughout the present disclosure to "UV light" as the light that initiates polymerization. However, the polymerization light may be of any wavelength in the electromagnetic spectrum (e.g. narrow or broad spectrum). That is, the disclosure may be applied to light of any wavelength. In certain embodiments, the polymerization light has a wavelength of about 385 nm. In certain other embodiments, the polymerization light has a wavelength of about 405 nm or 365 nm.

Additive manufacturing (AM) or 3D printing is a process of fabricating 3D objects by sequentially adding materials to the object being built until it reaches its final geometrical form. Each subsequent addition of material to the object is selectively placed in order to make the desired geometrical form of the final 3D object. Because of the ability to fabricate complex 3D objects using additive manufacturing, additive manufacturing is also generally referred to as 3D printing. As used herein, the product resulting from application of the disclosed methods and use of the disclosed devices is generally referred to as the 3D object.

Stereolithography and microstereolithography are one type of additive manufacturing. Microstereolithography is generally used to refer to the fabrication of objects on a micrometer scale. However, the method and its basic principles may be scalable to a macro scale (that is, stereolithography). Thus, the methods described herein are applicable to both microstereolithography and stereolithography.

Stereolithography allows for the fabrication of 3D objects by sequentially depositing materials, e.g., through radical chain polymerization, to a solid polymer until the object reaches its final geometrical form. Each subsequent addition of material may occur along the height of the object (e.g., along the z-axis). Traditionally, the process may allow for "layer-by-layer" growth, where each layer has a finite thickness.

Additional definitions are provided below.

Methods for Preparing a 3D Object Having Hollow Regions with a Blocking Composition In certain embodiments, the subject matter described herein is directed to a stereolithographic method for preparing a 3D object having one or more hollow regions, comprising:
  preparing one or more layers of cured polymer by exposing a first resin to UV light;
    wherein the one of more layers are prepared having one or more trenches;
  filling the one or more trenches with a blocking composition to form one or more blocking composition-filled trenches;
  contacting the surface of the blocking composition of the one or more blocking composition-filled trenches with a second resin;
  exposing the second resin to UV light to prepare a first cured polymer capping layer, wherein the first cured polymer capping layer encapsulates the one or more blocking composition-filled trenches; and
  removing the blocking composition;
    wherein a 3D object having one or more hollow regions is prepared.

In the above method, several layers of polymer are first printed in accordance with conventional stereolithography procedures (see, e.g., FIG. 1). FIG. 1 illustrates a stereolithography process 10 in which the layer thickness of a resin is defined by constraining resin into gap(s) between previously layers and a solid window of glass, for example, at 11. The stereolithography process 10 further includes exposing the resin between the gap(s) to patterned UV light, at 12. The stereolithography process 10 further includes converting he liquid resin between the gap(s) into solid polymer through UV light exposure, at 13. The stereolithography process 10 further includes allowing adhesion of the solid polymer to the solid window of glass, at 14. The stereolithography process 10 further includes separating the fabricated polymer object from the window of glass to form a new gap into which a further layer of resin/polymer can be disposed, at 15.

With the help of computer aided manufacturing or computer-aided design (CAM/CAD) software, the UV light is used to draw a pre-programmed design or shape on to the surface of the photopolymer vat. In particular, the CAM/CAD software can be used to design a model having one or more trenches (see, e.g., FIGS. 4A-4E). The pattern of UV light can be determined for a given layer. Photopolymers are sensitive to ultraviolet light, so the resin is photochemically solidified and forms a single layer of the desired 3D object. The solidified resin between the gap (See, e.g., FIG. 1, at element 13) adheres to the solid window. The polymer is then separated from the window to form a new layer gap. This process is repeated for each layer of the design, until desired troughs are generated for filling in accordance with the above method.

After printing the one or more trenches, the surfaces of the trenches can be contacted with an absorbent to absorb trapped resin from the trenches. In certain embodiments, the absorbent is a sponge, foam, or rubber composition. This trapped resin is remnant resin from printing the layers of polymer that helped generate the trenches and layers of polymer above the printed trench material.

Figure 2:
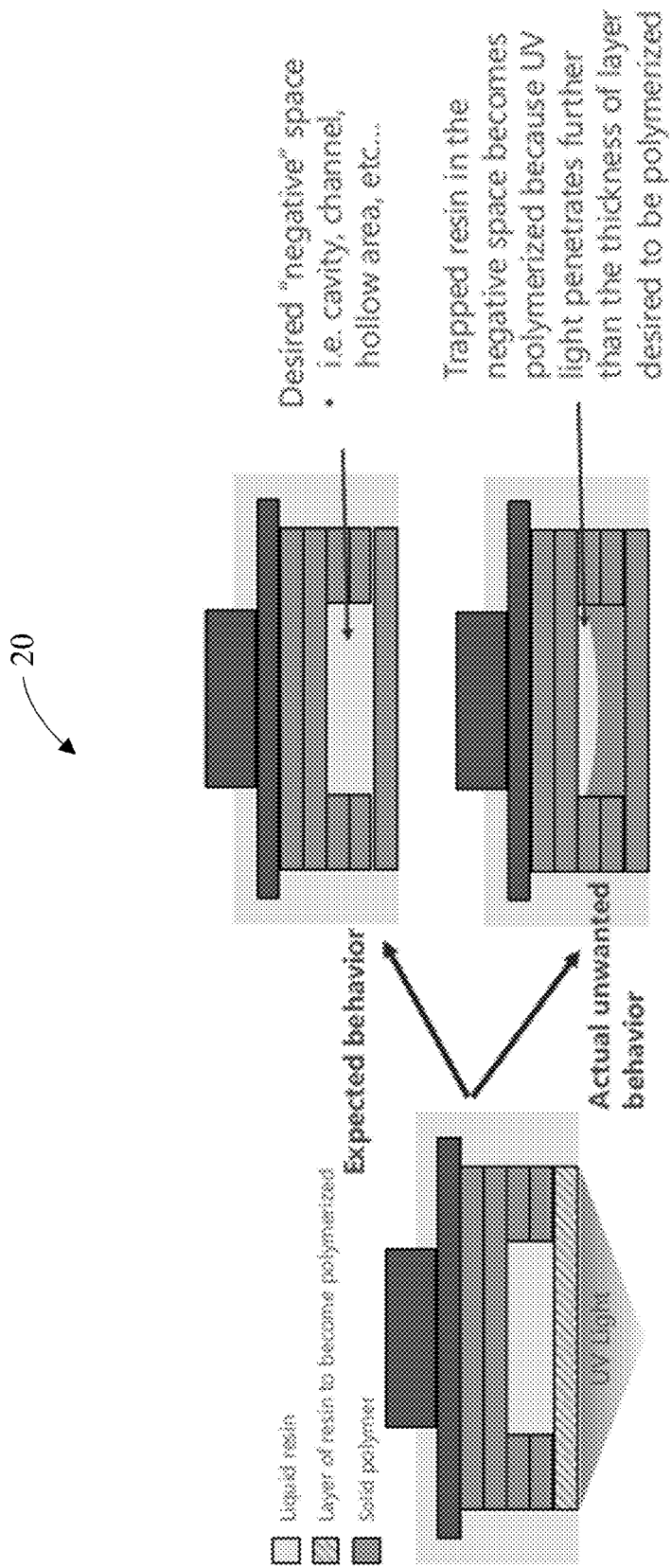
FIG. 2 shows a diagram of expected versus actual behavior of materials when attempting to generate hollow regions during 3D printing.

FIG. 2 illustrates expected versus actual behavior of materials when attempting to generate hollow regions during 3D printing. As noted above, the "print through" phenomenon is shown in FIG. 2. Often, hollow regions in 3D-printed objects are intentionally designed to serve specific functions in the object's end application. Such hollow regions can be used as microfluidic channels and diaphragms in MEMS devices, for example. However, resin often gets trapped inside these hollow regions when attempting to print 3D objects. This trapped resin in the negative space then becomes polymerized because the UV light penetrates further than the thickness of the resin that is desired to be polymerized. The polymerized resin in the hollow region therefore minimizes the intended size of the vacancy in the 3D object.

FIGS. 3A and 3B illustrate a process 30 for multi-material, multi-layer stereolithography in which multiple resins (e.g., A and B) are disposed in resin form and UV light is used to cure the resins.

Figure 4A:
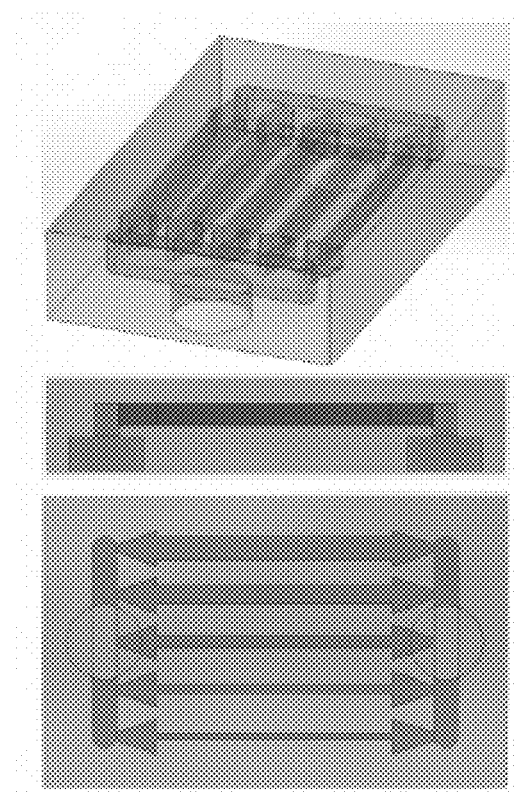
FIG. 4A illustrates a 3D CAD model of a 3D object having hollow regions.
Figure 4B:
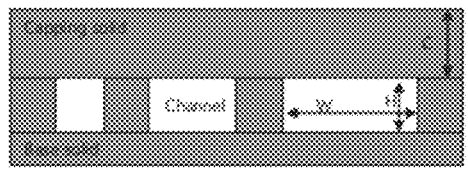
FIG. 4B illustrates a schematic of a 3D object having hollow regions.
Figure 4C:
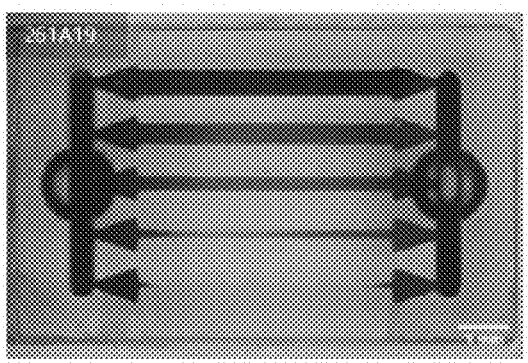
FIGS. 4C-4E illustrate 3D object having hollow regions fabricated according to an approach described herein.
Figure 4D:
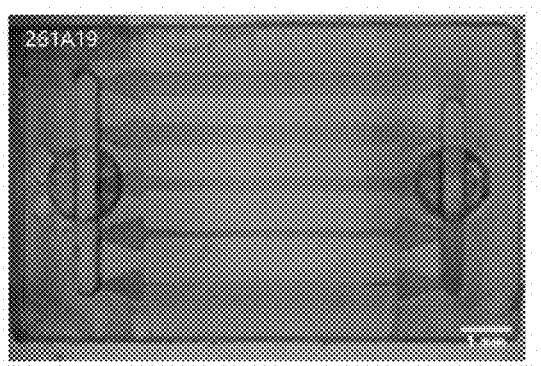
Figure 4E:
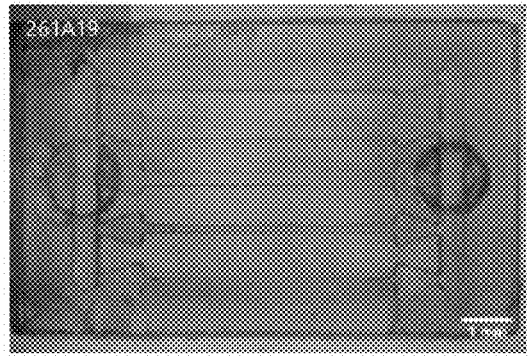

FIGS. 4A-4E illustrate a model for preparing a 3D object having hollow regions. In FIG. 4A are CAD (computer-aided designs) for 3D printed objects containing several hollow regions. Shown in FIG. 4B is a cross-sectional view of the CAD model provided in FIG. 4A. Shown in FIG. 4C is a 3D printed object containing a black liquid, which is a blocking composition described herein that is used to fabricate hollow regions. Shown in FIG. 4E is the 3D object following removal of the black liquid blocking composition. The hollow regions are apparent in the image. To confirm that the hollow regions were empty in the printed object, isopropanol containing a green dye was injected into the hollow channels, as shown in FIG. 4D. The green-dyed isopropanol filling the channels of the object in FIG. 4D confirmed that the channels are indeed hollow.

FIG. 5 illustrates a structure 40 formed on a substrate 41, the structure comprising one or more bottom base layers 42, one or more layers to form trenches 43, one or more capping layers 44, and hollow channels 45 formed within the layers to form trenches 43.

Figure 6:
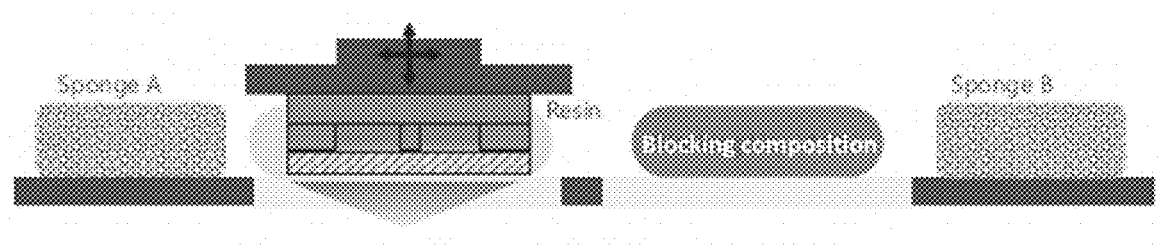
FIG. 6 shows a general scheme for filling trenches with a blocking composition. Briefly, trenches are first fabricated using a conventional stereolithography process. Following this, the part is contacted with an absorbent (sponge A) to absorb trapped resin from the trenches, After this, the part can be dipped into a pool or vat of a blocking composition to fill the trenches with a blocking composition. The trenches are filled with the blocking composition as a result of surface tension or capillary forces. After this, the part is contacted with resin, such as a pool or vat containing resin. Most blocking composition will remain in the trenches, though some blocking composition will mix with the resin. Following this, the resin is exposed to UV light to photopolymerize the resin layer and encapsulate the trenches. This will form a capping layer. Optionally, after preparing the first capping layer, the part can be contacted with an absorbent (Sponge B) to absorb remaining resin and blocking composition from the part surfaces. Further optionally, the vat or pool containing the resin is then removed and supplied with a fresh resin. The part is then contacted with a fresh resin to prepare a second capping layer by conventional stereolithography means. Once all of the desired layers are prepared in the 3D object, the blocking composition can be removed to generate hollow regions.

As shown in FIG. 6, after forming the one or more trenches (e.g., 45), they are then filled with a blocking composition to form one or more blocking composition-filled trenches as part of a process to prevent print through in the hollow channels 45 formed in the layers to form trenches 43. Several different methods can be used to fill the trenches. In certain embodiments, the process of filling the one or more trenches with a blocking composition to form one or more blocking composition-filled trenches comprises submerging the one or more trenches in the blocking composition or introducing the blocking composition using sponges (e.g., Sponge A and/or Sponge B). In some embodiments, the process may involve submerging the part comprising the bottom base layers, layers that form trenches, and the trenches, themselves, in a pool of the blocking composition. In certain embodiments, the pool of the blocking composition is contained in a vat. In certain other embodiments, the pool of the blocking composition is a puddle contained on a raised surface, such as an inverted sub-vat, as described further herein. The trenches are filled with blocking composition as a result of surface tension or capillary forces.

In certain other embodiments, filling the one or more trenches with a blocking composition to form one or more blocking composition-filled trenches comprises contacting the one or more trenches with a blocking composition-infused absorbent. Here an absorbent, such as a sponge, foam, or rubber composition, is soaked with the blocking composition. This absorbent is used to source or replenish the blocking composition throughout the trench-filling process. By mechanically pressing the part comprising the bottom base layers, layers that form trenches, and the trenches, themselves, on a blocking composition-soaked sponge, the blocking composition can be extracted and inserted into the trenches of the part. This method can be further aided by using a squeegee, doctor blade, brush, or vipers to level out the dispensed liquid on the part surface. Filling the trenches using the blocking composition-infused absorbent process is particularly useful over submerging the part into a pool of blocking composition when the blocking composition is viscous, for example.

In certain other embodiments, a pump, syringe, or pipette can provide the blocking composition to the part to fill the trenches. Indeed, different methods can be applied for filling the trenches, depending on the physical properties of the blocking composition.

FIG. 7 illustrates an experimental setup 50 for filling trenches with a blocking composition that includes a substrate 51, a first sponge 52, a second sponge 53, a resin 54 disposed on a glass window and a blocking composition 55 introducible by one of the sponges 52, 53.

Figure 8A:
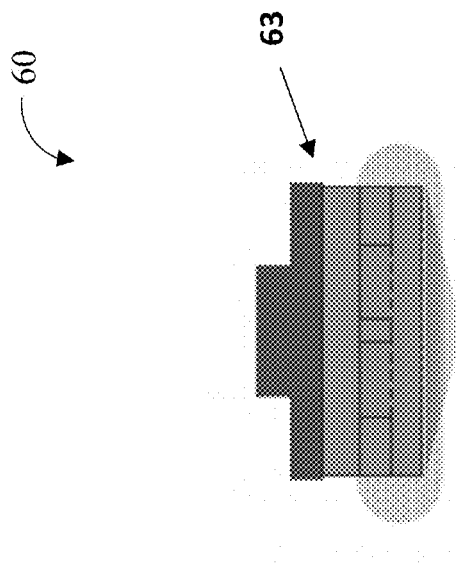
FIGS. 8A-8F show schematics of a series of steps for preparing blocking composition-filled trenches, as described herein.
Figure 8B:
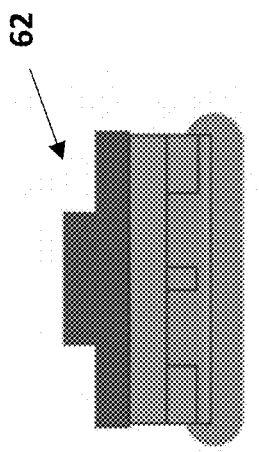
Figure 8C:
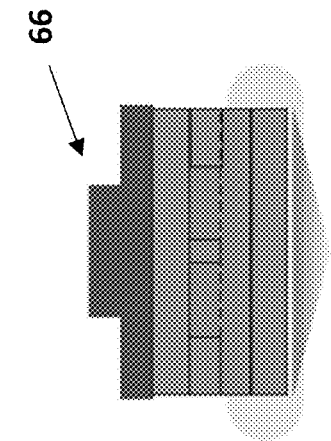
Figure 8D:
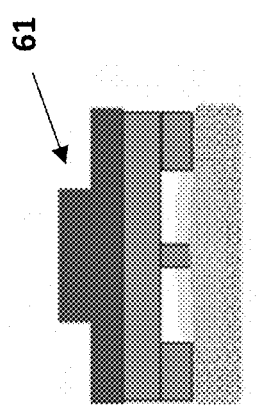
Figure 8E:
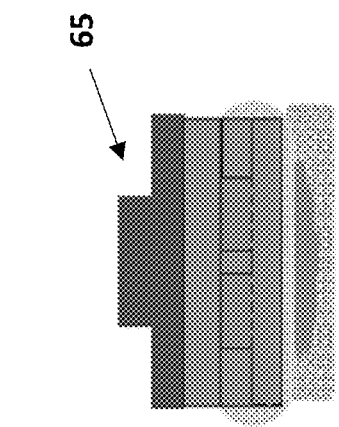
Figure 8F:
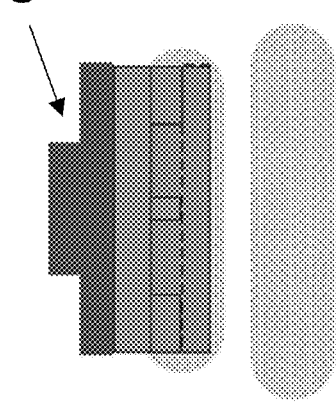

A process 60 for preparing blocking composition-filled trenches is illustrated in FIGS. 8A-8F. In FIG. 8A, a sponge is applied in and around the trenches to remove unwanted resin, at 61. Following this, in FIG. 8B, the part is dipped into a pool of blocking composition to fill the trenches with the blocking composition, at 62. This is a passive method for filling the trenches with the blocking composition. An alternative method for filling the trenches with a blocking composition involves pressing the part against a blocking composition-soaked sponge, which was described above. In FIG. 8C, the part is dipped back into a pool of resin to form a capping layer, at 63. Even though the first capping layer may contain some amount of blocking composition, proper polymerization still proceeds. Optionally, in FIG. 8D, after photopolymerizing the first capping layer, a sponge may be applied to the part to absorb contaminated resin and blocking composition on surfaces of the part, at 64. Additionally, the pool of used resin (first resin) may be replaced with fresh resin (second resin). However, it is not required that the used resin be replaced. If the resin is contained in a large vat, for example, then the contamination by the blocking composition will likely be negligible. That is, the first resin and the second resin recited in the method can be the same resin material and comprise the same resin from the same pool. In FIG. 8E, fabrication of subsequent layers (additional capping layers) continues in a conventional stereolithography manner, at 65. Assuming the resin was replaced in FIG. 8D, at 64, the resin in the additional capping layers is not contaminated with blocking composition, as the previously-used resin (first resin) was replaced with fresh resin (second resin). Additionally, if the first capping layer was only partially encapsulating the trenches (e.g. layer 10 in FIG. 26), then even after performing steps 64 and 65 in FIGS. 8D and 8E, slight leakage of the blocking composition into the fresh resin could proceed during fabrication of subsequent capping layers (e.g., layer 11 in FIG. 26). However, this slight leakage/contamination would be minimal and polymerization of the subsequent capping layers would continue without issue. The fabrication of the stereolithographically printed article is then complete, at 66, as shown in FIG. 8F.

Of note, the exposure dose or layer thickness of the first capping layer can be different from the exposure dose and layer thickness for other layers. For example, the first capping layer can have three times a higher exposure dose and half times the layer thickness of a regular layer thickness. This is done to mitigate adhesin issues in Region 3 of FIG. 9.

Figure 10:
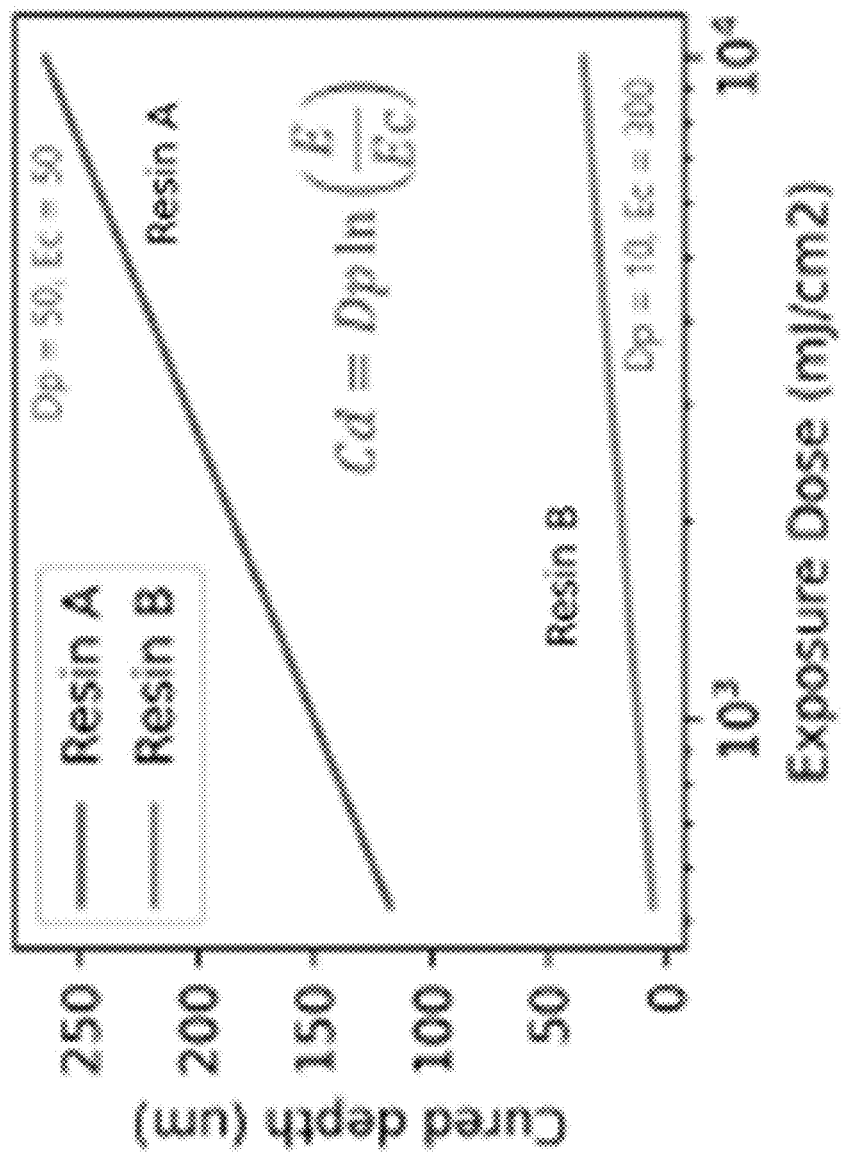
FIG. 10 shows a graph that is a conceptual example of the difference between the resin that is used to fabricate the 3D part and the resin that is used as a blocking composition. In this example, the blocking composition is a photopolymerizable resin. The equation shown in the graph describes how thick the resulting solid polymer will be when the resin is exposed to UV light of a given exposure dose. If the blocking composition is purely a solvent or a non-polymerizable material, then the line for Resin B would be horizontal (the cured depth would be 0 (on the y-axis), independent of the exposure dose (x-axis)).

FIG. 10 illustrates a cured depth versus exposure dose for two different resins (Resin A and Resin B) discussed herein.

Figure 11B:
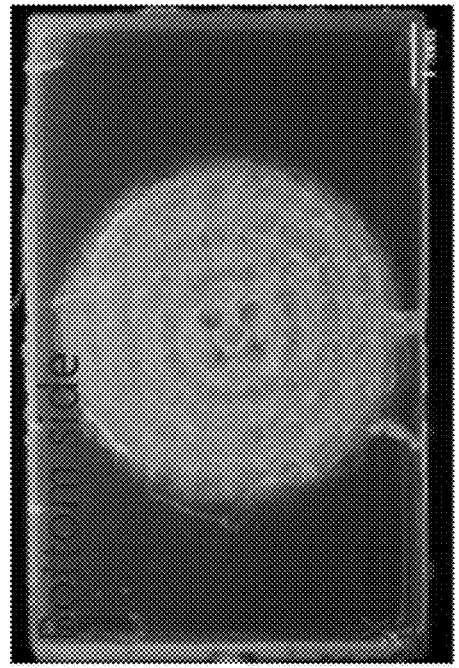
FIGS. 11A-11C show an exemplary fabricated part, which contains a twisted array of channels along the z-direction. The designed twist from top to bottom is 180°. The part was fabricated without a blocking composition and only using a sponge to absorb trapped resin. The process of using a sponge to absorb trapped resin occurred after every 7th layer.
Figure 11A:
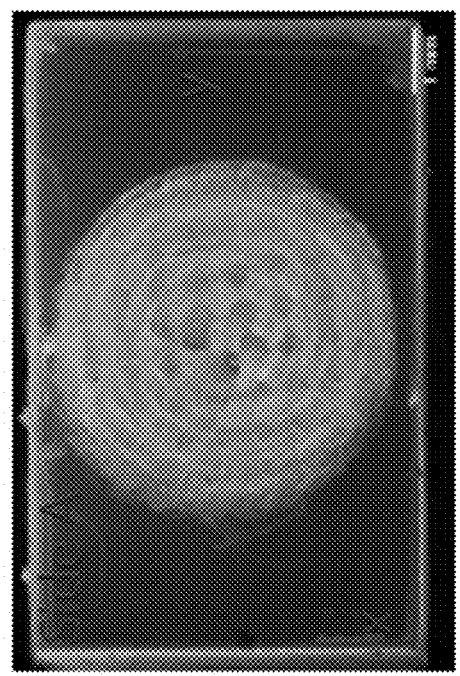
Figure 11C:
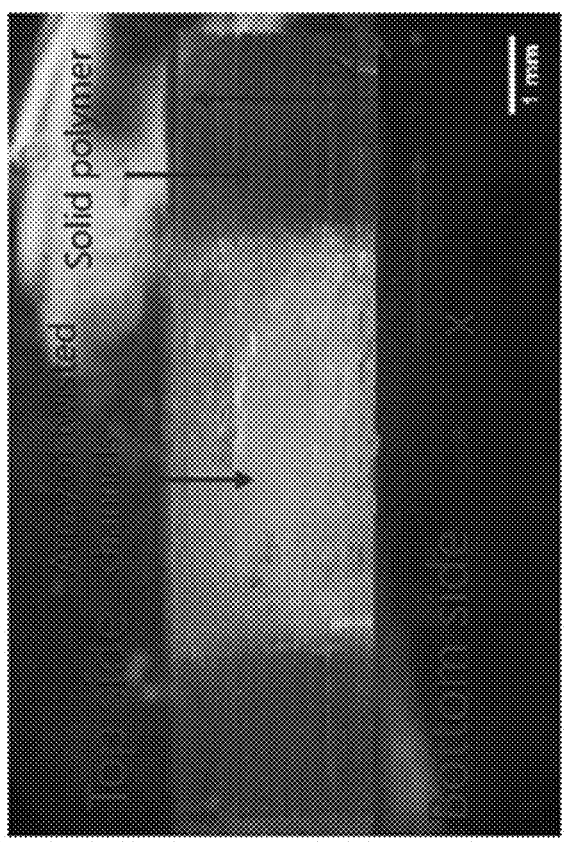

FIGS. 11A-11C illustrate a spherical-shaped hollow region prepared using a method described herein in which one or more layers of cured polymer are prepared by exposing a first resin to UV light, wherein the one of more layers are prepared having one or more trenches. The method further includes contacting the one or more trenches with an absorbent to remove remnant first resin. The method further includes contacting the one or more trenches with a second resin. The method further includes exposing the second resin to UV light to prepare a first cured polymer capping layer, wherein the first cured polymer capping layer encapsulates the one or more trenches. The finished 3D object has one or more hollow regions as shown in FIGS. 11A-11C. The one or more hollow regions can be helical shaped instead, however FIGS. 11A-11C show a spherical-shaped hollow region.

Figure 12:
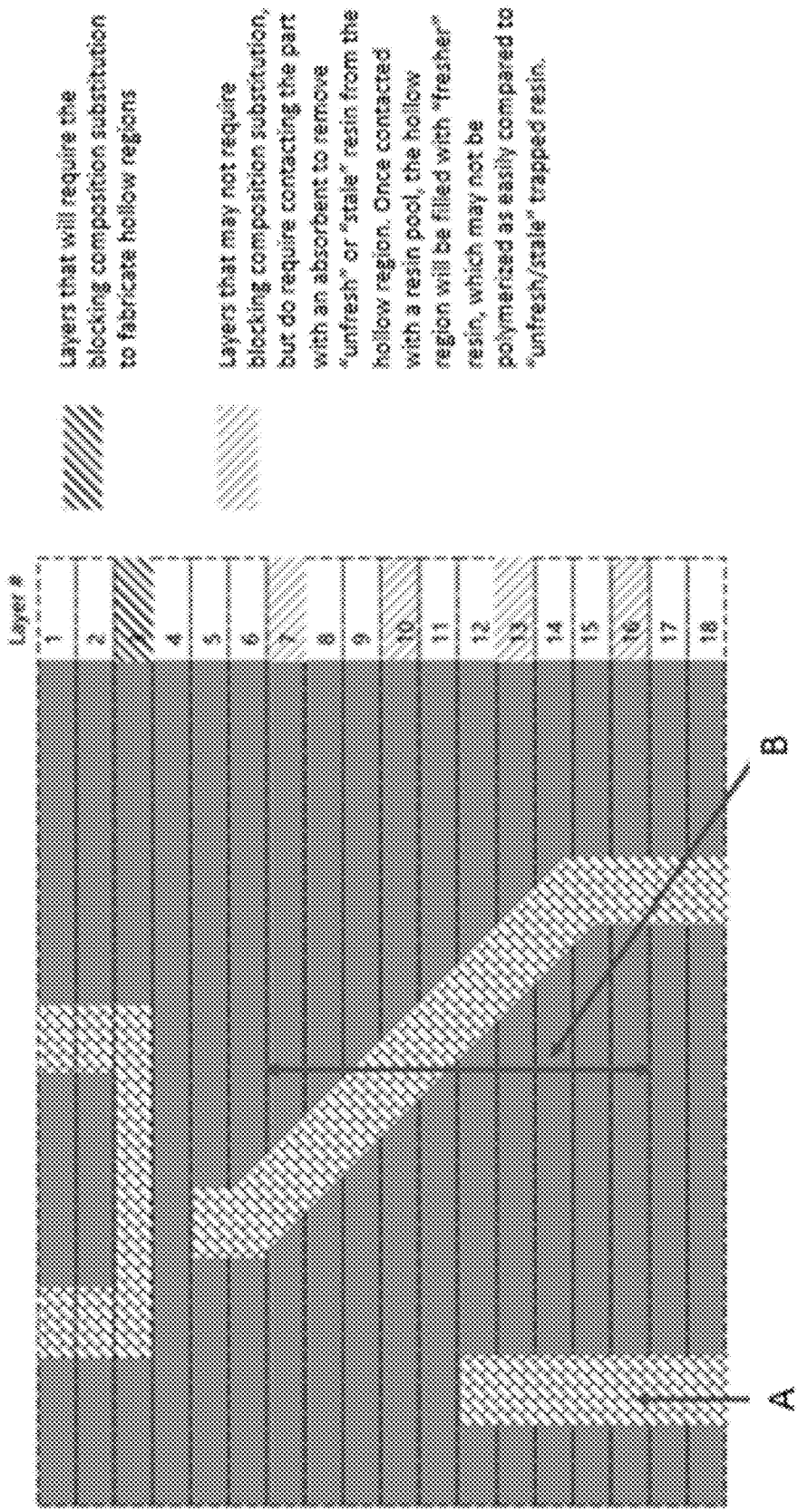
FIG. 12 shows a schematic for preparing a 3D object having hollow regions using an absorbent. A) the fully hollow channel is not prone to print through, so it can be fabricated without a blocking composition, using a sponge. B) After polymerization of every third layer, the trench is contacted with a sponge. The frequency of contact with the absorbent is arbitrarily chosen based on the degree of curvature of the hollow channel, as well as the properties of the resin (i.e. the characteristics of UV light penetration depth).

FIG. 12 shows a schematic of a stereolithographic process in which the absorbent is a sponge. An exemplary setup for the application of a sponge to prepare such hollow regions is provided in FIGS. 13A and 13B. Briefly, the unwanted, trapped resin in the trenches is transferred to the absorbed (e.g. sponge) due to capillary forces. Fabrication of the part continues without having to introduce a blocking composition into the trenches. The trenches can then be partially filled with resin by dipping the part into a resin-filled pool or vat. The second resin coats and slightly fills the trenches as a result of capillary forces. See, for example, layer 12 in FIG. 12.

Figure 13A:
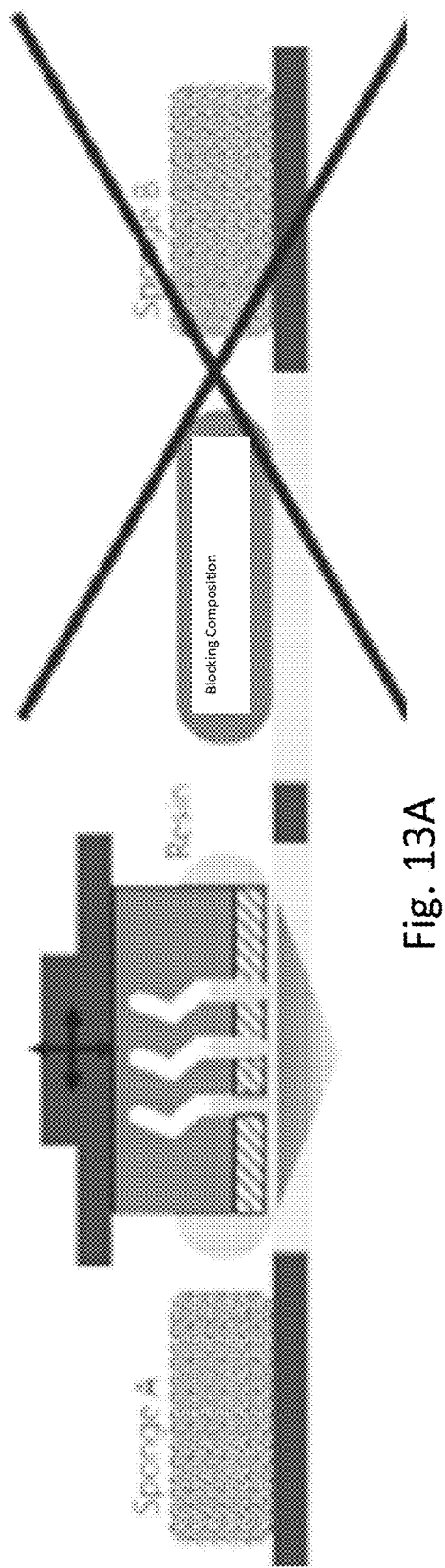
FIGS. 13A and 13B show a schematic of a process for preparing 3D objects having helical-shaped hollow regions with the application of a sponge, as shown in FIG. 13B.
Figure 13B:
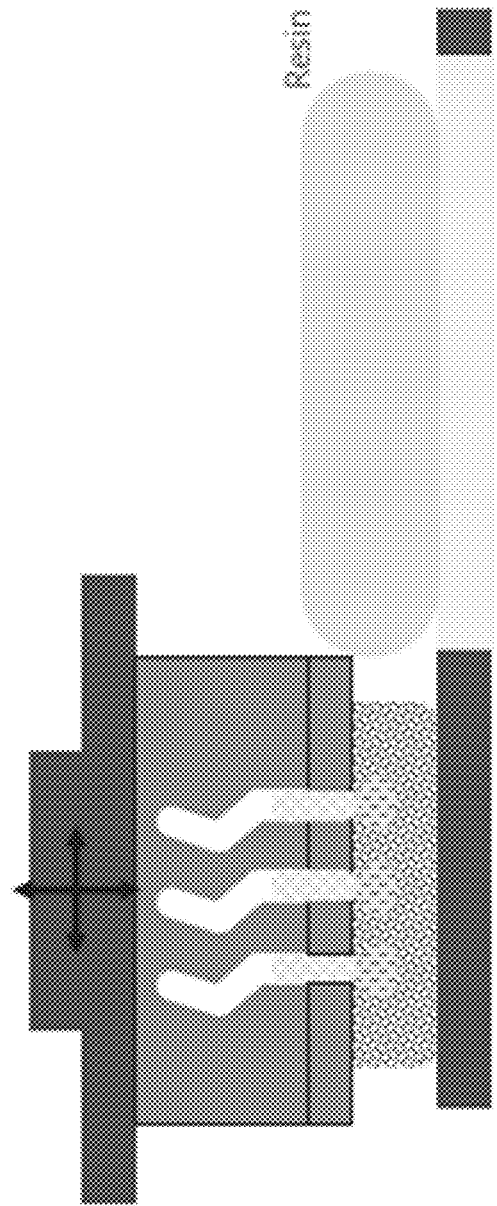

An example embodiment for filling trenches of a part with a blocking composition through application of a sponge is provided in FIGS. 13A and 13B. As shown in FIGS. 13A and 13B, an absorbent, such as a sponge or foam, can be soaked with a blocking composition (or resin, in certain embodiments), and manifested into a roller to dispense the material into trenches of a part upon mechanical pressing. Briefly, the roller is soaked with materials (i.e., blocking composition) from a vat. When the part is pressed against the continuously rotating sponge roller, excess blocking composition is squeezed out and transferred to the part. Trenches in the part are filled with the blocking composition. Furthermore, the roller, with the addition of a doctor blade, can help level out the blocking composition on the part surface.

Figure 14:
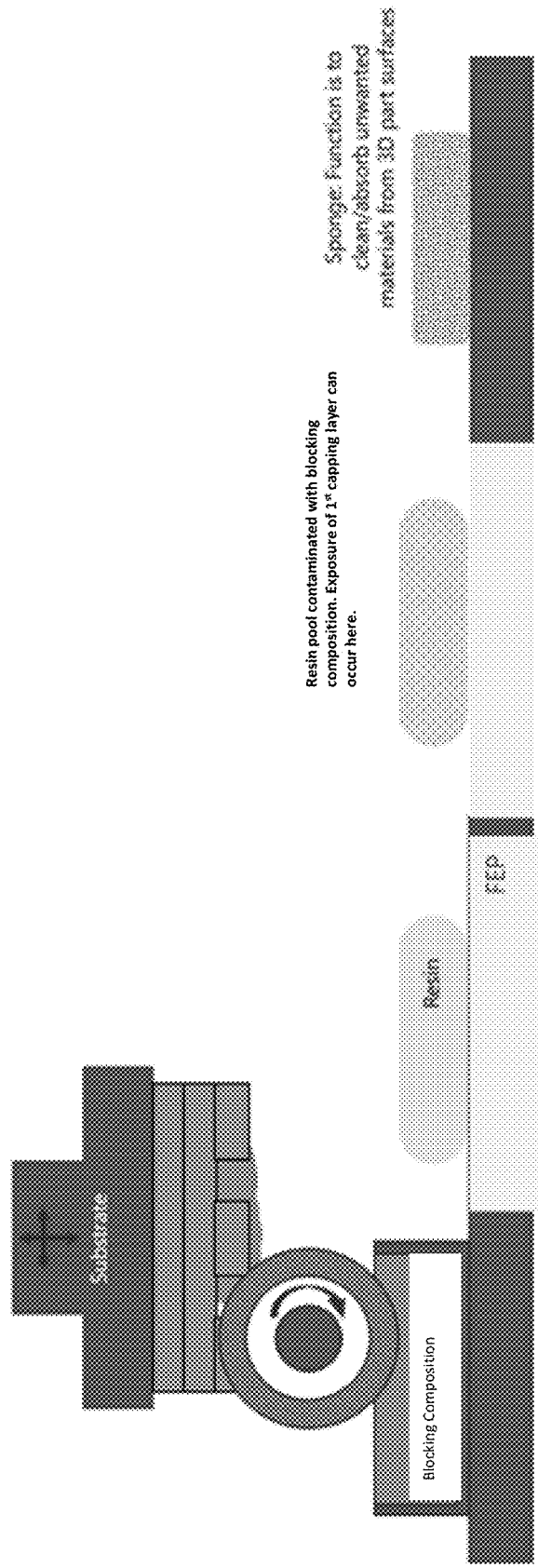
FIG. 14 shows a schematic for sourcing a blocking composition using an absorbent-roller apparatus.

FIG. 14 is a schematic illustration of a process for sourcing a blocking composition using an absorbent-roller apparatus. In FIG. 14, the process includes the roller rotating and/or translating across a source of the blocking composition and thereafter rotating and/or translating across the trenches in order to dispose the blocking composition into the trenches.

As described herein, the blocking composition can serve several functions. In certain embodiments, the blocking composition functions as a substituent or diluent for trapped or stale resin in desired hollow regions. When the blocking composition is a substituent, then it is likely inert to UV polymerization, such as a solvent (i.e. isopropanol), or is slow to react (i.e. a monomer without initiator). In certain embodiments, the blocking composition can act as a diluent (i.e. isopropanol). In this case, resin mixed with the blocking composition in hollow regions will be slower to react or may polymerize into microparticles instead of a full bulk solid, which may be easier to remove. In certain other embodiments, the blocking composition is an inhibitor for polymerization of resin that is diffused, trapped, or mixed in hollow regions. In other embodiments, the blocking composition is a UV blocker/absorber. In certain embodiments, the blocking composition is a polymerization reducer (i.e. a UV blocker/absorber). In certain embodiments, the blocking composition can be a photopolymerizable resin; however, it is critical that the blocking composition contain a higher concentration of absorber/dye than the base resin, as the purpose of the blocking composition is to function as a UV blocker, absorber, or inhibitor.

The blocking composition can be insoluble, slightly soluble, or even miscible with the resin used in the 3D printing process (first resin, second resin, etc.). The blocking composition can be insoluble in the resin so that it effectively stays trapped in the trenches. However, blocking compositions that are miscible with the resin will also successfully produce hollow regions using the methods described herein. For example, a blocking composition can be a resin that is miscible with the first or second resin and which contains a much higher concentration of photoabsorber than the resin. The high absorber concentration in the blocking composition helps prevent the hollow regions from being polymerized. When the blocking composition is miscible with the resin, then a partial mixture of the blocking composition and resin occurs, with a gradient of absorber concentration developing from one end of the trench to the polymerization surface. However, the bulk of the blocking composition will remain trapped in the trenches with only a small amount leaking out and mixing into the second resin.

In certain embodiments of the above stereolithographic method, the blocking composition is a liquid that is inert to photopolymerization. In certain embodiments, the liquid that is inert to polymerization is a solvent selected from the group consisting of isopropanol, ethyl acetate, water, ethanol, methanol, acetic acid, formic acid, dimethyl sulfoxide, and n-butanol. In some embodiments, the liquid that is inert to polymerization comprises one or more of: 3M Fluorinert FC-40, 3M Fluorinert FC-70, Solvay Fomblin Y, Krytox vacuum oil, 3M Novec 7000, and/or other suitable materials that are fluorinated, inert, and immiscible with the resin. While some embodiments may use a solvent for the liquid that is inert to photopolymerization, other embodiments use a material that is not a solvent with respect to the resin or other build material. In some embodiments, the material that is inert to photopolymerization may be denser than the resin or other build material. In some embodiments, the material that is inert to photopolymerization may be useful when conducting the fabrication in top-down mode (e.g., UV light projection is from top and substrate moves down as the part grows). While many of the examples and embodiments described herein reflect part fabrication in a bottom-up mode, other embodiments are described herein and still others would be readily understood based on the present disclosure that are in top-down mode.

In certain embodiments of the above stereolithographic method, the blocking composition comprises one or more of the following:
  a) one or more monomers;
  b) one or more initiators;
  c) one or more solvents;
  d) one or more absorbers/dyes; and
  e) one or more inhibitors.

In certain embodiments, the blocking composition further comprises particles, such as ceramic nanoparticles. In certain embodiments, the ceramic nanoparticles are selected from the group consisting of fumed silica particles, barium titanate ($BaTiO_3$), titanium dioxide ($TiO_2$), and alumina ($Al_2O_3$). Without wishing to be bound by theory, it is believed that mixing particles (such as alumina particles) with the blocking composition can make the composition more viscous and therefore less likely to leak out of the trenches and mix with the first or second resin. In addition to modifying the viscoelastic properties of the blocking composition, the particles can act as a UV light absorber or scatterer.

In certain embodiments, for example, the blocking composition is a resin comprising one or more monomers, 0-80 wt % initiator, 0-80 wt % solvents, 0-80 wt % absorbers/dyes, 0-80 wt % inhibitors, and optionally further comprising ceramic nanoparticles. In some examples, a blocking composition can comprise about 50% solvent and about 50% monomer, while in other examples, a blocking composition can comprise about 20% absorber in a monomer and/or in a solvent. Non-limiting examples of monomers are 1,6-hexanediol diacrylate (HDDA) and poly(ethylene glycol) diacrylate (PEGDA). Non-limiting examples of initiators are 4,4'-bis(dimethylamino)benzophenone, thioxanthen-9-one, 1-hydroxy-cyclohexyl-phenyl-ketone, 2,4-Dinitro-1-naphthol, and diphenyl(2,4,6-trimethylbenzoyl) phosphine oxide (TPO). Non-limiting examples of absorbers/dyes are 2,5-bis(5-tert-butyl-benzoxazol-2-yl) thiophene, avobenzone, 2,4-dinitro-1-naphthol, Nigrosin (CI 50415, Solvent black 5), Sudan I, 2-(2H-Benzotriazole-2-yl)-4-methylphenyl, Mayzo BLS 1710, 2-[2-hydroxy-3,5-di-(1,1-dimethylbenzyl)]-2H-benzotriazole, Mayzo BLS 234, Benzenepropanoic acid, 3-(2H-benzotriazol-2-yl)-5-(1, 1-dimethylethyl)-4-hydroxy-, C 7-9-branched and linear alkyl esters, and/or Mayzo BLS 99-2. Non-limiting examples of solvents are isopropanol, ethyl acetate, water, ethanol, methanol, acetic acid, formic acid, dimethyl sulfoxide, and n-butanol. Non-limiting of inhibitors include hydroquinones such as tert-butylhydroquinone, methylhydroquinone, ethylhydroquinone, methoxyhydroquinone, ethoxyhydroquinone, monomethylether hydroquinone, propylhydroquinone, propoxyhydroquinone, and n-butylhydroquinone.

In certain embodiments, the blocking composition is selected from the group consisting of glycerol, ethylene glycol, HDDA (1,6-hexanediol diacrylate), PEGDA (polyethylene glycol diacrylate), HDDA or PEGDA with Sudan I absorber (e.g., with 0.1 wt %-1.2 wt % Sudan I absorber), HDDA or PEGDA with Sudan I absorber (e.g., with 0.1 wt %-1.2 wt % Sudan I absorber) and TPO initiator (e.g., with 0.1 wt %-1.0 wt % TPO initiator), and HDDA with fumed silica particles. In certain other embodiments, the blocking composition comprises polyethylene glycol or HDDA monomer with fumed silica particles. In certain other embodiments, the blocking composition is a resin comprising 0.1-0.5 wt % initiator (e.g.), 0.1-0.5 wt % absorber (e.g.), and further comprising/the remainder comprising HDDA. In certain embodiments, the blocking composition can comprise about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, or greater than about 2.0 wt % absorber/dye. In certain embodiments, the blocking composition can comprise about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, or greater than about 2.0 wt % initiator. In certain embodiments, the blocking composition can comprise about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, or greater than about 2.0 wt % inhibitor.

In certain other embodiments, the blocking composition comprises silicone oil or polydimethylsiloxane (PDMS). When PDMS solid is made, a silicone elastomer liquid is mixed with a curing agent. After heating, the liquid becomes solid. However, the original liquid is still highly viscous.

Figure 9:
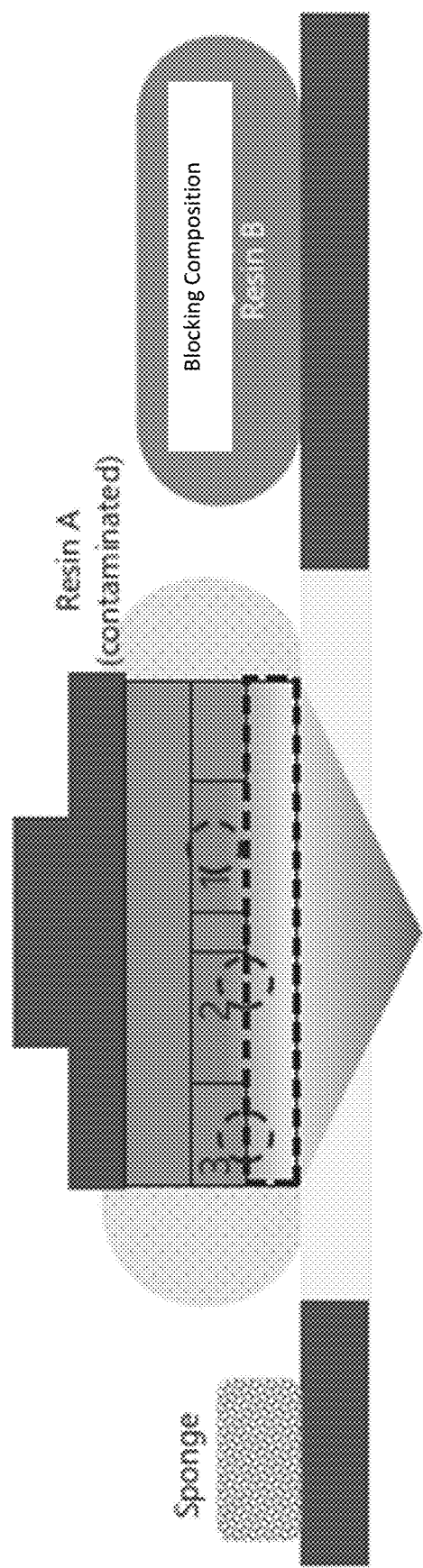
FIG. 9 shows a schematic of blocking composition substitution in the trenches of a semi-printed 3D object. The regions of blocking composition occupancy (1, 2, 3), are described herein.

Particular regions of blocking composition occupancy within the trenches and their interactions with the greater part (e.g. base layers and capping layers) are illustrated in FIG. 9. In Region 1, blocking composition residing in the hollow regions prevents unwanted polymerization. This concept can be further leveraged by increasing the inhibitors, absorbers, and/or dyes in the blocking composition. Reduction of the blocking composition reactivity can be further achieved, in certain embodiments, for example, by using a solvent instead of a monomer. In Region 2 of FIG. 9, leakage of the blocking composition out of the channel or diffusion of resin into the channel causes a mixture or a gradient and may increase the likelihood of print through. Such risk of print through can be mitigated, however, by increasing the inhibitors, absorbers, and/or dye in the blocking composition. The risk of print through can also be reduced by increasing the viscosity of the blocking composition, by using a slurry or gel, for example. In Region 3 of FIG. 9, the first capping layer comprises resin contaminated with the blocking composition. This contamination is caused by mixing of the blocking mixture and the resin, resulting in a gradient of the two materials and its components. Such contamination can be mitigated by reducing the layer of thickness of the first capping layer, increasing the UV exposure dose, decreasing the absorber in the blocking composition, and/or introducing a photo-initiator (or increasing the amount of photo-initiator) in the blocking composition to act as a glue, for example. This increases the reactivity of the resin as well as the likelihood that the polymerized layer formed by the second resin will adhere to the previous layer.

High absorber gradient from the blocking composition decreases adhesion of the capping layer to the previous layer. The reason for this is as follows: there are largely two competing factors in formulating the blocking composition. Generally, it is desirable to increase the absorber concentration in the blocking composition so that if there is any mixture or diffusion of the first or second resin into the hollow region, the higher absorber concentration will block more of the UV light and reduce the reactivity and prevent polymerization into the channels. However, it is also desirable for the capping layer to adhere strongly to the previous layer. Here, the previous layer with the trenches is filled with blocking composition. The issue is that some of the blocking composition will leak out and mix into the resin. If the concentration of absorber in the blocking composition is high, then the blocking composition/resin mixture at the capping layer interface will be high, which will decrease the adhesion strength of the capping layer.

In certain embodiments of the above method, the blocking composition is removed by vacuum. In certain other embodiments, the blocking composition is removed by submerging the part in solvent and applying sonication. Depending on the application, the hollow regions can be designed to form a continuous path towards the outside of the 3D part (see, for example, FIGS. 25A and 25B, and FIG. 26). For example, if the fabricated part is for microfluidic channels, then the formed channels are the hollow regions that will have the blocking composition trapped in it. However, there will be inlet/outlet ports for these channels in the 3D object. It is possible to connect a vacuum to these inlet/outlet ports to suck up and remove the blocking composition from the channels. In certain other embodiments, solvent can be injected into the inlet/outlet ports to flush out the blocking composition. In certain other embodiments, the part can be placed in a container filled with solvent, such as a beaker, and then inserted into a sonicator. Over time, the solvent in the container will mix into the channels and the blocking composition will emerge. Following this, the solvent/blocking composition can be vacuumed out or evaporated from the part.

Figure 25B:
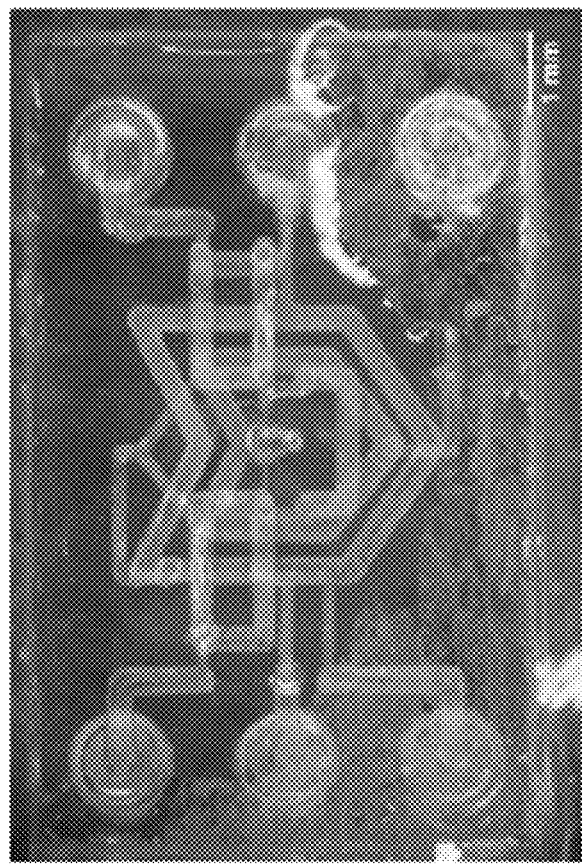
FIGS. 25A and 25B show different views of a CAD model of a device with complex 3D hollow geometries (see, FIG. 25A) and a device with complex 3D hollow geometries (see, FIG. 25B) fabricated using the methods described herein.
Figure 25A:
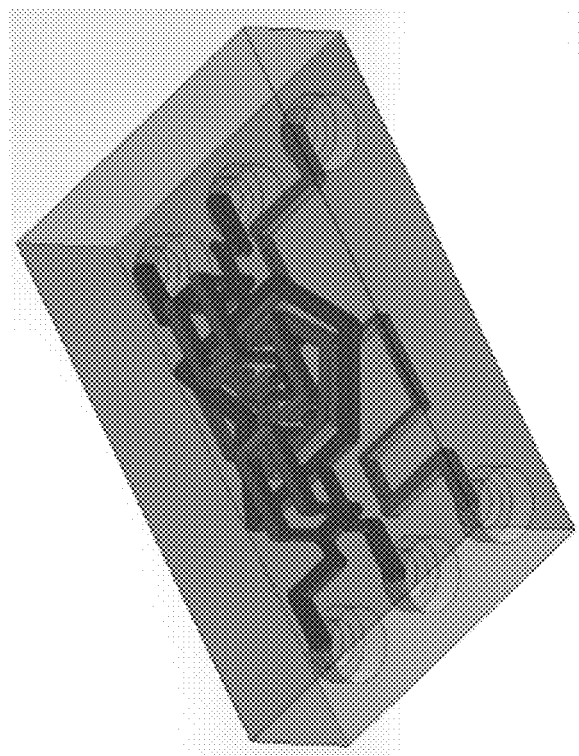

In certain embodiments, the subject matter described herein is directed to a 3D object prepared by the above stereolithographic method (FIGS. 25A and 25B).

Methods for Preparing a Multi-Material 3D Object with a Blocking Composition

In certain embodiments, the subject matter described herein is directed to a stereolithographic method for preparing a multi-material 3D object, comprising:
  preparing one or more layers of cured polymer by exposing a first resin to UV light;
  wherein the one of more layers are prepared having one or more trenches;
  filling the one or more trenches with a blocking composition to form one or more blocking composition-filled trenches;
  wherein filling the one or more trenches with a blocking composition to form one or more blocking composition-filled trenches comprises contacting the one or more trenches with a blocking composition-infused absorbent, wherein blocking composition is extracted from the absorbent and inserted into the one or more trenches;
  contacting the surface of the blocking composition of the one or more blocking composition-filled trenches with a second resin; and
  exposing the second resin to UV light to prepare a first cured polymer capping layer, wherein the first cured polymer capping layer encapsulates the one or more blocking composition-filled trenches;
  wherein the blocking composition is different from the first resin and the second resin; and wherein a multi-material 3D object is prepared.

In certain embodiments of the above method, the blocking composition is a thermally curable resin, wherein the method further comprises heating the 3D object to thermally cure the blocking composition. In certain embodiments, the heating proceeds in a furnace. In certain embodiments of the above method, the thermally curable resin is selected from the group consisting of urethane, epoxy, polyester, and silicone.

In certain embodiments of the above method, the blocking composition is a photopolymerizable resin. In certain embodiments of the above method, the photopolymerizable resin is a PEGDA monomer comprising a photo-initiator without absorbing dye.

In certain embodiments of the above method, the blocking composition is selected from the group consisting of PEGDA monomer with dispersed PEDOT:PSS particles, PEGDA monomer with dyes or pigments, and water with PEGDA and dispersed PEDOT:PSS particles, or combinations thereof. In certain embodiments, the dyes or pigments are a fluorescent red dye.

In certain embodiments of the above method, prior to contacting the one or more trenches with a blocking composition, the method comprises contacting the one or more trenches with a first absorbent to remove remnant first resin.

In certain embodiments of the above method, the method further comprises preparing one or more additional capping layers of cured polymer disposed on the first cured polymer capping layer.

In certain embodiments of the above method, a multi-material 3D object is prepared.

In certain embodiments, the subject matter described herein is directed to a stereolithographic method for preparing a multi-material 3D object, comprising:
  preparing one or more layers of cured polymer by exposing a first resin to UV light;
  wherein the one of more layers are prepared having one or more trenches;
  filling the one or more trenches with a blocking composition to form one or more blocking composition-filled trenches;
  contacting the surface of the blocking composition of the one or more blocking composition-filled trenches with a second resin;
  exposing the second resin to UV light to prepare a first cured polymer capping layer, wherein the first cured polymer capping layer encapsulates the one or more blocking composition-filled trenches;
  wherein the blocking composition is different from the first resin and the second resin;
  wherein the blocking composition does not undergo polymerization; and
  wherein a multi-material 3D object is prepared.

As used herein, "wherein the blocking composition does not undergo polymerization" refers to the above method for preparing a multi-material 3D object wherein a pattern of UV light is not directly exposed to the blocking composition.

In certain embodiments of the above method, filling the one or more trenches with a blocking composition to form one or more blocking composition-filled trenches comprises submerging the one or more trenches in the blocking composition.

In certain embodiments of the above method, filling the one or more trenches with a blocking composition to form one or more blocking composition-filled trenches comprises contacting the one or more trenches with a blocking composition-infused absorbent, wherein blocking composition is extracted from the absorbent and inserted into the one or more trenches.

In certain embodiments of the above method, the absorbent is a sponge, rubber, foam, or brush.

In certain embodiments of the above method, filling the one or more trenches with a blocking composition to form one or more blocking composition-filled trenches comprises applying the blocking composition to the trenches using a pump, pipette, or syringe.

In certain embodiments of the above method, contacting the surface of the blocking composition of the one or more blocking composition-filled trenches with a second resin comprises submerging the one or more blocking composition-filled trenches in the second resin.

In certain embodiments, the subject matter described herein is directed to a 3D object prepared by the above stereolithographic method.

Methods for Preparing a 3D Object Having Hollow Regions with an Absorbent

In certain embodiments, the subject matter described herein is directed to a stereolithographic method for preparing a 3D object having one or more hollow regions, comprising:
  preparing one or more layers of cured polymer by exposing a first resin to UV light;
  wherein the one of more layers are prepared having one or more trenches;
  contacting the one or more trenches with an absorbent to remove remnant first resin;
  contacting the one or more trenches with a second resin; and
  exposing the second resin to UV light to prepare a first cured polymer capping layer, wherein the first cured polymer capping layer encapsulates the one or more trenches;
  wherein a 3D object having one or more hollow regions is prepared.

In certain embodiments of the above method, the one or more hollow regions are helical shaped. FIGS. 11A-11C shows a spherical-shaped hollow region prepared using the above method.

In certain embodiments of the above method, the one or more hollow regions span multiple layers. In certain embodiments of the above method, the one or more hollow regions are elongated and parallel to the UV light source. As shown in, inter alia, FIG. 1 and FIGS. 15A-15D, the UV light is generally perpendicular (going along the z-axis) to the polymerization surface (x,y axis). In certain embodiments of this embodiment, the hollow regions are rectangular, wherein the longer dimension of the rectangular shape is parallel to the polymerization surface.

Depending on the desired geometry of the hollow region-containing 3D object to be fabricated, substitution with a blocking composition may not be required. In certain embodiments, such as when preparing a 3D object having vertical hollow channels that are spiral or helical in shape, an absorbent can simply be used to absorb trapped resin from the trenches and prepare hollow regions without the need of a blocking composition. FIG. 12 shows a schematic of this process. In certain embodiments, the absorbent is a sponge. An exemplary setup for the application of a sponge to prepare such hollow regions is provided in FIGS. 13A and 13B. Briefly, the unwanted, trapped resin in the trenches is transferred to the absorbed (e.g. sponge) due to capillary forces. Fabrication of the part continues without having to introduce a blocking composition into the trenches. The trenches can then be partially filled with resin by dipping the part into a resin-filled pool or vat. The second resin coats and slightly fills the trenches as a result of capillary forces. See, for example, layer 12 in FIG. 12. The stale resin in the trenches will be absorbed by the sponge. However, when the part is brought back into contact with "fresh" resin, this fresh resin can slightly fill the trenches or fully fill the trenches. The likelihood of partial air remaining trapped in the trenches as opposed to the trench being fully filled with fresh resin will depend on the geometry of the trenches, surface tension, capillary forces, etc. In certain embodiments, the resin (second resin) is different from the first resin used to prepare the bottom, base layers of the part. In certain embodiments, the first resin is different from the second resin. When the part is placed in a new resin pool, this resin is "fresher" than the previously trapped resin and it has lower susceptibility to being polymerized quickly relative to the previous "stale/unfresh" trapped resin.

Of note, the part does not need to be contacted with an absorbent after fabrication of each layer. Contact with an absorbent may proceed after 5th layer, or every 8th layer for example. It is possible to determine the frequency with which to carry out the absorption step based on the degree of twist in the helical channel of the hollow region and its susceptibility to print through for the resin being used to prepare the object. It is possible to gauge the print through issue based on understanding the resin properties (i.e., the characteristic penetration depth) given by $D_p$ in the equation $C_d = D_p \ln(E_0/E_c)$ (Jacobs, P. F. & Reid, D. T. *Rapid prototyping & manufacturing: fundamentals of stereolithography* (Society of Manufacturing Engineers in cooperation with the Computer and Automated Systems Association of SME, 1992)). However, Gong et al. also proposed a model for estimating the number of capping layers a hollow region can sustain before trapped resin begins to solidify (Gong, Hua, et al. *RSC Advances* 5, no. 129 (2015)).

Additional capping layers can be prepared following generation of the first cured layer by conventional stereolithography means described herein.

In certain embodiments of the above method, a 3D object having hollow regions is prepared.

Figure 16A:
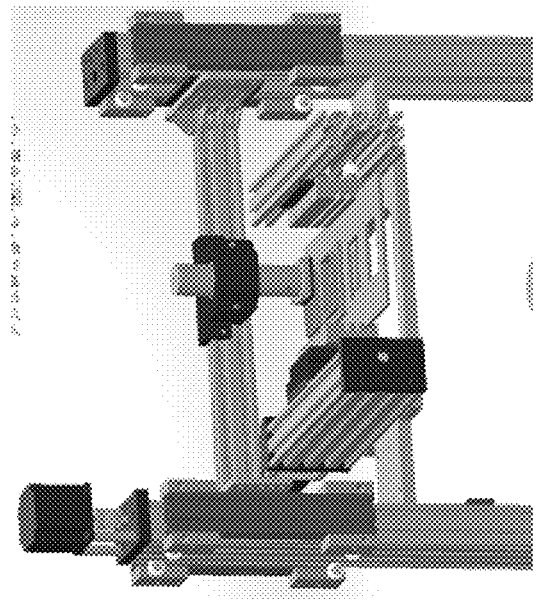
FIGS. 16A-16C show an exemplary stereolithography apparatus displaying the substrate and the vat.
Figure 16B:
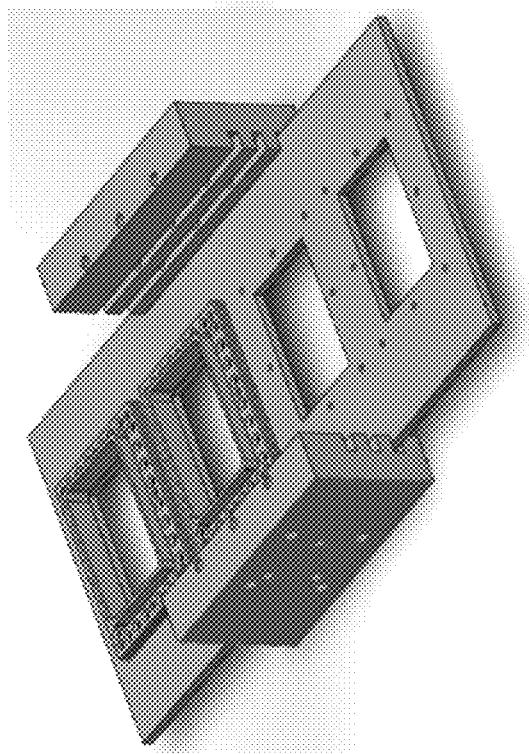
Figure 16C:
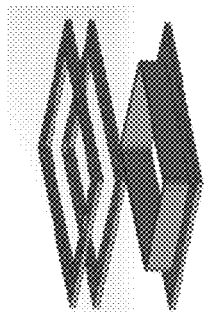

FIGS. 16A-16C show an exemplary stereolithography apparatus displaying the substrate and the vat. In FIG. 16A, an example of a modular vat design is shown. In FIG. 16B, an example of a double modular vat design is shown, which comprises a main containment vat and positions to include sub-vats. FIG. 16C is an image of an exemplary sub-vat design.

Methods for Dispensing or Sourcing a Resin in Preparing a 3D Object Using an Absorbent Material In certain embodiments, the subject matter described herein is directed to a method for dispensing or sourcing a resin in preparing a 3D object by stereolithographic means, comprising:

i) contacting a resin-infused absorbent with a semi-prepared 3D solid polymer object part, wherein resin is released from the resin-infused absorbent to form a resin coating on a surface of the semi-prepared 3D solid polymer object part;

ii) applying UV light to the resin coating, wherein the UV light solidifies the resin coating to prepare an additional polymer layer on the semi-prepared 3D solid polymer object part;

wherein i) and ii) are carried out one or more times to prepare a 3D object.

In certain embodiments of the above method, an absorbent, such as a sponge is soaked with a desired material, such as a resin or blocking composition, which will be incorporated into the 3D object. The material-soaked sponge is used to source or replenish desired materials throughout the 3D printing process. The soaked sponge then dispenses materials upon mechanically pressing the sponge against the part. Further, a squeegee, doctor blade, or vipers, for example, can be used to level out the dispensed liquid on the part surface.

Figures 15A, 15B:
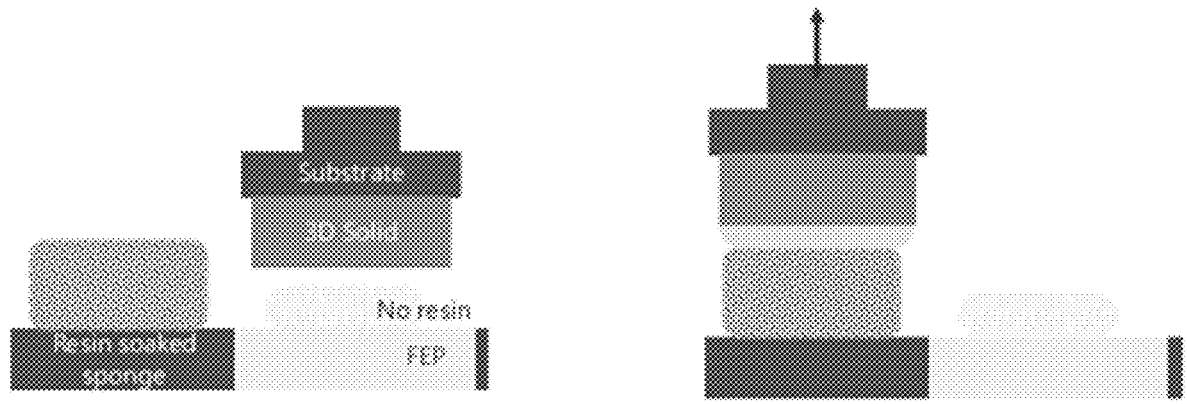
FIGS. 15A-15D show a schematic of a process for sourcing a resin using an absorbent.
Figure 15C:
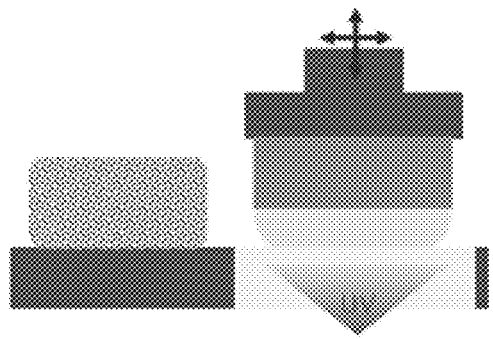
Figure 15D:
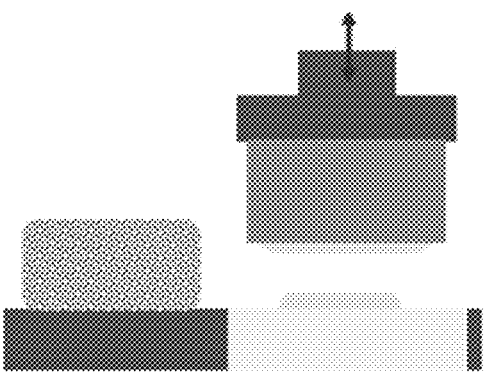

An exemplary method for sourcing a material, such as a photopolymerizable resin, from an absorbent, is provided in FIGS. 15A-15D. As shown in FIG. 15A, the polymerization/exposure surface (FEP) has minimal or no resin. Additionally, the 3D solid surface does not contain any resin. In FIG. 15B, the part is mechanically pressed against a resin-soaked sponge. Resin is then released from the sponge and transferred to the part. The resin released from the sponge adheres to the 3D object due to surface tension. In FIG. 15C, the resin-coated part is transferred to the exposure surface. The transferred resin is constrained between the FEP surface and the solid part, allowing the UV exposure of the next layer. Finally, in FIG. 15D, the prepared 3D solid is separated from the FEP surface. Some residual resin may remain on the FEP surface, as well as on the part. This material sourcing using a sponge can be repeated for the next exposure layer or it can continue by using the residual resin.

In certain embodiments of the above method, the absorbent in the resin-infused absorbent is selected from the group consisting of a sponge, a foam, and a rubber, or a combination thereof. In certain embodiments, the absorbent is a sponge.

In certain embodiments, the absorbent is a foam, which can be "open cell" or "closed cell". Open cell foam is made by incorporating an inflating agent, such as sodium bicarbonate, into a rubber compound. The agent gives off a gas, which expands the rubber during vulcanization. Foam is typically classified as "open cell" when more than half of its cells are open. Non-limiting examples of open cell foam include neoprene and polyurethane. Closed cell foam, conversely, is characterized by a cell enclosed by its walls and lacking an interconnecting structure with other cells. Closed cell foam is commonly made by subjecting a rubber compound to a gas, such as nitrogen, under high pressure. Closed cell foam can also be prepared by incorporating gas-forming materials into the compound. Non-limiting examples of closed cell foams include EPDM, closed-cell neoprene, EPDM/CR/SBR, and PVC/NBR.

The type of absorbent used in the process will often depend on its desired function (i.e. to dispense or absorb), as well as the type of resin applied in the fabrication of the 3D object. For example, open or closed cell, hardness, chemical resistance, chemical compatibility, and textured versus or non-textured, are factors to consider in selecting an absorbent according to the methods used herein. Additionally, the physical properties of the material to be used in fabricating the 3D object, such as the material's viscosity or wettability, are additional factors that should be considered.

In one embodiment, polyurethane and neoprene were tested as absorbents in dispensing materials for 3D object fabrication. Polyurethane was found to be absorbent to resins and solvents investigated. Neoprene, conversely, was found to be highly absorbent for solvents, but a poor absorbent for resins. The neoprene in this case was selected as a feasible absorbent because the resin that the neoprene absorbed from the foam could be easily squeezed out and transferred to the substrate.

In certain embodiments, the subject matter described herein is directed to a 3D object prepared using the above methods.

FIG. 17 illustrates an exemplary sub-vat 70 that can be inverted and placed in a larger, main vat. The sub-vat 70 can include a frame 71 with a sealing gasket or o-ring 72 disposed on a top surface. Clamping plates can be disposed on top of the sealing gasket or o-ring 72, with a transparent window film 74 disposed therebetween. A clamping screw 75 can be disposed through one or more apertures formed through each of the clamping plates 73, the transparent window film 74, the sealing gasket or o-ring 72, and the frame 71 in order to secure these sub-components together and apply pressure to the clamping plates 73 in order to keep the transparent window film 74 securely in place.

Figure 18:
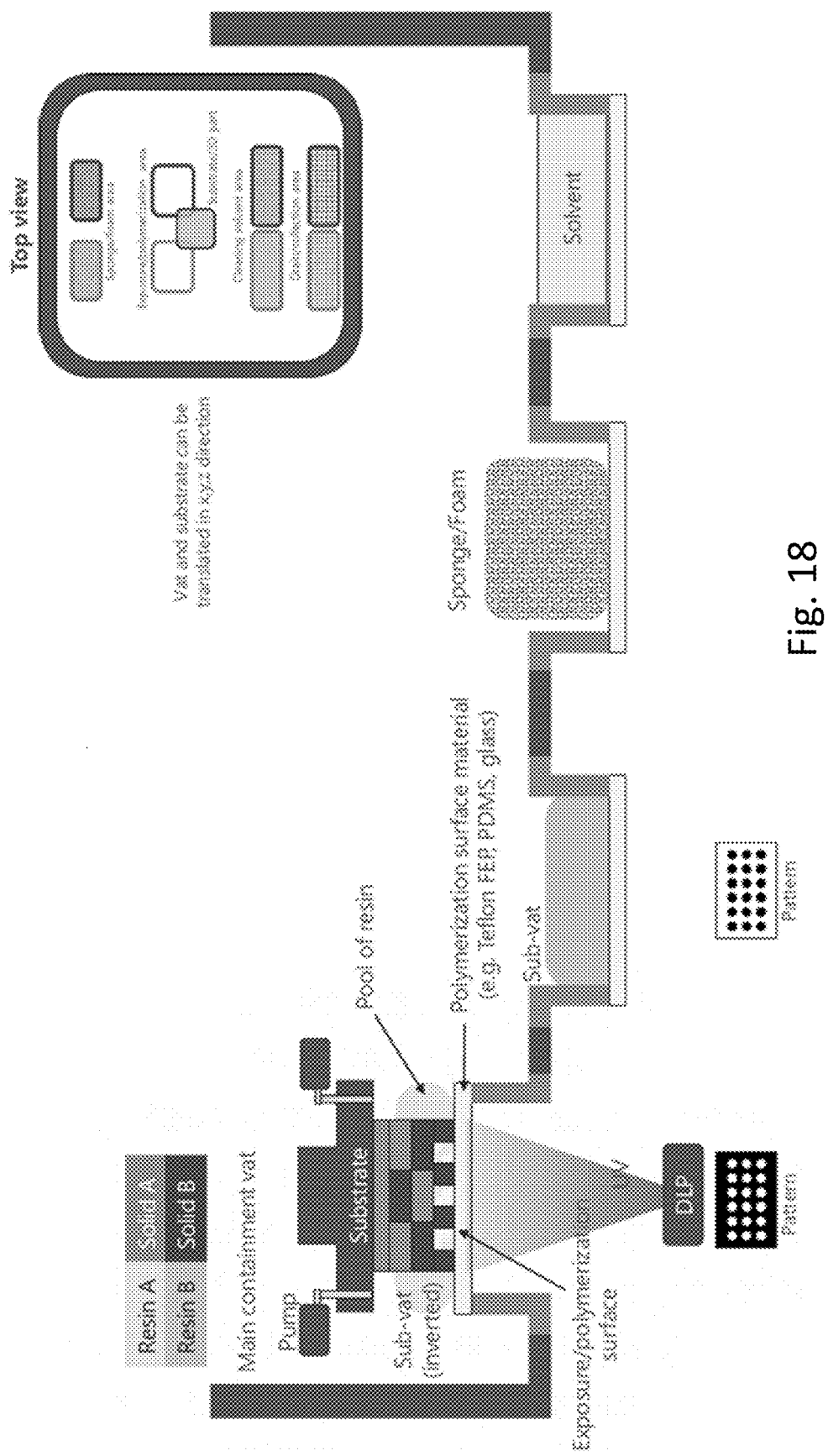
FIG. 18 shows a general schematic of a multi-material stereolithography apparatus described herein.

FIG. 18 shows a general schematic of a multi-material stereolithography apparatus, according to other embodiments. This apparatus can include a sub-vat, such as illustrated in FIG. 17, which can be used as the inverted substrate on which the first layer of resin is disposed and, generally, on which the multi-layer material is formed/supported. A UV light source can be included that disposes light through a window to cure each new layer of resin.

Modular Stereolithography Apparatuses and Methods of Using the Apparatuses

Figure 19:
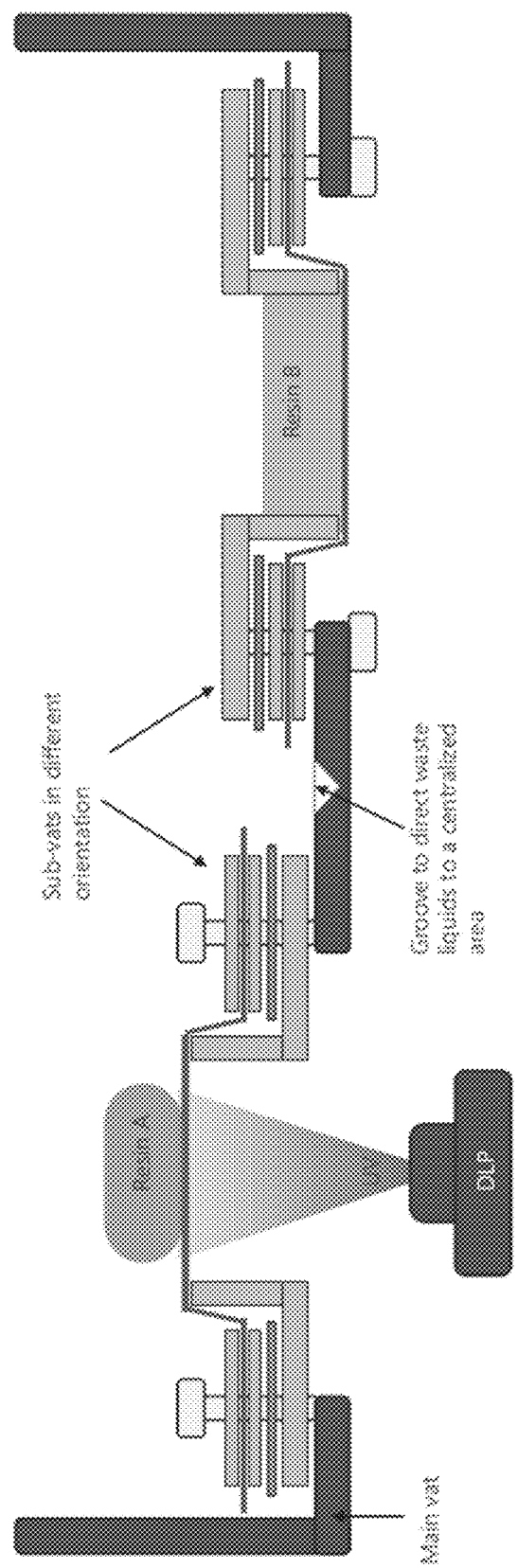
FIG. 19 shows an exemplary modular double vat design for stereolithography, where the sub-vats are invertible.
Figure 20A:
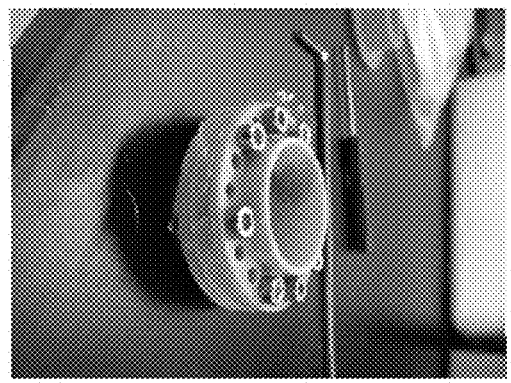
FIGS. 20A-20D show different views of an exemplary prototype of an invertible sub-vat containing FEP (fluorinated ethylene propylene) film as the polymerizable surface.
Figure 20B:
Figure 20C:
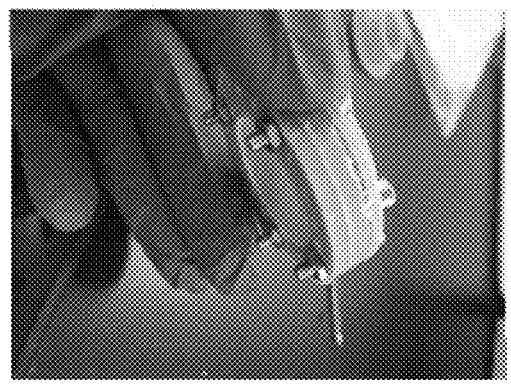
Figure 20D:
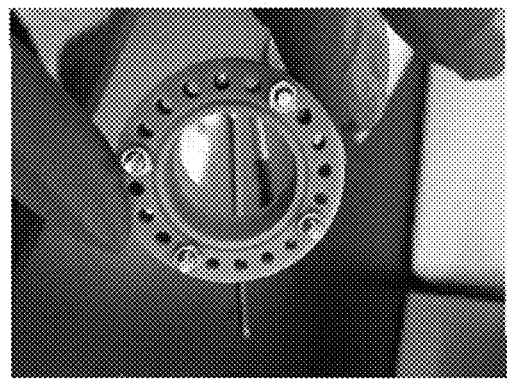

In certain embodiments, the subject matter described herein is directed to a modular stereolithography apparatus (such as shown in FIG. 19), that can comprise:
  a substrate; and
  a central vat, wherein the central vat comprises two or more invertible sub-vats;
  wherein each of the invertible sub-vats can independently be inverted to form a raised surface or upright to remain a vat.

As described in the above modular stereolithography apparatus, the vat modular design contains a main (central) vat, which then contain sub-vats (i.e., invertible vats). In certain embodiments, the apparatus has a double vat design, each containing an invertible vat. The main vat acts as a mounting/housing of sub-vats. In certain embodiments, the main vat acts as a waste collection container, as shown in FIG. 19. Additionally, the sub-vats can be inverted to act as a raised surface, or remain upright as a vat to hold a material. Indeed, the separate sub-vats can serve multiple functions, such as a polymerization surface, a container for materials (e.g., resins and solvents), or a container for an absorbent (e.g. sponge or foam). The absorbent can be used for cleaning, absorbing, drying, or leveling resin(s) applied in the apparatus, as well as any other materials. In the apparatus, a reservoir (an upright vat) can provide the resin, solvents, or other materials desired to be used in the printing process.

In certain embodiments of the above modular stereolithography apparatus, the central vat further comprises a depression for retaining waste generated throughout a stereolithography printing process. In this embodiment, the central vat can act as a unified waste collection area for waste generated from sub-vats. For example, in one embodiment, any excess resin that leaks from the sub-vats can be directed to a centralized location with grooves within the main vat. FIG. 19 shows an exemplary apparatus having such a waste collection area in the central vat.

In certain embodiments of the above modular stereolithography apparatus, the central vat comprises two invertible sub-vats. In one embodiment of the above modular stereolithography apparatus, the two invertible, sub-vats are inverted to form a raised surface. In other embodiments of the above modular stereolithography apparatus, one of the invertible, sub-vats is inverted to form a raised surface and the other of the invertible, sub-vats is upright to remain a vat.

In certain embodiments of the above modular stereolithography apparatus, each of the invertible sub-vats, when inverted to form a raised surface, function as a polymerization surface. In certain embodiments, the polymerization surface comprises a material selected from the group consisting of TEFLON, FEP, PDMS, and glass, or a combination thereof. In certain embodiments, the polymerization surface comprises FEP.

In certain embodiments of the above modular stereolithography apparatus, each of said invertible, sub-vats, when upright to remain a vat, holds a material selected from the group consisting of liquid and an absorbent. The liquid, for example, can be a blocking composition, a solvent, or a resin.

FIGS. 20A-20D show different views of an exemplary prototype of an invertible sub-vat containing FEP (fluorinated ethylene propylene) film as the polymerizable surface. The FEP film is tensioned into the sub-vat. The orientation of the sub-vat attachment into the main containment vat dictates if the sub-vat acts as a container or a "raised" surface.

In certain embodiments of the above modular stereolithography apparatus, the apparatus further comprises one or more external pumps for injecting a material onto a 3D printed part. In certain embodiments, the 3D printed part is a semi-prepared 3D solid polymer object part. In certain embodiments, the material delivered to the 3D printed part is for use in cleaning the 3D printed part, or for use in delivering a material to the 3D printed part that will be incorporated into the 3D part.

In certain embodiments, the material is a resin or a solvent. In certain embodiments, the one or more external pumps are used to supply a material, such as a resin, to the part. In certain other embodiments, the external pumps are used to direct polymerization to a region different from where polymerization is desired. The pumps may also be used, in certain other embodiments, to drain fluid from the apparatus.

Figure 21A:
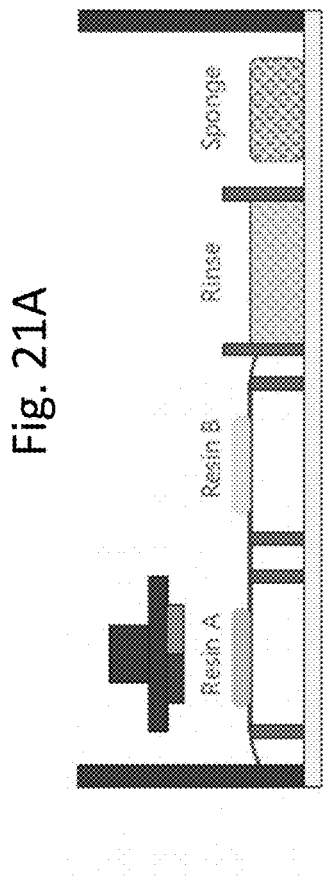
FIGS. 21A-21C show exemplary setups of multi-material stereolithography apparatus described herein.
Figure 21B:
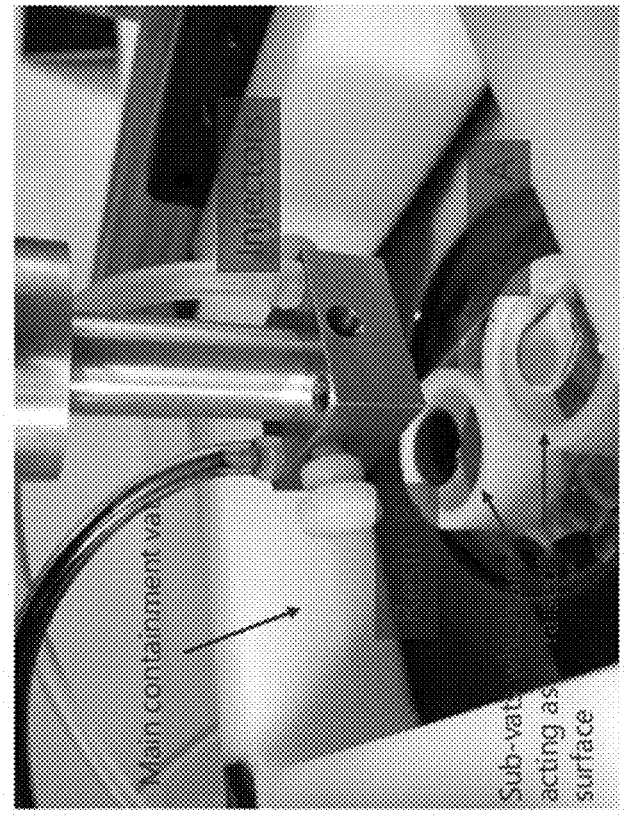
Figure 21C:

FIGS. 21A-21C show exemplary setups of multi-material stereolithography apparatus described herein. Provided in FIG. 21A is a schematic displaying a setup of an apparatus having a substrate, Resin A, Resin B, a vat for rinsing the part between printing with Resin A or Resin B, respectively, and a sponge for further cleaning of the part between using each resin. Shown in FIG. 21B is a multi-material stereolithography setup for printing a material with Resin A and Resin B. The setup contains a main containment vat, which holds sub-vats that are inverted (raised), where polymerization can take place. The setup further comprises pumps for directing a material to the 3D object part. Shown in FIG. 21C is another setup for multi-material stereolithography printing, showing an absorbent (sponge/foam), and a solvent bath for rinsing the part in-between printing with each resin.

Figure 22:
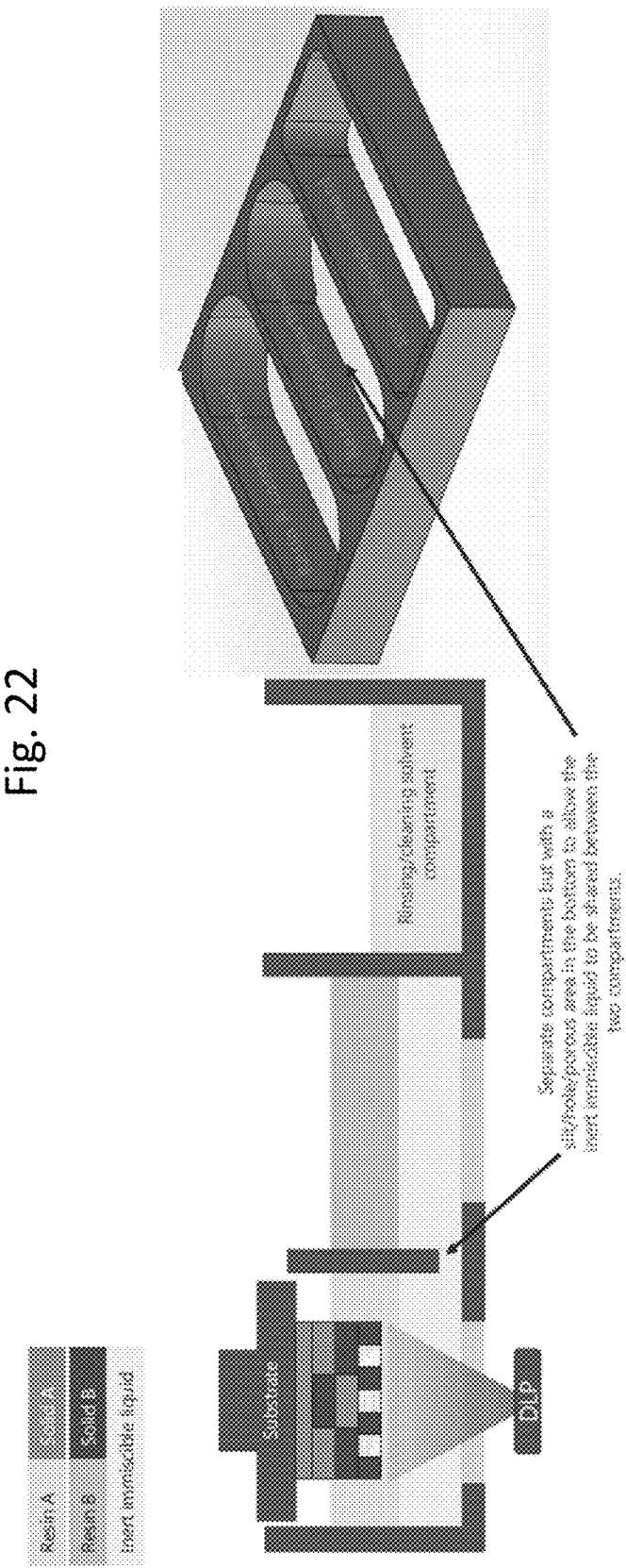
FIG. 22 shows a schematic of how multi-material fabrication can proceed using an inert liquid interface, in which the main vat has separate compartments (sub-vats) for different resins, but the inert liquid is shared between the two compartments using a slit in the bottom of the vat.

FIG. 22 shows a schematic of how multi-material fabrication can proceed using an inert liquid interface, in which the main vat has separate compartments (sub-vats) for different resins, but the inert liquid is shared between the two compartments using a slit in the bottom of the vat.

In certain embodiments of the modular stereolithography apparatus, the apparatus comprises two invertible sub-vats, wherein the invertible sub-vats are adjacent to one another and coupled by a slit in a wall connecting the sub-vats; and wherein each invertible, sub-vat holds an inert immiscible liquid, wherein the inert immiscible liquid is in liquid communication with each invertible sub-vat.

Figure 23B:
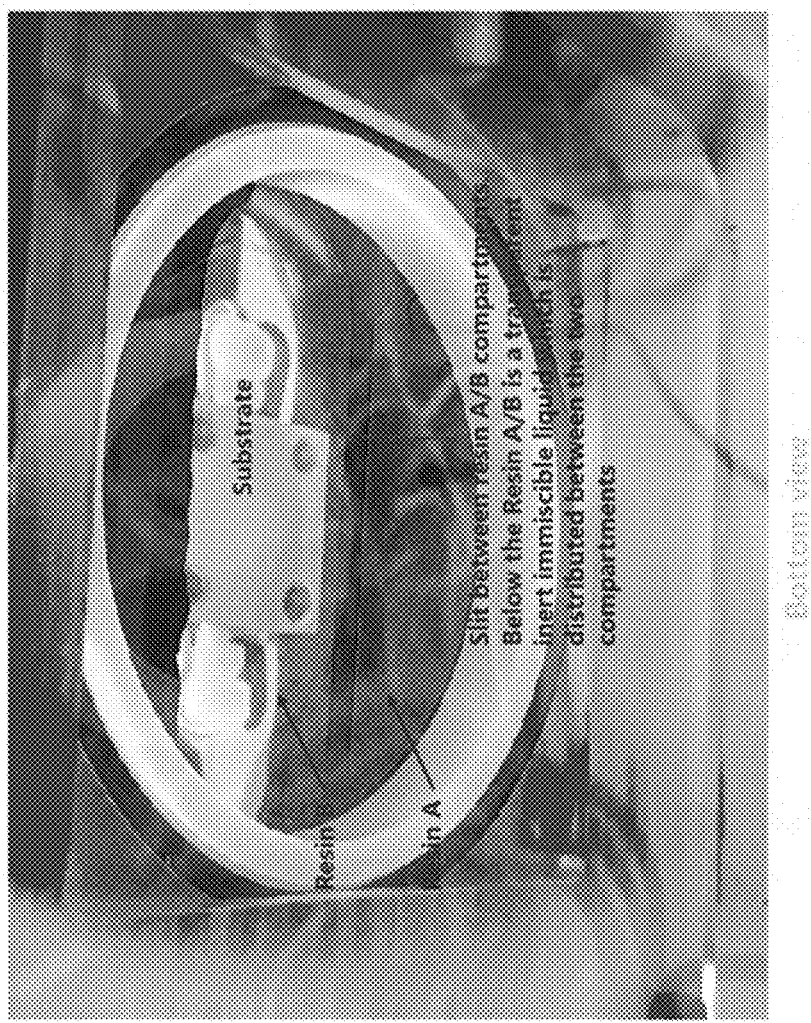
FIGS. 23A and 23B show an exemplary schematic of multi-material fabrication using an inert liquid interface in accordance with the methods described herein.
Figure 23A:
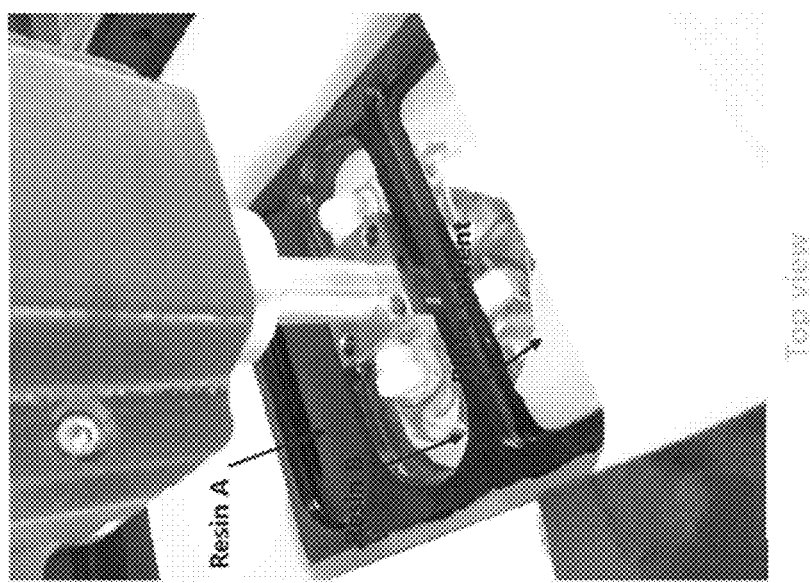

FIGS. 22 and 23A-23B provide a schematic and experimental set-up applying a multi-material stereolithography apparatus when using a liquid constrained interface. As can be seen in FIG. 23B, a slit exists between each of the Resin A and Resin B compartments. Below each of the Resin A and Resin B compartments is a transparent, inert immiscible liquid that is distributed between the two compartments.

Previously-published methods for preparing 3D objects using a liquid constrained interface can be found in WO 2019/140160, the contents of which are incorporated by reference. As shown in FIG. 22 and FIGS. 23A-23B, an exemplary apparatus applies Resin A, Resin B, a rinse solvent, and an inert immiscible liquid. There is a slit between the Resin A and Resin B compartments. Below the Resin A and the Resin B compartments is a transparent inert immiscible liquid, which is distributed between the two compartments. Multi-material fabrication can be achieved using an inert liquid interface as provided in this embodiment, where the central (main) vat contains sub-vats for Resin A and Resin B, but the inert liquid is shared between the two compartments as a result of a slit in the bottom of a wall connecting the vats. In certain embodiments, the slit can be a hole or a porous area. A benefit of this apparatus is that the height of the inert liquid will be the same between the two compartments, which makes substrate leveling for the first layer more facile. This apparatus can be adapted for both multi-material stereolithography and also when using a single material with a blocking composition for creating hollow regions.

In certain embodiments, the subject matter described herein is directed to a method for cleaning and/or priming a part when alternating between different materials in fabrication of a multi-material 3D object, wherein the method leverages surface tension of a polymerization surface and a stereolithography apparatus comprising a central vat comprising at least one invertible sub-vat, the method comprising:

preparing one or more layers of cured polymer by exposing a first resin on a raised, invertible sub-vat comprising a polymerization surface to UV light;

wherein a liquid bridge comprising the first resin forms between the first resin on the polymerization surface and a part comprising one or more cured polymer layers;

laterally translating the part or the polymerization surface; wherein the translating causes the liquid bridge comprising the first resin to translate with the part, but separate itself from the part once it reaches an edge of the raised, invertible sub-vat, and then fall into the central vat;

optionally, injecting a solvent from an external pump to remove remnant first resin from the part comprising one or more cured polymer layers; wherein the solvent rinses away remnant first resin from the part and falls into the central vat;

injecting a second material from an external pump to remove remnant first resin from the part, wherein excess second material falls into the central vat;

wherein delivery of the second material to the part primes the part with the second material.

In certain embodiments of the above method, the second material is a blocking composition or a second resin.

In certain embodiments of the above method, the stereolithography apparatus comprises two invertible sub-vats.

In certain other embodiments, the one or more pumps can be used to leverage the surface tension of the polymerization surface (e.g. FEP) and translation of the vat and sub-vats and/or substrate to discard unwanted waste or deliver materials (e.g. resin), as well as clean the 3D part. As a result of the surface tension of the polymerization surface (e.g. FEP film), a liquid bridge forms between the resin and the 3D part/substrate. Translation of the vat and/or substrate allows unwanted resin pool on the polymerization surface to also be translated due to surface tension. This then allows the unwanted resin to be discarded away into the main containment vat. Pumping of alternate resin or cleaning solvent from an external pump allows unwanted resin contamination to be rinsed away from the 3D printed print. Pumping of alternative resin then allows fresh new resin to be delivered. In certain embodiments, this could also enable the part to be "primed" with new alternate resin. "Priming" is discussed further below.

Experientially, it was discovered that sometimes the trenches contain trapped air bubbles instead of being fully filled with the desired material (e.g. resin or blocking composition). This can happen, for example, when the part is dipped into a pool of liquid too quickly such that air gets trapped in the trenches and is unable to escape. What was found is that when material (i.e. resin or blocking composition) is slowly injected using a pump, a slow-moving, small amount of liquid will "coat" the surfaces due to surface tension and decrease the likelihood of bubbles forming in the trenches. This is known herein as "priming" the part. Once the part is coated with a tiny amount of desired liquid, then it can be dipped in a pool of liquid.

A schematic for providing, rinsing, and removing material using surface tension is shown in FIGS. 24A-24E. Briefly, in FIG. 24A, the "light-colored" pool of resin on the FEP surface needs to be discarded and replaced with "dark-colored" resin. The light-colored resin forms a liquid bridge connecting to the FEP surface and the 3D part. In FIG. 24B, the substrate and/or vat are laterally translated. Due to surface tension, the pool of light-colored resin is also translated towards the edge of the FEP surface. In FIG. 24C, the pool of light-colored resin falls to the bottom of the vat and the FEP surface has no residue of the light-colored resin. In FIG. 24D, the "dark-colored" resin is injected using a pump. Excess injection of the dark-colored resin rinses the 3D part off of any remaining light-colored resin contamination. Excess dark-colored resin falls to the bottom of the vat. Finally, in FIG. 24D, the substrate and/or vat are laterally translated again so that the substrate is above the polymerization surface (FEP) with the dark-colored resin.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 31:
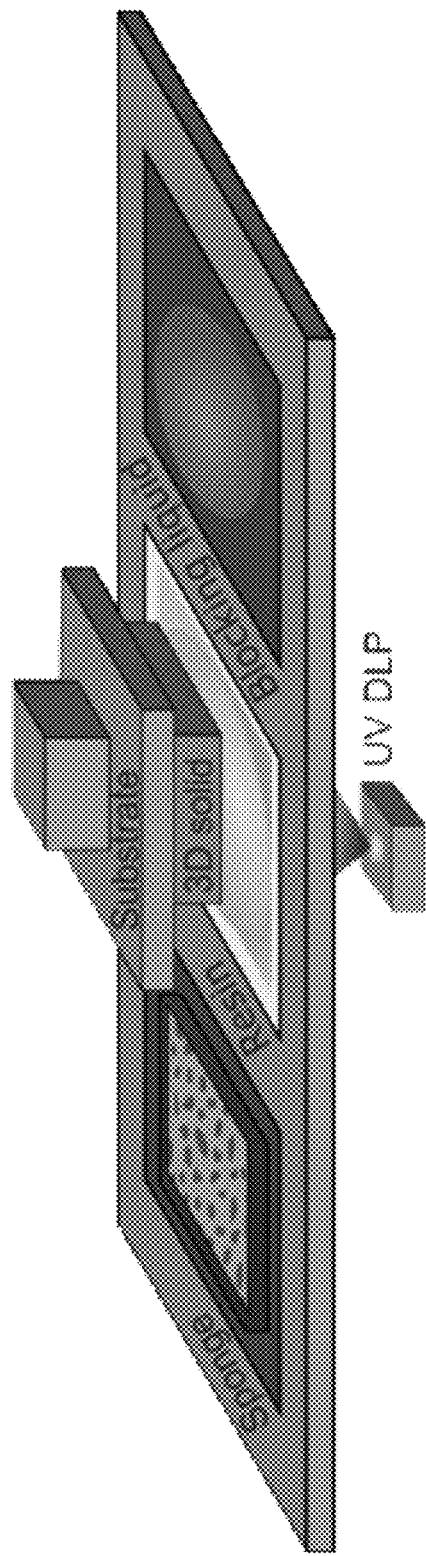
FIG. 31 shows a schematic of a bottom-up stereolithography system used to fabricate hollow geometries. The sponge, resin (light green) and the blocking liquid (orange) are localized on separate regions of a vat which is translatable with respect to the substrate and the 3D part being printed (dark green). The blocking liquid substitution is selectively utilized whenever hollow geometries that are susceptible to print-through are encountered.

Referring now to FIG. 31, a schematic is provided that illustrates the blocking liquid substitution process to fabricate hollow geometries. The trenches in the device are initially fabricated using the conventional stereolithography process. Prior to fabrication of the principal layer—the capping layer that partially or fully encapsulates the hollow regions—the trapped resin in the trenches is substituted with a blocking liquid. The blocking liquid is introduced by first removing the trapped resin from the trenches using a sponge followed by submersing the part in a pool of the blocking liquid. The stereolithography process is resumed by printing the principal capping layer over the trenches filled with the blocking liquid. Following the exposure of the principal layer, the original resin pool can be replaced with fresh resin to mitigate contamination of the resin in the subsequent layers. After completion of the device fabrication, the substituted blocking liquid is flushed out using a solvent or drained using a vacuum. While dissolvable solid supports may also be used to print hollow spaces, our process avoids the need to design dissolvable resin systems, and the use of a liquid instead of a solid facilitates easier removal from complex micrometer scale hollow geometries.

Figure 32:
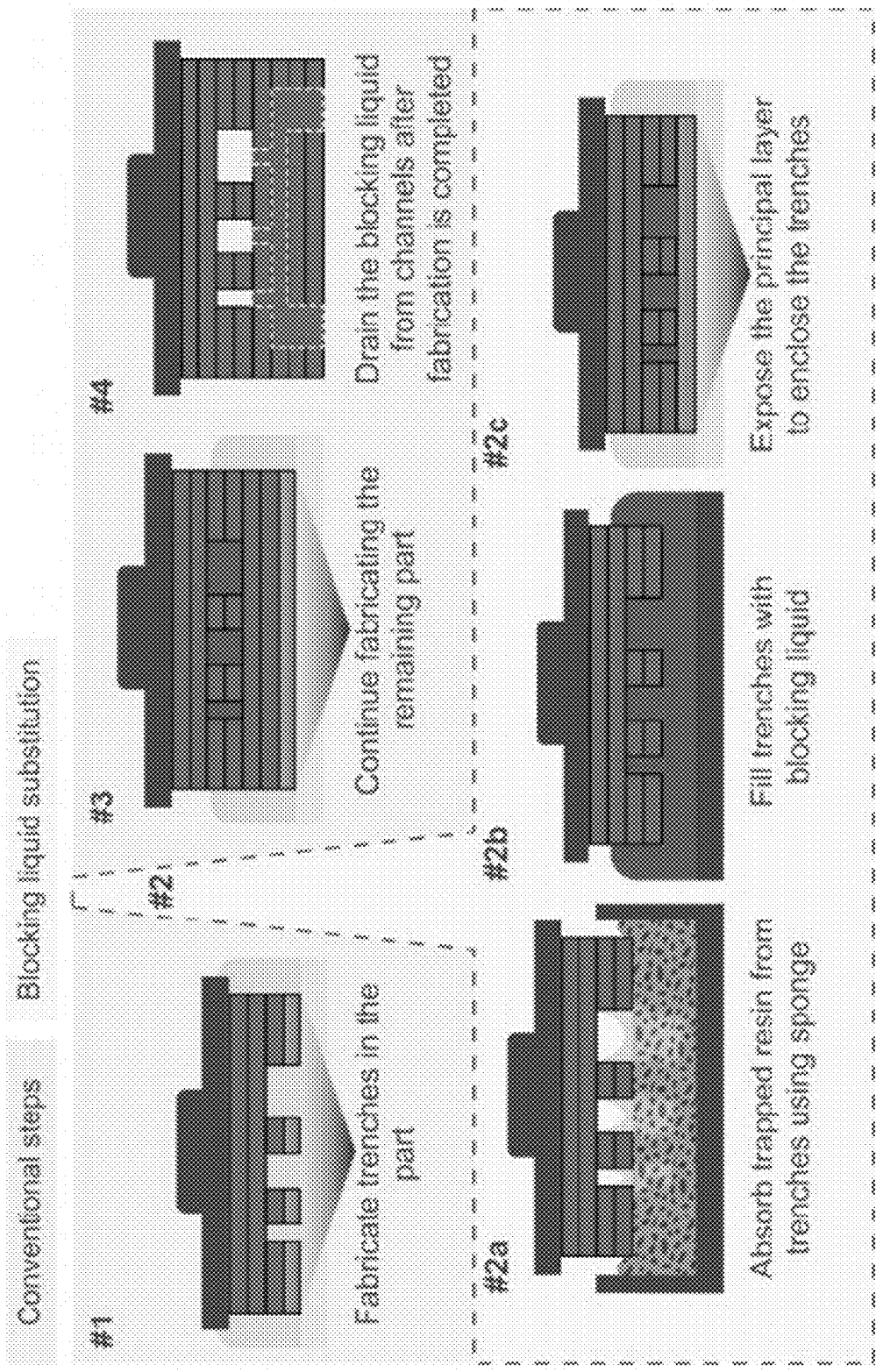
FIG. 32 shows a schematic of a stereolithography method used to fabricate hollow geometries. The sponge, resin (light green) and the blocking liquid (orange) are localized on separate regions of a vat which is translatable with respect to the substrate and the 3D part being printed (dark green). The blocking liquid substitution is selectively utilized whenever hollow geometries that are susceptible to print-through are encountered.
Figures 33A, 33B:
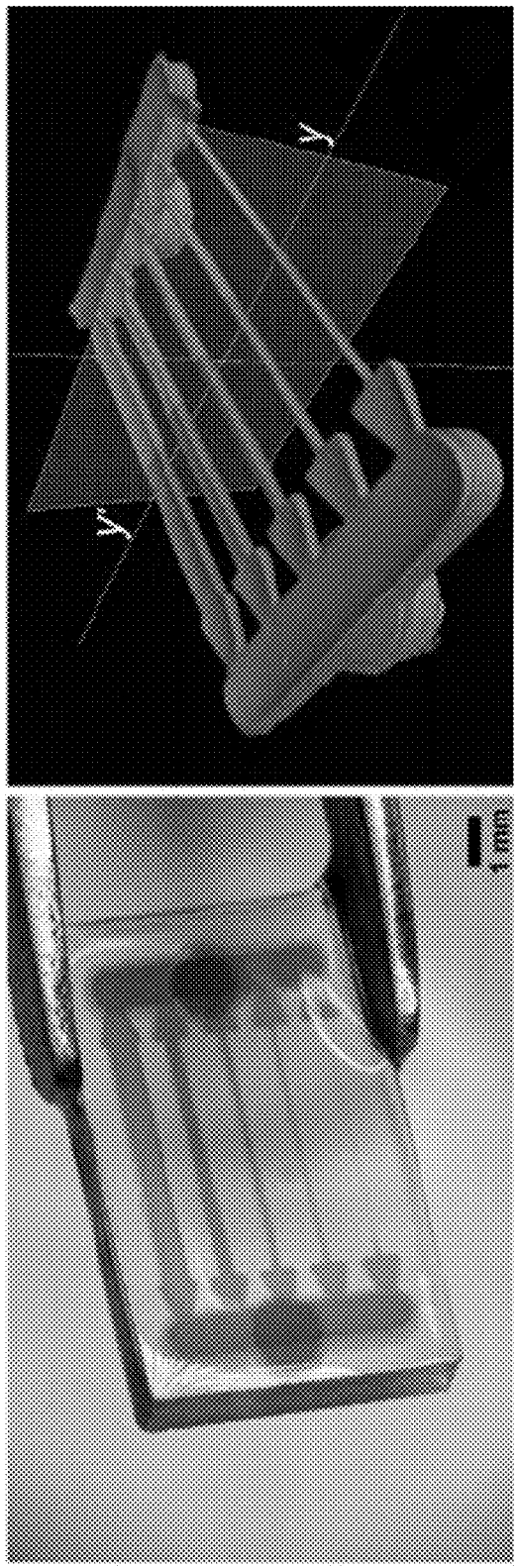
FIG. 33A shows a printed device (transparent) containing microfluidic channels that are filled with the substituted blocking liquid (orange).
FIG. 33B shows a reconstructed 3D rendering of the hollow microfluidic channels (blue) of a printed device which was characterized using Nano-CT imaging after the substituted blocking liquid was drained out of the channels.
Figure 34:
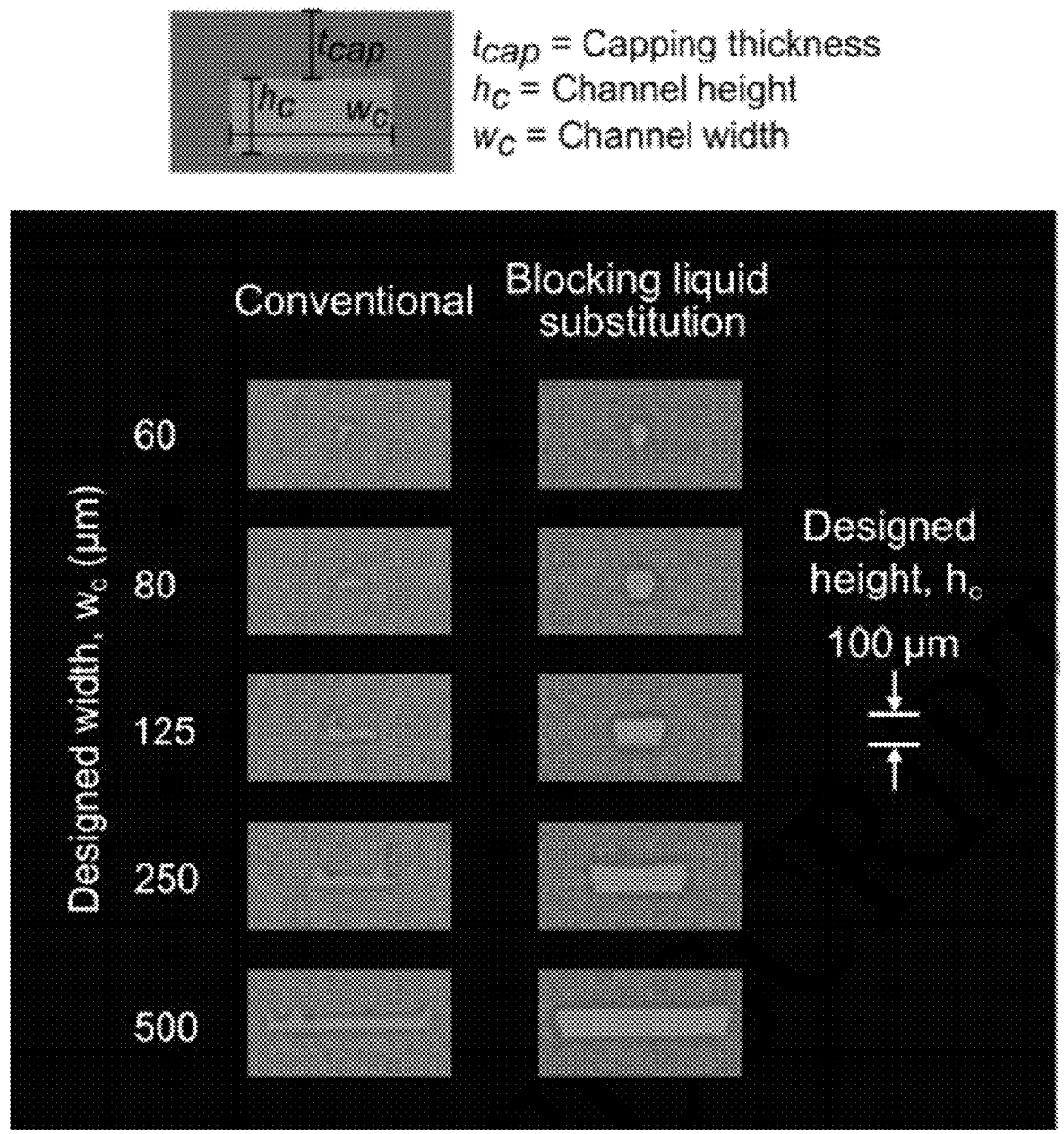
FIG. 34 shows a comparison of the cross-sections of the hollow channels (blue) fabricated using the conventional process to those fabricated using the blocking liquid substitution process. The cross-sections were obtained using Nano-CT imaging and corresponds to the y-y' line in FIG. 33B. The channels had a designed height of 100 μm, and the solid capping thickness above the trenches was 250 μm.

A device containing the substituted blocking liquid inside an array of channels with designed widths ranging from about 60 µm to about 500 µm is shown in FIG. 32. After removal of the blocking liquid, the internal hollow channels are characterized using the non-destructive nano-computed tomography (Nano-CT) imaging technique (see FIGS. 33A and 33B). The cross-sections of the hollow channels (designed height of 100 µm) shown FIG. 34 validates the mitigation of print-through using the blocking liquid substitution process in comparison to the conventional process.

Using the Nano-CT imaging, we measured the volume of the hollow channels to quantitatively characterize the effect of the process parameters on the fabricated effective channel height. A higher effective channel height value corresponds to reduction in print-through, and a value closer to the designed channel height corresponds to higher fidelity.

Figure 35:
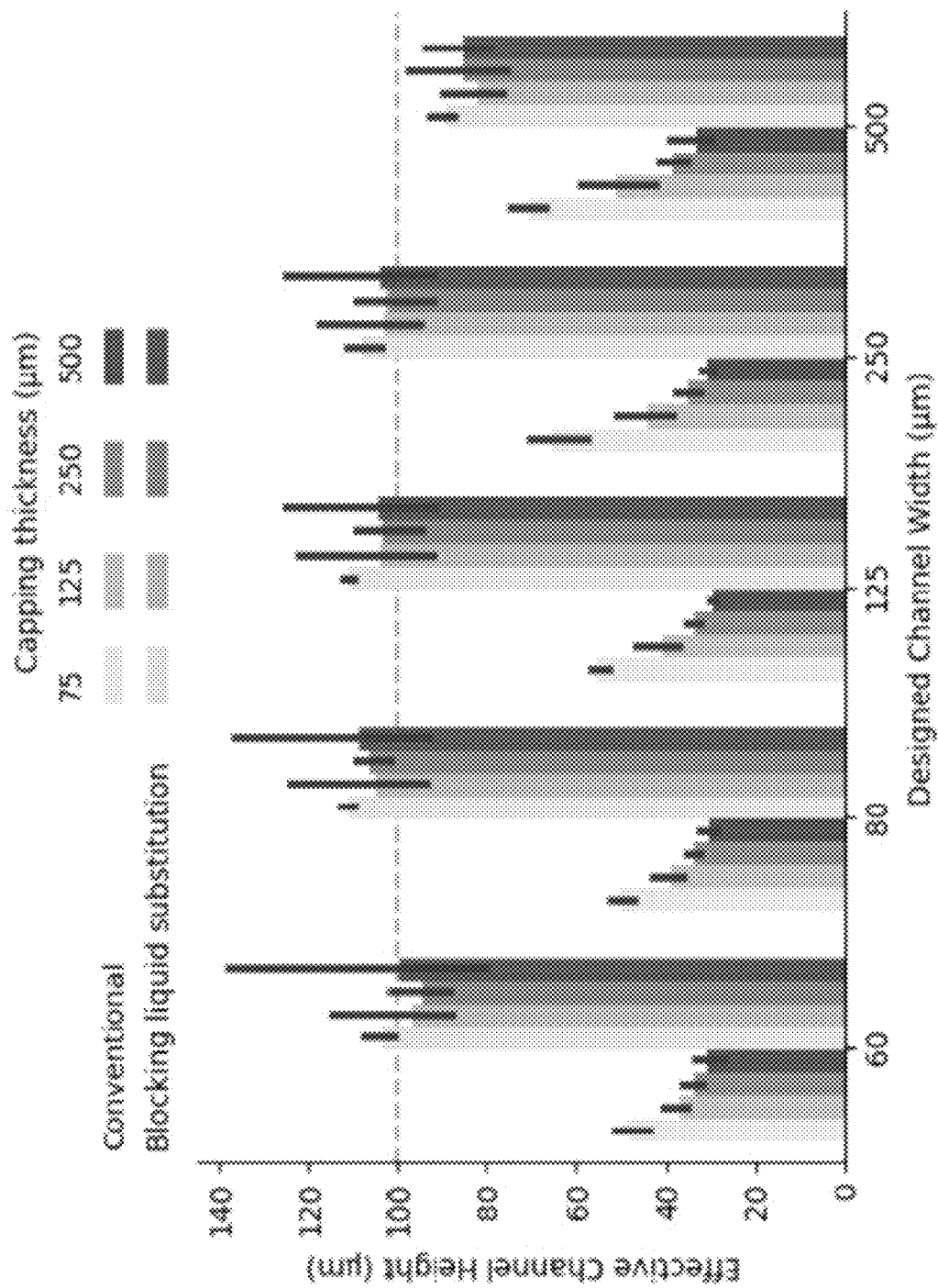
FIG. 35 shows a quantitative comparison of the hollow channels fabricated using the conventional method to the blocking liquid substitution method. The schematic of the channel cross-section in FIG. 34 defines geometrical parameters shown in the plot. The horizontal dashed line represents the designed channel height of 100 The error bars represent standard deviation of process repeatability for n=3 trials.

In FIG. 35, the effective channel height using the blocking liquid substitution process is compared to the conventional process as a function of the capping thickness. A larger capping thickness results in higher cumulative UV exposure dose penetrating into the hollow trenches (i.e. higher print-through). The conventional process suffers from decreasing effective channel height as the capping thickness increases (as supported by the Gong et al. model), while our developed process is unaffected by the capping thickness and results in better fidelity.

Figure 36:
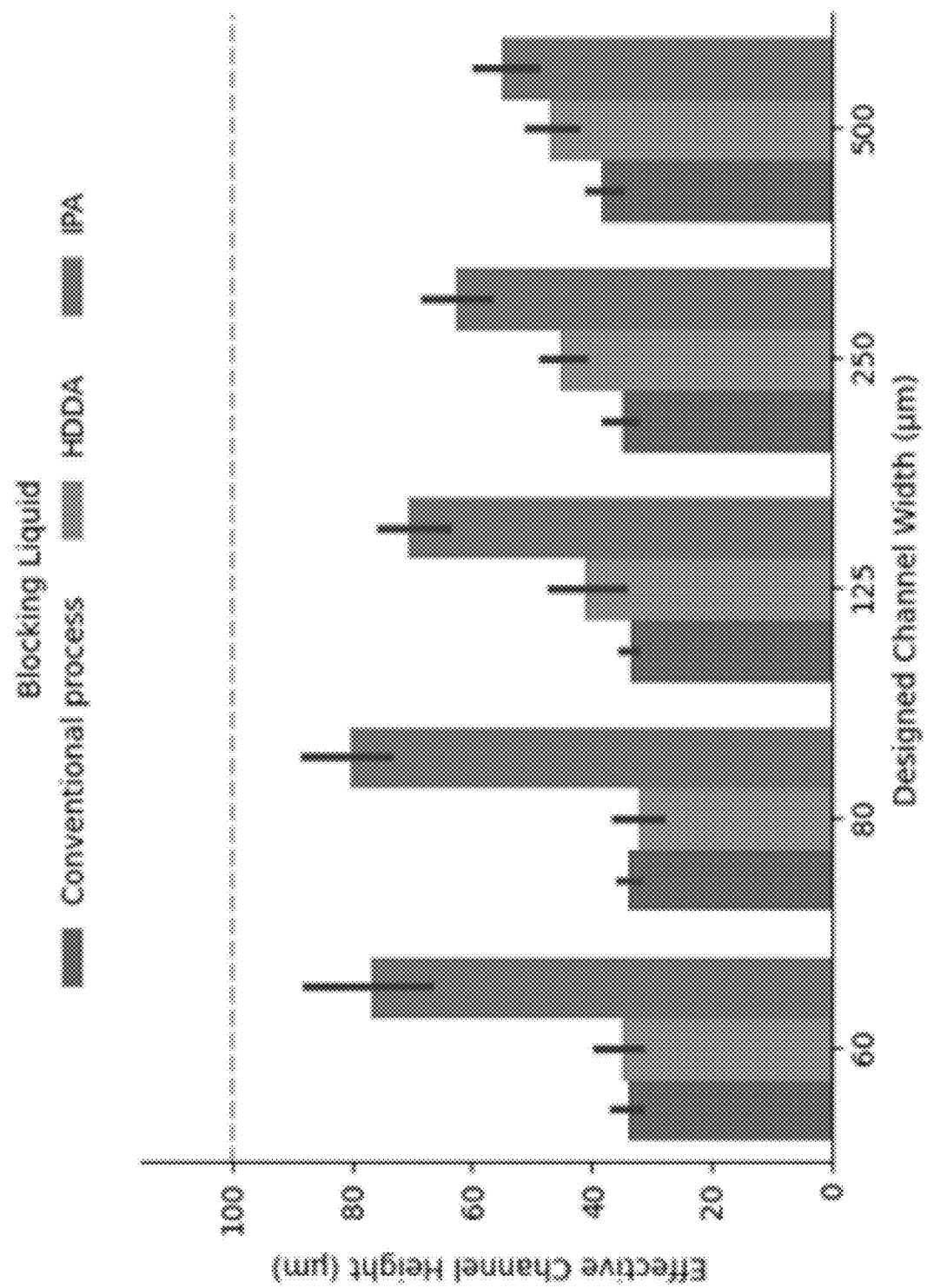
FIG. 36 shows an effect of blocking liquid formulation on the effective channel height as a comparison of the two different blocking liquids to a conventional process. The designed channel height is shown as horizontal dashed lines, the principal exposure dose was four times higher than regular exposure dose, and the error bars represent standard deviation of process repeatability for n=3 trials.

Within the hollow region (Region I), the blocking liquid functions as a substitute of the trapped resin. The requirement of the blocking liquid is that it does not polymerize or polymerizes minimally over the course of the device fabrication. This can be achieved by using a non-polymerizing liquid or a liquid that is more difficult to polymerize than the resin. We initially investigated isopropanol (IPA) and neat 1,6-hexanediol diacrylate (HDDA) monomer as the blocking liquids, and the results of each are compared to the conventional process in FIG. 36.

In some embodiments, IPA is more effective as the blocking liquid than the neat HDDA, however, neither liquid attains effective channel heights close to the designed height. Without wishing to be bound by any particular theory, these results could be attributed to the mixing of the resin into Region I during the substitution process. Furthermore, unlike IPA, the neat HDDA may be more susceptible to polymerization caused by the diffusion of the photoinitiator from the resin and the higher principal exposure dose.

Although a non-polymerizing liquid can be an effective blocking liquid, using a blocking liquid that is formulated using the same components as the resin avoids introducing foreign materials into the fabrication process which can increase inhomogeneity of the principal layer or incompatibility with the resin system. For example, the resin may be diluted when using a solvent as the blocking liquid, causing the principal layer to have poor mechanical properties or weak adhesion to the previous layer (Region III). For instance, when using a HDDA based resin, we observed formation of cracks and high surface roughness in the principal layer when using IPA as the blocking liquid. Therefore, we investigated formulation of a blocking liquid which was comprised of HDDA.

Figure 37:
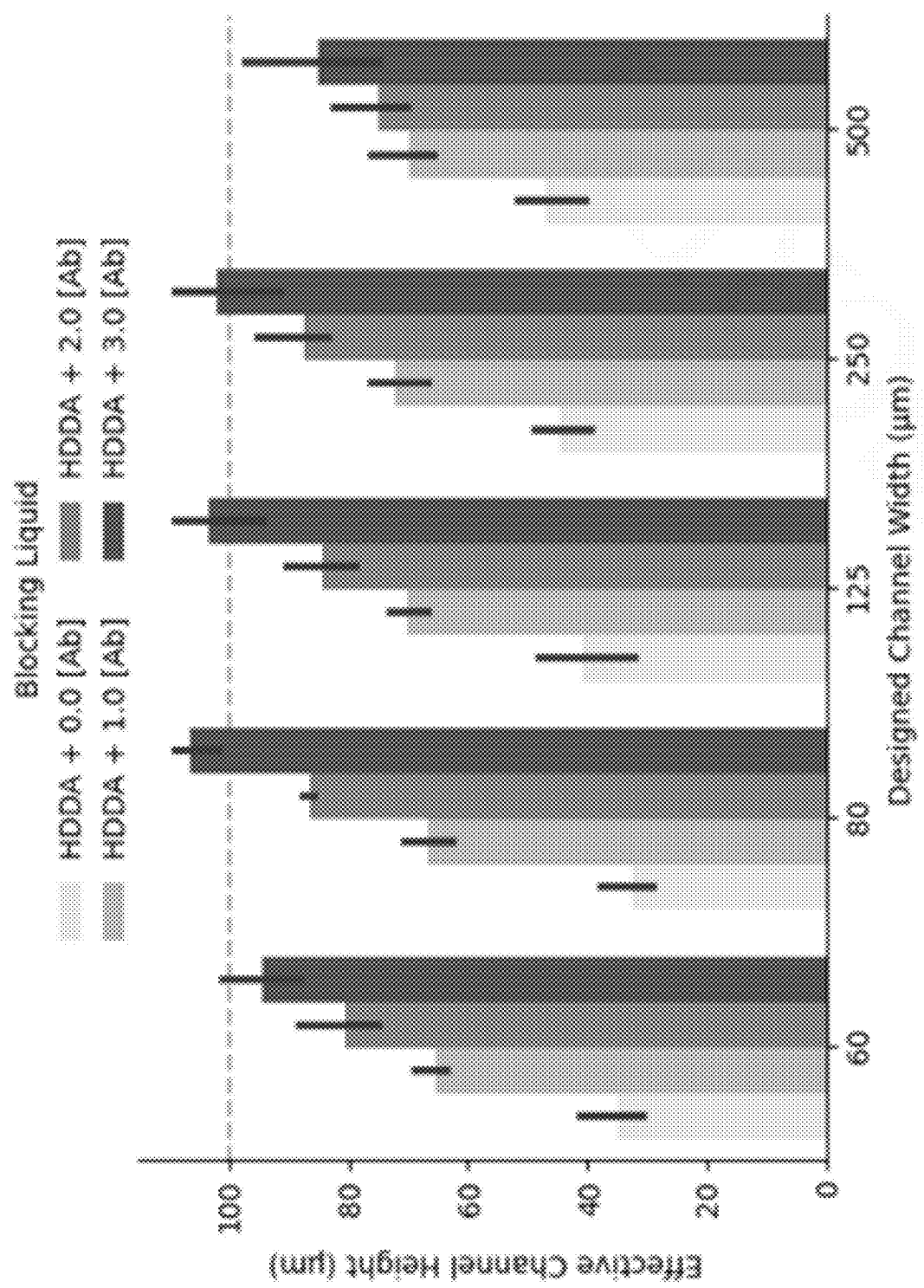
FIG. 37 shows an effect of Sudan I absorber concentration, in HDDA blocking liquid. The designed channel height is shown as horizontal dashed lines, the principal exposure dose was four times higher than regular exposure dose, and the error bars represent standard deviation of process repeatability for n=3 trials.

To improve the effectiveness of HDDA as the blocking liquid, we investigated addition of an absorber. In FIG. 37 the effect of absorber concentration in the HDDA on the effective channel height is shown. It is found that as the absorber concentration increases, the effective channel height also increases and approaches the designed height. These results indicate that despite the mixing of the resin into the hollow regions (Region I), polymerization of the mixed liquids within the trenches (i.e., the resin and the blocking liquid) can be modulated by addition of an absorber to attenuate the UV light penetrating into the hollow regions. Since mixing of the resin into Region I is unavoidable, it is favorable to formulate a blocking liquid with a higher absorber concentration. However, the maximum limit of the absorber concentration is imposed by the effects on the inhomogeneity (e.g., mechanical properties) and adhesion strength of the principal layer in Region III, and the need to prevent defects in the fabricated part. For example, when using a blocking liquid with the highest concentration of absorber investigated, we observed instances where the effective channel height was larger than the designed height (see FIG. 35 and FIG. 37). We attribute these results to localized unpolymerized defect areas—within Region II and Region III of the principal layer—caused by the mixing of the polymerization-inhibiting blocking liquid (see, e.g., FIGS. 41A and 41B). These localized defects can result in poor adhesion of the principal layer and increase the likelihood of print failure.

Figure 38:
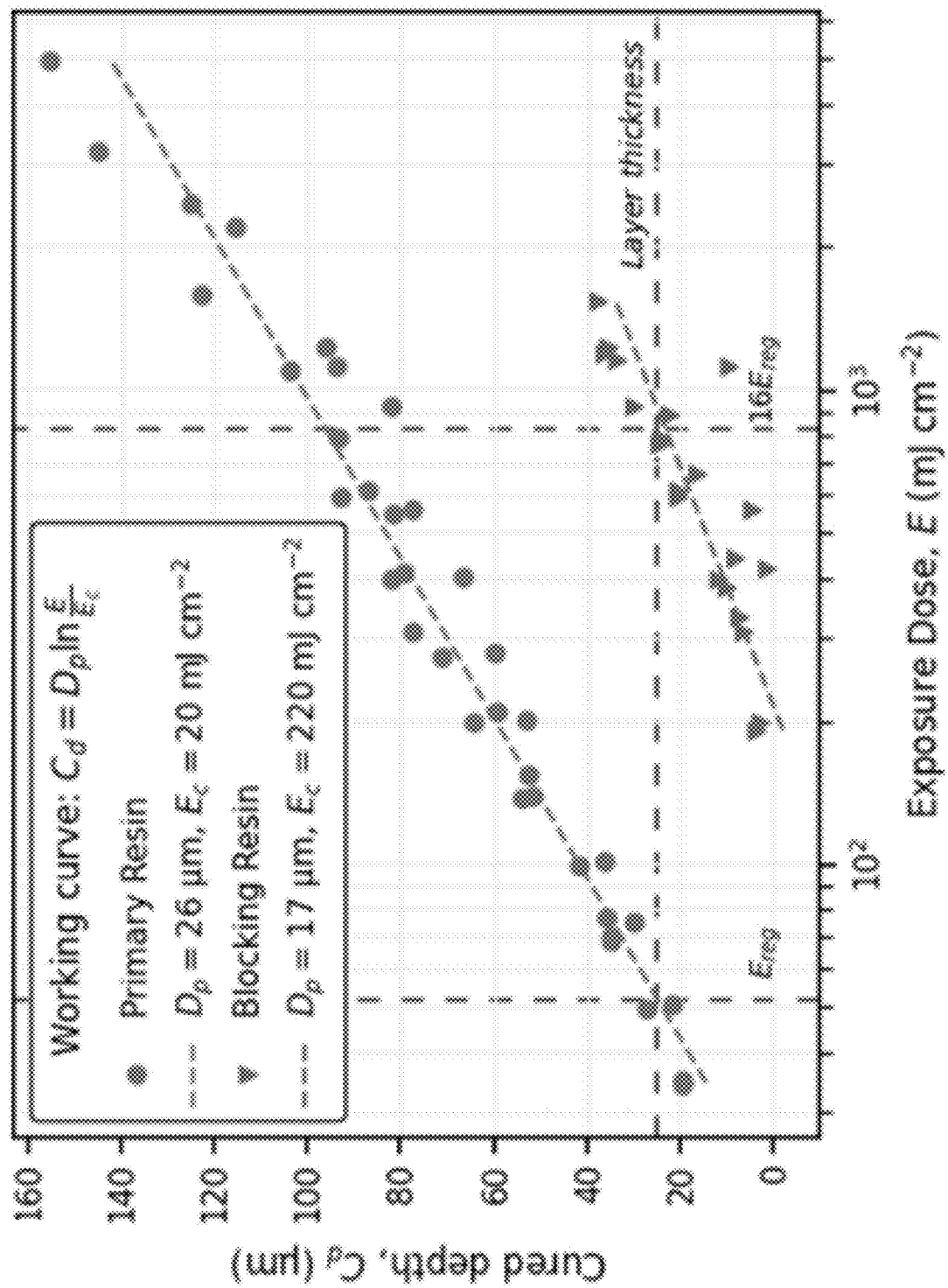
FIG. 38 shows photopolymerization characteristics of the resin (Primary Resin) and the blocking liquid (Blocking Resin) used for the results shown in FIGS. 39 and 40.

Adhesion of the principal layer can be improved by intentionally adding a trace amount of photoinitiator to the blocking liquid that is highly loaded with an absorber—effectively making it a photopolymerizable resin but with very low reactivity. Without wishing to be bound by any particular theory, the diffusion of photoinitiator (from the blocking liquid) into Region III may minimize the dilution of the photoinitiator in the resin and improve the adhesion of the principal layer, while the high absorber concentration aids in attenuating the UV light penetrating beyond Region II and into Region I. To support this theory, FIG. 38 illustrates a comparison of photopolymerization "working curves" of the blocking liquid containing a photoinitiator (Blocking Resin) to the resin used to fabricate the solid parts in this work (Primary Resin). In stereolithography, such working curves are used to extract the UV absorbing properties and reactivity of formulated resins. The working curves in FIG. 38 illustrate that the Blocking Resin has a higher absorption factor (lower Dp) and lower reactivity (higher critical exposure dose requirement, Ec) compared to the Primary Resin. These results imply that when the Blocking Resin is substituted into the hollow regions, the susceptibility of print-through will be lower in comparison to when the Primary Resin remains trapped in the hollow regions.

Figure 39:
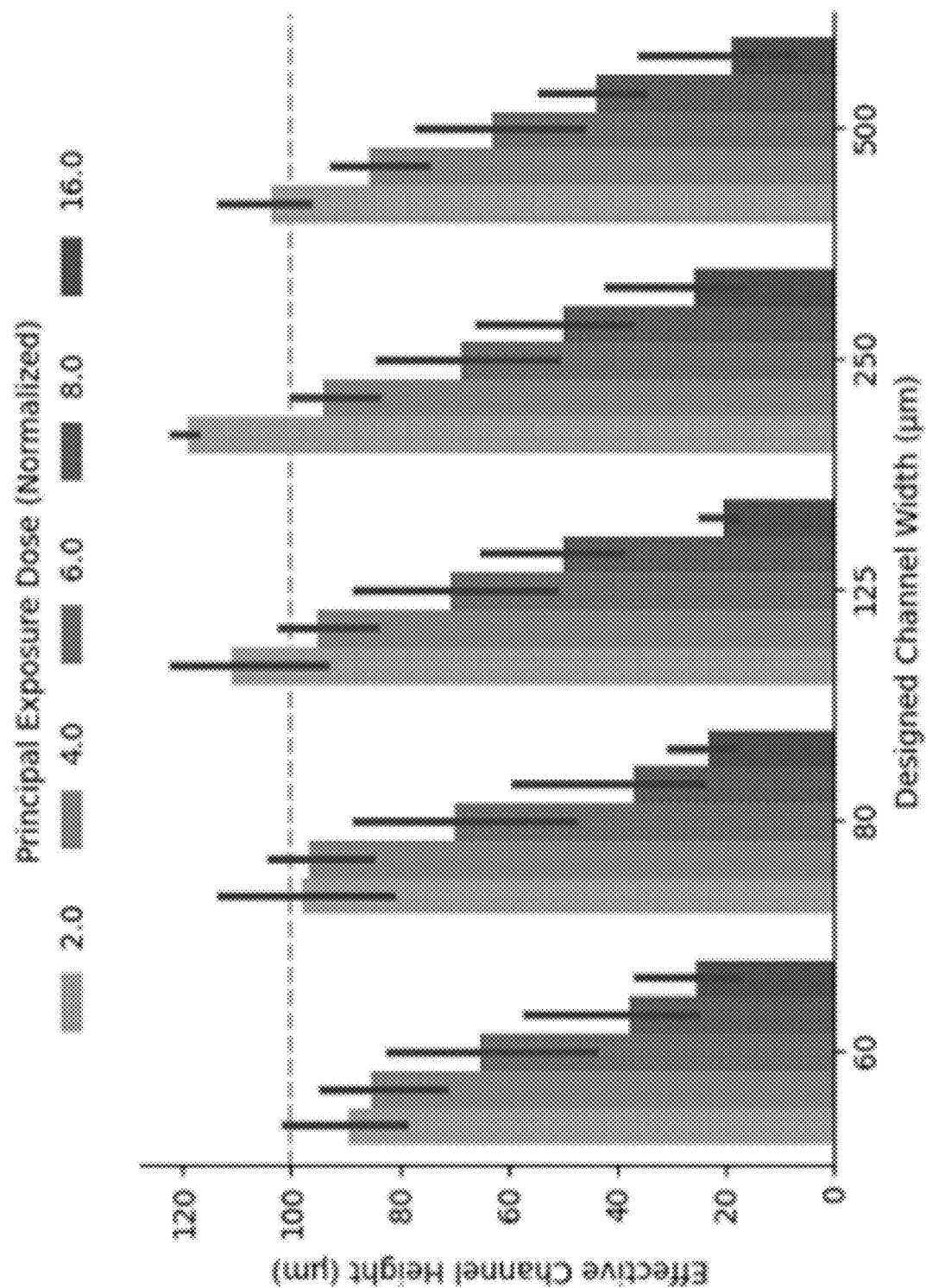
FIG. 39 shows the effect of principal exposure dose on the effective channel height, where the exposure dose is normalized to $E_{reg}$.

To confirm that the Blocking Resin can improve adhesion but also mitigate print-through, we investigated the impact of the principal exposure dose. In FIG. 39, the effective channel height is shown as a function of the principal exposure dose normalized to the regular exposure dose (Ereg in FIG. 38). We observe that when the principal exposure dose is below a critical amount, the risk of adhesion-related defects is higher because the effective channel height is greater than the designed height. As the principal exposure dose increases, the effective channel height decreases; however, even at 16×higher principal exposure dose, the effective channel height is a non-zero value. We attribute the decrease in the effective channel height to the mixing of the Primary Resin into the hollow region (Region I) and not because of the photoinitiator added to the Blocking Resin. This reasoning can be justified because the expected cured depth of the Blocking Resin is below –30-40 µm at 16×higher principal exposure dose (see, e.g., FIG. 38)—a value lower than the designed channel height of 100 µm in FIG. 39. For a given blocking liquid, appropriate selection of the principal exposure dose is necessary to balance the competing effects on the adhesion of the principal layer and the fidelity of the hollow regions below the principal layer. An optimal principal exposure dose can be determined from the required thickness of the principal layer (e.g., 25 µm) and the expected cured depth of the resin and the blocking liquid from the working curve characterization. For a given principal exposure dose, the actual cured depth will lie between the theoretical working curves of the resin and the blocking liquid because the principal layer contains a mixture of both liquids.

Using the blocking liquid substitution process, we demonstrate a variety of hollow geometries can be 3D printed using multiple types of resins and without the need to optimize the printing parameters (e.g. exposure and layer thickness) to reduce print-through. We also show that our process can exceed the hollow channel height miniaturization limit of ~3.5-5.5 Dp as reported by Gong et al.

Figure 40:
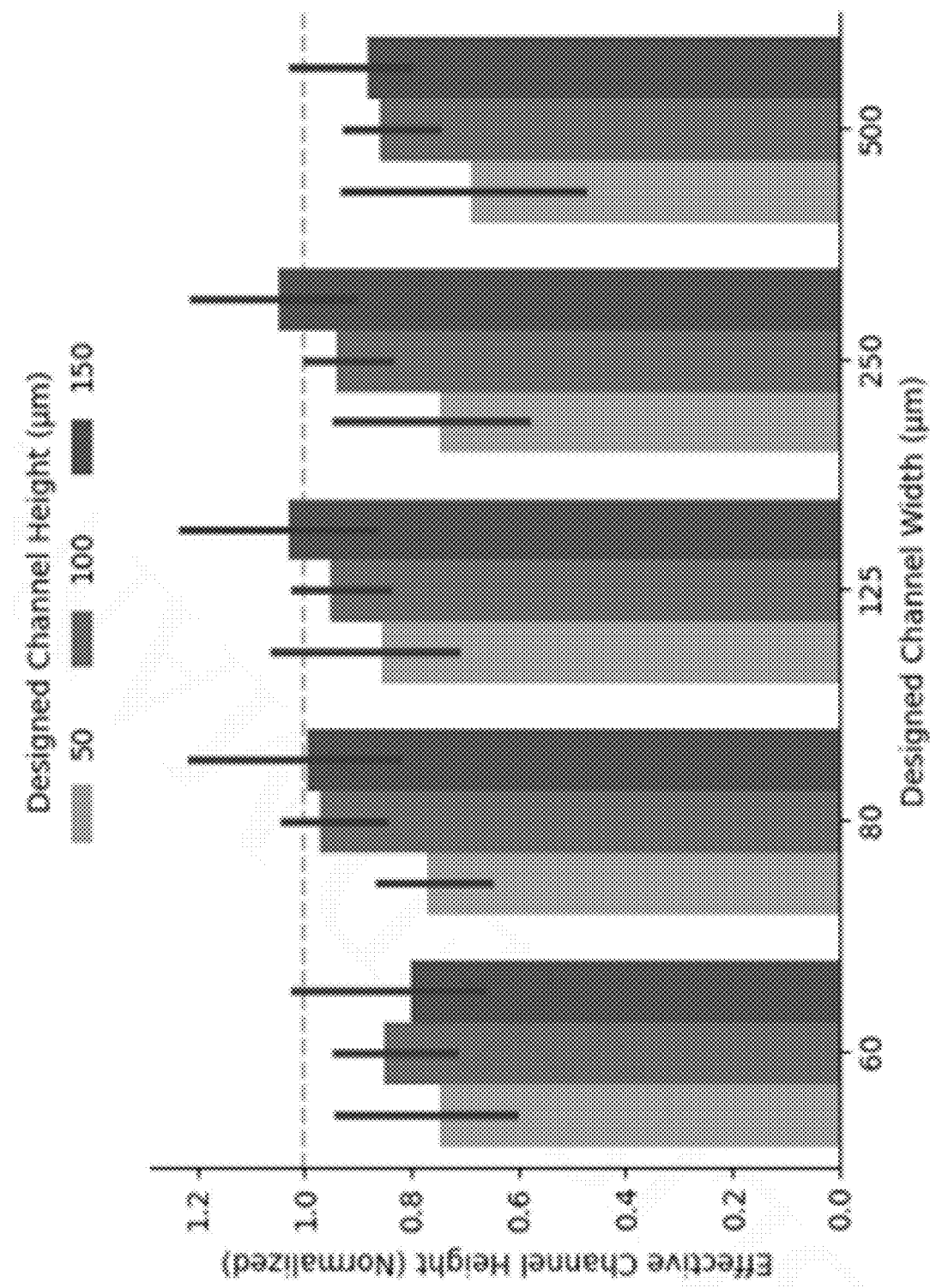
FIG. 40 illustrates a comparison of fabricated channels with varying designed height, where the principal exposure dose used was $4.0E_{reg}$.

In FIG. 40, the normalized effective channel height for designed heights ranging from 50 µm to 150 µm is shown. Using the Primary Resin with Dp ~26 µm (see FIG. 38), channels heights as small as 50 µm (1.9 Dp) can be fabricated despite the 4× higher principal exposure dose.

Figures 41A, 41B:
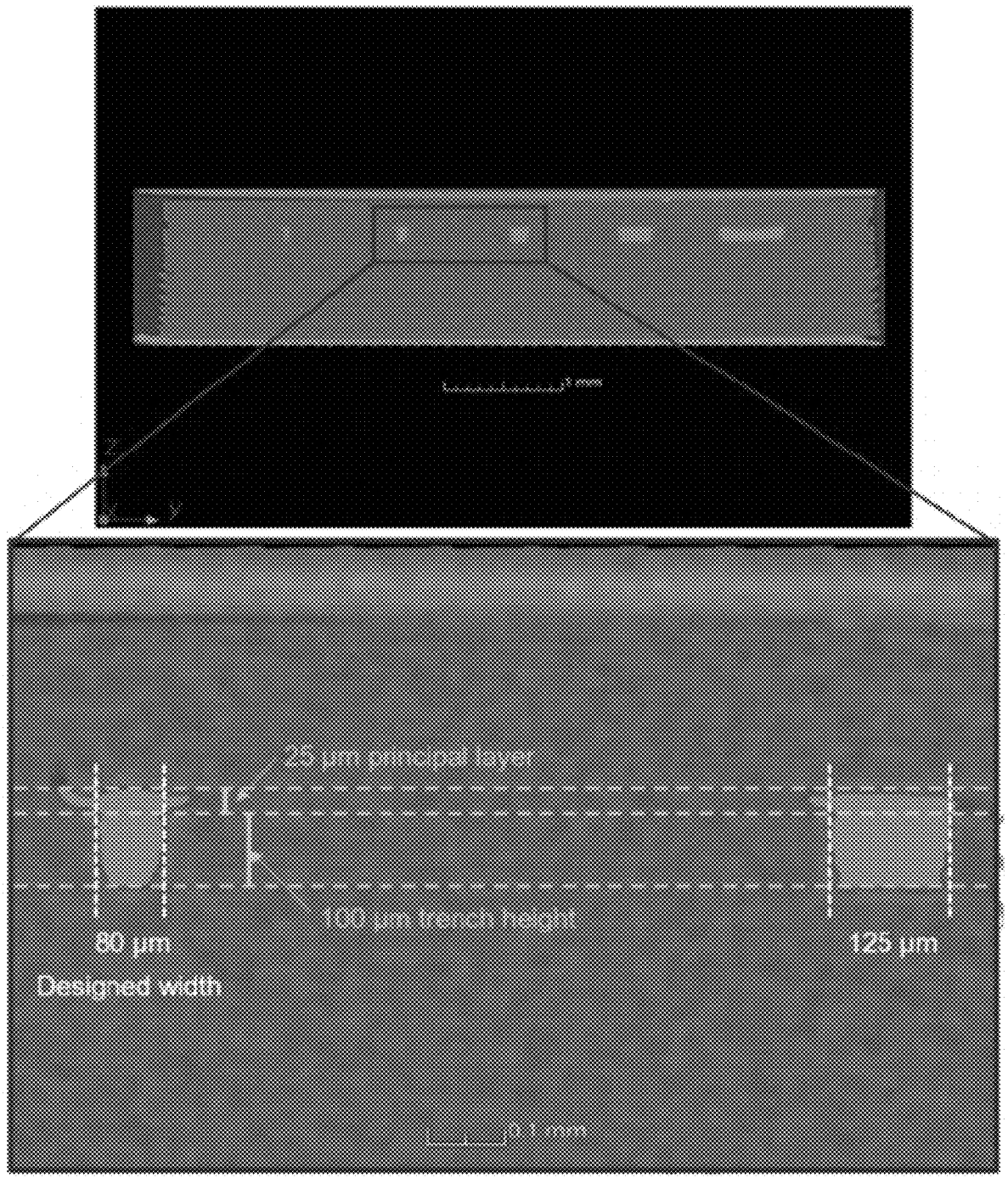
FIGS. 41A and 41B show cross-sectional views of hollow channels (blue) from a device which was fabricated using a blocking liquid comprising of HDDA+3.0 [Ab].

FIGS. 41A and 41B illustrate unpolymerized regions in a principal layer, as cross-sectional views of hollow channels (blue) from a device which was fabricated using a blocking liquid comprising of HDDA+3.0 [Ab]. The magnified image (bottom) shows that the principal layer contains unpolymerized areas that are adjacent to the trenches. These unpolymerized areas occur because of the reduced polymerization caused by the blocking liquid that has diffused from Region I into Region II and III of the principal layer. The unpolymerized area corresponding to Region II results in hollow channel heights to be greater than the designed channel height. The unpolymerized area corresponding to Region III is an indication of poor adhesion of the principal layer.

Figure 42:
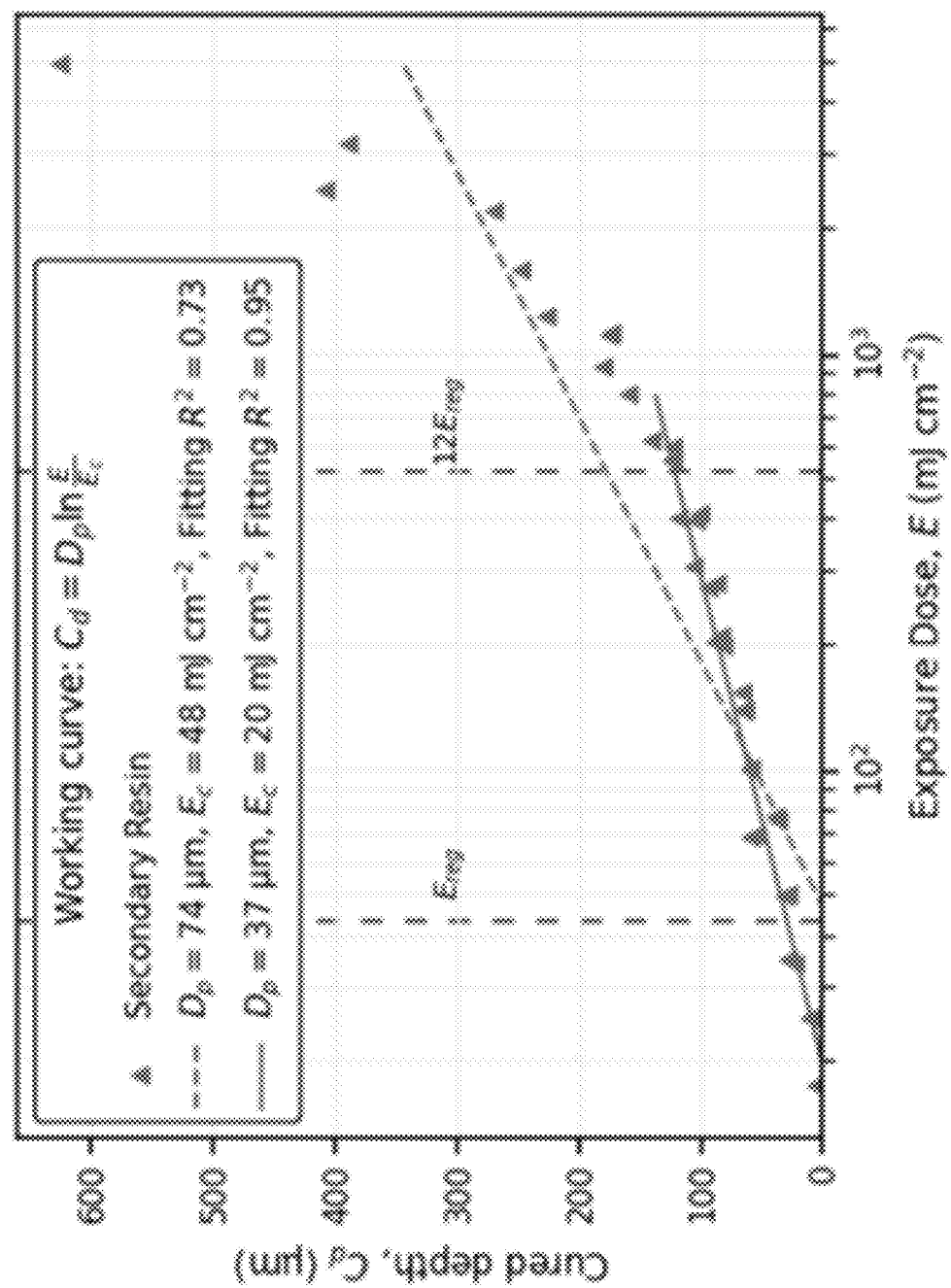
FIG. 42 illustrates a photopolymerization working curve of another HDDA resin used in this work. This resin exhibits a super-logarithmic behavior. Two trendlines are fitted to the working curve equation in order to extract the estimated $D_p$ value. First trendlines fits the data over the entire exposure doses tested, while the second trendline fits the data in the lower range of exposure doses where the resin behaves linearly. The vertical dashed lines at $E_{reg}$ and $12E_{reg}$ correspond to regular exposure dose and principal exposure dose, respectively.

FIG. 42 illustrates a photopolymerization working curve of another HDDA resin used in certain embodiments. This resin exhibits a superlogarithmic behavior. Two trendlines are fitted to the working curve equation in order to extract the estimated Dp value. First trendlines fits the data over the entire exposure doses tested, while the second trendline fits the data in the lower range of exposure doses where the resin behaves linearly. The vertical dashed lines at $E_{reg}$ and $12E_{reg}$ correspond to regular exposure dose and principal exposure dose, respectively, used for the fabrication of the device in FIG. 47C.

Figure 43:
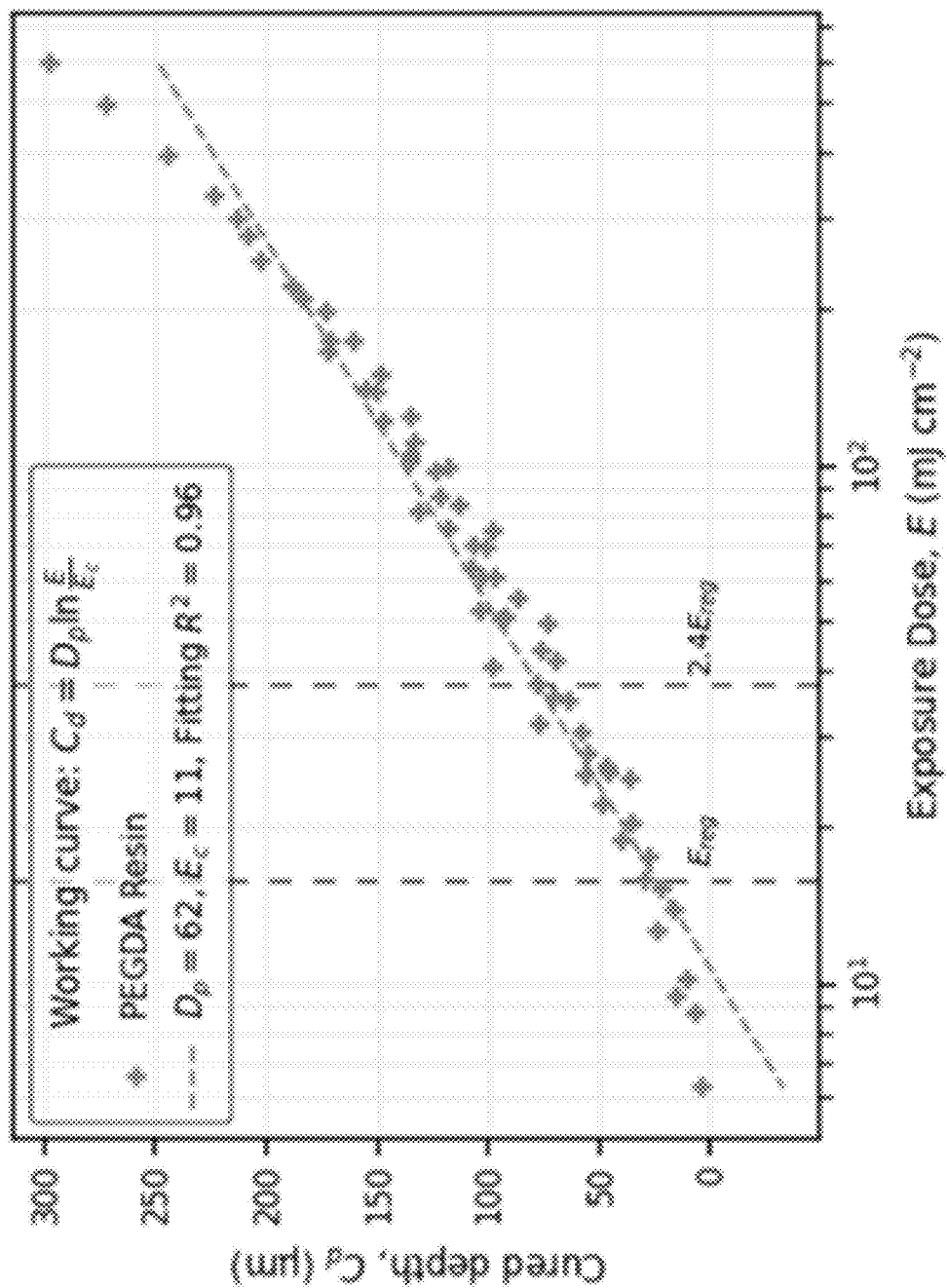
FIG. 43 illustrates a photopolymerization working curve of a PEGDA resin investigated in this work. The vertical dashed lines at $E_{reg}$ and $2.4E_{reg}$ correspond to regular exposure dose and principal exposure dose, respectively.

FIG. 43 illustrates a photopolymerization working curve of a PEGDA resin investigated in this disclosure. The vertical dashed lines at $E_{reg}$ and $2.4E_{reg}$ correspond to regular exposure dose and principal exposure dose, respectively, used for the fabrication of the device shown in FIGS. 48A and 48B.

Figure 44A:
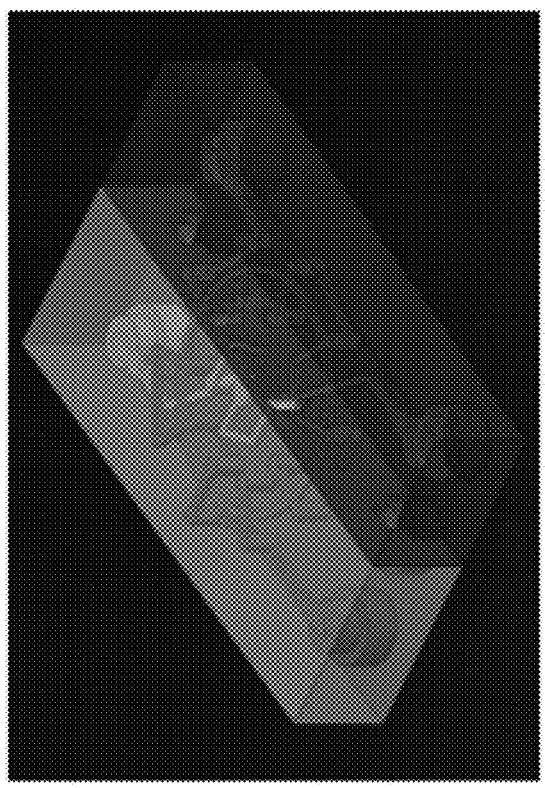
FIGS. 44A and 44B illustrate a CAD model of a device with multilevel channels.
Figure 44B:
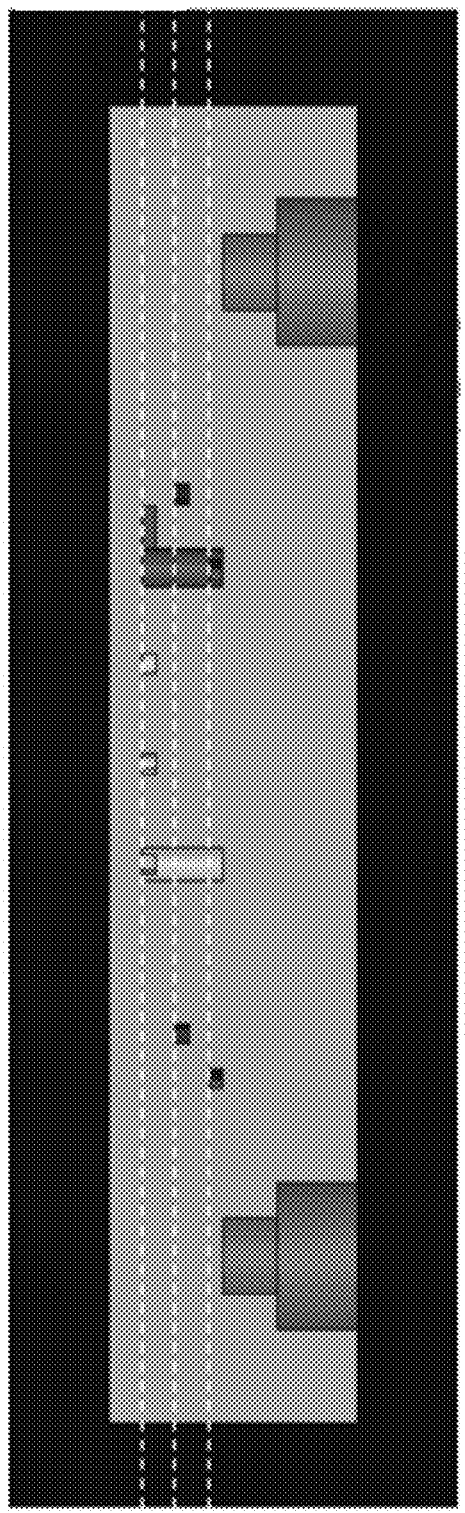

FIGS. 44A and 44B illustrate a computer-aided design (CAD) model of a device with multilevel channels. This CAD model corresponds to the device shown in FIG. 47A. FIG. 44A presents a perspective view of the device where the solid portion of the device is transparent in order to show the internal hollow regions that are colored red, green and blue. FIG. 44B illustrates a cross-sectional view of the model. The horizontal dashed lines correspond to the bottom boundary of the principal layers. Prior to polymerization of the principal layer, the hollow spaces are substituted with the blocking liquid.

Figure 45:
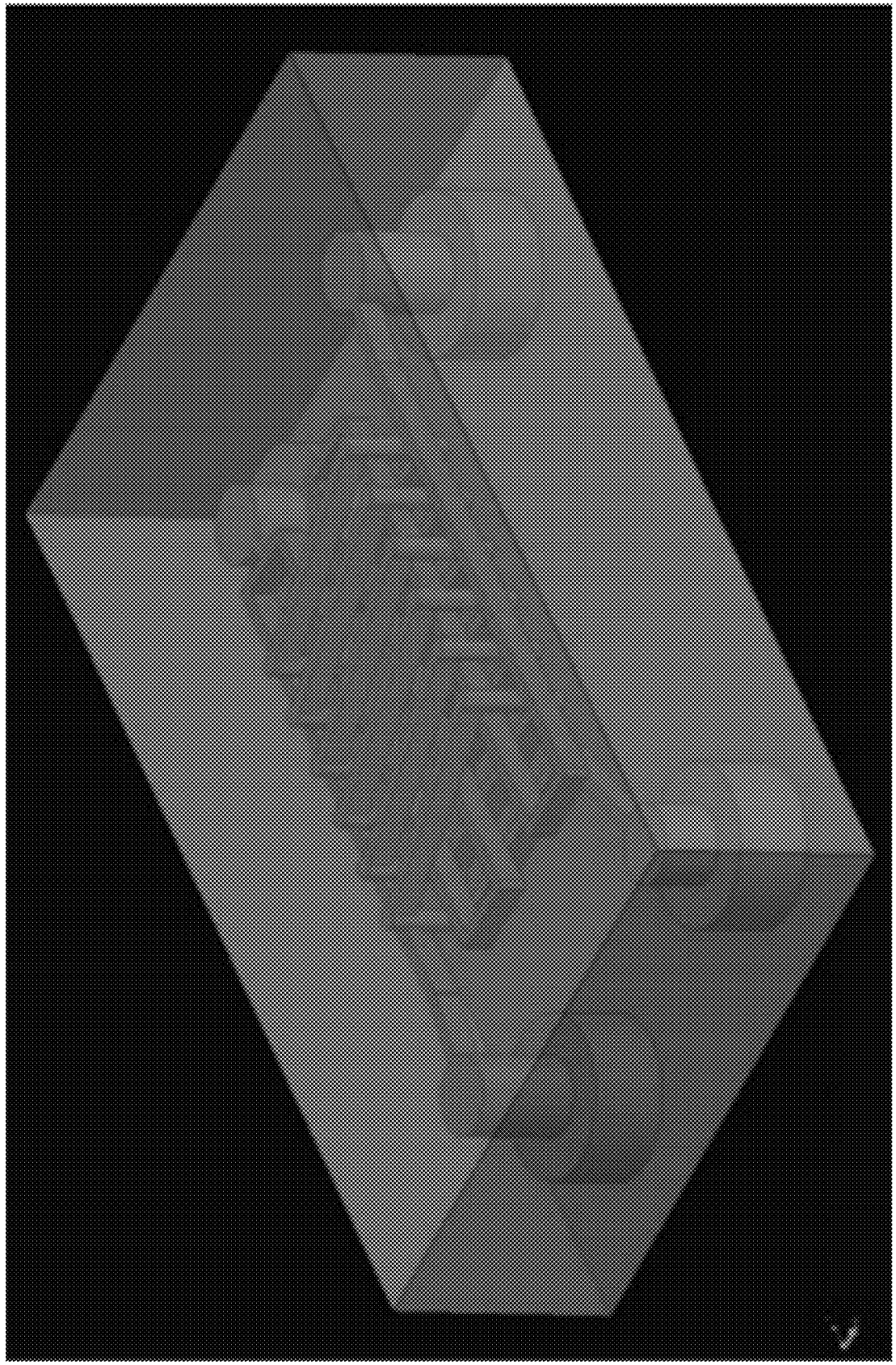
FIG. 45 illustrates a CAD model of a transparent, multilevel PEGDA microfluidic device. The red and blue colored regions illustrate the continuous channel paths that are separate but interlocked within the device.

FIG. 45 illustrates a CAD model of a multilevel microfluidic device. This CAD model corresponds to the transparent PEGDA device shown in FIGS. 48A and 48B. The red and blue colored regions illustrate the continuous channel paths that are separate but interlocked within the device.

Figure 46:
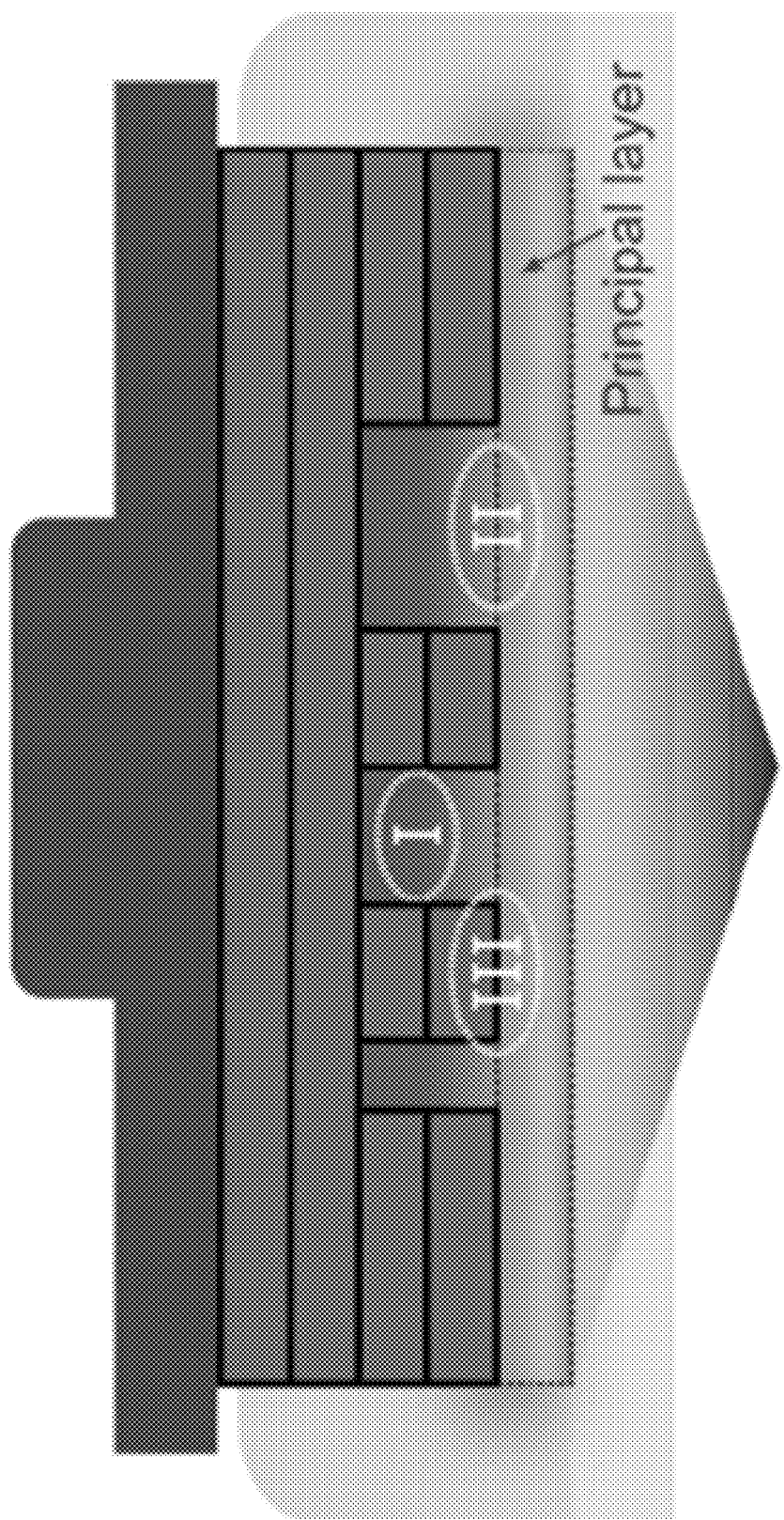
FIG. 46 illustrates a schematic of an interaction between the blocking liquid and the resin in a bottom-up stereolithography system. The schematic shows regions of interaction between the resin (light green) and the blocking liquid (orange) after substitution of the blocking liquid and during the polymerization of the principal layer. Mixing between the two liquids occurs when the part containing the blocking liquid filled trenches is brought into contact with the resin pool.

FIG. 46 illustrates a schematic of a bottom-up stereolithography system showing regions of interaction between the resin (light green) and the blocking liquid (orange) after substitution of the blocking liquid and during the polymerization of the principal layer. Mixing between the two liquids occurs when the part containing the blocking liquid filled trenches is brought into contact with the resin pool.

In FIG. 46, mechanisms of the blocking liquid substitution process and its effects on the hollow geometries and the fabricated parts are discussed with regard to several regions of the illustrated schematic. In the bottom-up stereolithography system, the blocking liquid is held in the trenches by surface tension and mixing of the resin with the blocking liquid can occur when the part is dipped into the pool of resin after the blocking liquid substitution. A schematic of three regions of liquid interactions after the blocking liquid substitution and during the polymerization of the principal layer is shown in FIG. 46. In FIG. 46, Region I is the hollow region containing the substituted blocking liquid, Region II is the boundary between the hollow region and the principal layer, and Region III is the interface where the principal layer will adhere to the previously polymerized layer. All three regions can be affected by the presence and potential mixing of the blocking liquid and the resin. For instance, the diffusion of the blocking liquid into Region III decreases the adhesion strength of the principal layer to the previously polymerized layer. Therefore, the exposure dose for the principal layer—principal exposure dose—may be required to be higher than the exposure dose used for the regular layers. Likewise, the resin can diffuse into Region I (hollow region). As a consequence, the likelihood of print-through increases when the principal exposure dose is higher than the regular exposure dose. Using this model, we investigated the formulation of the blocking liquid and selection of the principal exposure dose in order to ensure high fidelity of the hollow geometries and to prevent adhesion-related defects in the principal layer.

The blocking liquid substitution process mitigates print-through, improves the vertical resolution and facilitates 3D printing of arbitrary micrometer scale hollow geometries. The substituted UV blocking liquid decouples the effect the resin formulation and exposure condition has on the vertical resolution of the printed hollow spaces. This decoupling can enable improved freedom over the design space of the stereolithography process such as material choices, print parameters (e.g. speed or layer thickness) and the resulting properties of the printed part (e.g., mechanical and optical). Since the blocking liquid can be formulated from the same components as the resin, adverse contamination in the process can be avoided. The substitution process can be utilized on an as-needed basis; therefore, the stereolithography system can operate in conventional mode when printing non-critical features. To further improve resolution and repeatability of our method, additional research opportunities exist. For example, use of an inhibitor in the blocking liquid can be investigated or a top-down stereolithography system can be utilized to minimize mixing during the substitution process. With the physical insights provided, our method may be adapted to further advance research and manufacturing of functional hollow geometries that are of interest in fields such as biomedical, optics, aerospace, communication, microelectronics and energy.

Figure 47A:
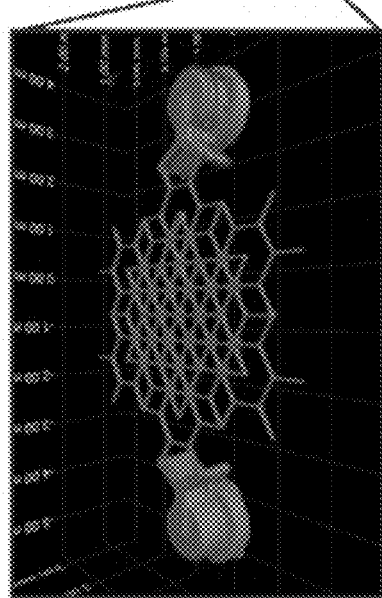
FIGS. 47A-47C illustrate 3D printed microdevices comprising complex hollow geometries.
Figure 47B:
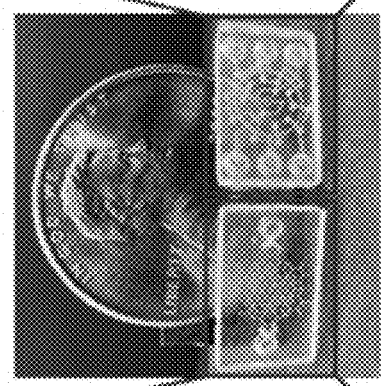
Figure 47C:
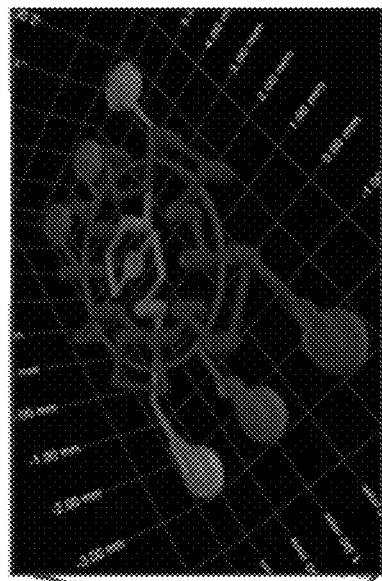

In FIGS. 47A-47C, the ability to fabricate devices with complex hollow geometries is demonstrated using another HDDA based resin that exhibits nonlinear cure depth dependence beyond a certain dose, and has an estimated Dp ~37-74 The device shown in FIG. 47B illustrates an array of microfluidic channels with designed height of 100 μm (~1.4-2.7 Dp) arranged to form hexagonal patterns. The device shown in FIG. 47C demonstrates multiple multilevel 3D channels that are interlocked but form separate continuous paths, and have a designed cross-sectional height of 150 μm (~2.0-4.1 Dp). In FIG. 48A, an optically transparent multilevel microfluidic device is illustrated that was fabricated using a poly(ethylene glycol) diacrylate (PEGDA) based resin. In FIG. 48B the channels of the device with designed height of 250 μm (~4.0 Dp) are shown to be unobstructed by flushing the channels with water that was colored with food dyes. To realize transparent parts and prevent coloration (e.g. yellowing), the absorbers used in the PEGDA resin resulted in non-optimal absorption at our 385 nm UV light source. Without using our reported method, the channels of the transparent device were clogged because the PEGDA resin was highly susceptible to polymerization due to the high Dp ~62 μm and low Ec ~11 mJ cm$^{-2}$. During fabrication of the devices with multilevel channels, the blocking liquid substitution process was utilized on an as-needed basis, i.e. only prior to polymerization of a layer that would pose a risk of print-through.

In some embodiments, the trenches and the subsequent capping layers were fabricated with a 25 μm layer thickness and with the same exposure dose (except for the principal layer which had a higher exposure dose), and we did not utilize post-fabrication curing steps. Narrower channel heights may be achieved by fabricating the trenches with a smaller layer thickness and by formulating an appropriate blocking liquid using the framework presented in this work.

Materials

In certain embodiments described herein, the resins investigated in this work were comprised of the following materials. Monomer: HDDA (Sartomer) and PEGDA Mn ~510 (RAHN USA Corp.). Absorbers: Sudan I (Sigma-Aldrich), Benetex OB (Mayzo) and BLS 99-2 (Mayzo). Photoinitiator: diphenyl(2,4,6-trimethylbenzoyl)phosphine oxide (TPO) (RAHN USA Corp.).

Stereolithography System and Fabrication Parameters

The 3D printer was fully custom built. The control software was custom developed using Python. A Texas Instruments Digital Light Processing (DLP) projector with illumination source of 385 nm was used to pattern the UV light. The solid constraining interface (i.e. polymerization surface) used was a fluorinated ethylene propylene (FEP) film. The translatable vat contained a localized pool of resin (~250 μL) and blocking liquid (~100 μL), and a polyurethane sponge. The entire fabrication process was fully automated with the exception of when the contaminated resin had to be manually replaced with fresh resin after exposure of the principal layer.

The non-critical features (i.e., base layers with draining inlet/outlet holes) were fabricated prior to the critical features (i.e., trenches, principal layer and subsequent capping layers). The critical features were printed with 25 μm per layer thickness and exposure intensity of ~18 mW cm$^{-2}$.

The non-critical features were printed with 100 μm per layer thickness and exposure intensity of ~50 mW cm$^{-2}$. All the test devices were fabricated using the HDDA based Primary Resin shown in FIG. 38. The resin was comprised of TPO photoinitiator, and absorbers (Sudan I and Benetex OB) with total concentrations below about 0.5% wt/wt. After filling the trenches with the blocking liquid, the part was brought in contact with the pool of resin at velocity of 100 μm s$^{-1}$. After fabrication, the parts were sonicated in IPA for ~5 min followed by connecting the inlet/outlet holes of the part to vacuum to drain the blocking liquid for ~10-20 min. The parts were air dried for at least 24 hours prior to analysis using the Nano-CT. In some embodiments, the capping thickness can be about 250 μm.

Characterization Using Nano-CT

Fabricated parts were characterized using GE v|tome|x m 240 Nano-CT. The parts were scanned in transmission mode, with a tungsten target for the X-ray source of 80 kV and 230 μA, and with a magnification that resulted in a voxel size of 6.77 After reconstruction of the scanned devices, the hollow regions of interest were segmented from the solid regions for analysis.

Measurement of Effective Channel Height

An effective channel height, $h_{c\_eff}$, is the average height of the hollow regions along a designed channel length, $L_c=5$ mm. The effective channel height is given by the equation $$h_{c\_eff} = \frac{V_{measured}}{W_{c\_ref}L_c}, \text{ where } W_{c\_ref} = \frac{V_{ref\_measured}}{h_c L_c}$$

is the effective channel width of a reference channel without a capping layer (i.e., $t_{cap}=0$). The variable $V_{measured}$ is the measured volume of the channel of interest, $V_{ref\_measured}$ is the measured volume of a reference channel without a capping layer, and $h_c$ is the designed channel height for the channel of interest.

Characterization of the "Working Curve"

The working curves of the resins shown in FIGS. 38, 42, and 43 were characterized using the frontal photopolymerization method. In summary, the resin was polymerized using a 1 mm square UV pattern onto a silanized glass substrate. Each pattern was sequentially exposed to form a matrix of exposure times and exposure intensities that corresponds to different exposure doses. Uncured resin from the glass surface was rinsed using IPA. The polymerized samples were then coated with a thin layer (<100 nm) of aluminum using thermal evaporation. The cured thicknesses of polymer squares were measured using an optical profilometer. The glass substrate was silanized with 3-(trimethoxysilyl)propyl methacrylate (Gelest) using vapor phase deposition in a desiccator followed by curing the glass in an oven at 120° C. for 20 min.

Example Computing Entity

Figure 49:
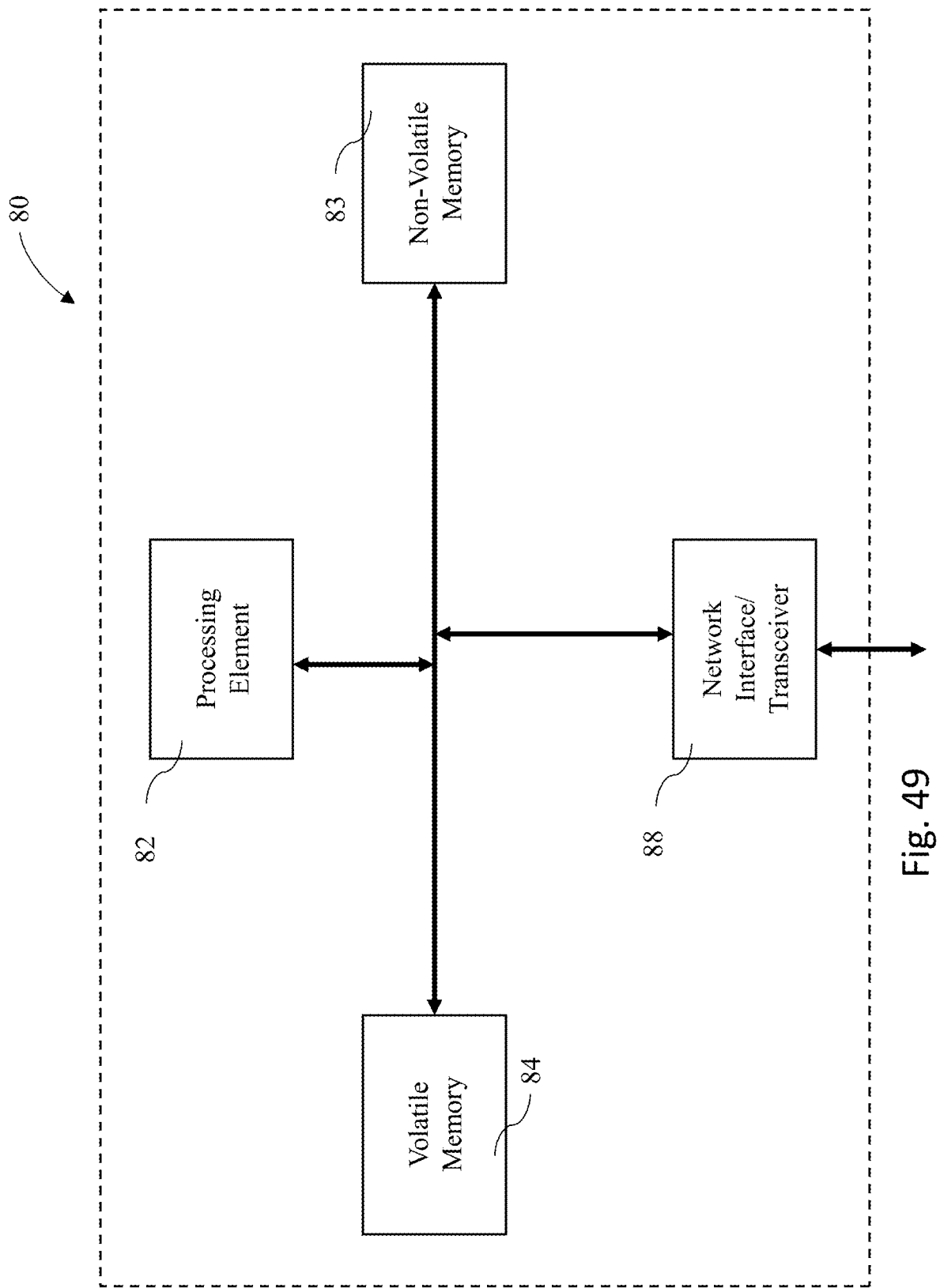
FIG. 49 illustrates a computing device configured to carry out 3D printing methods and microdevice fabrication methods described in the present disclosure, according to an embodiment discussed herein.

FIG. 49 provides a schematic of the computing device 80 according to one embodiment of the present invention. In general, the terms computing device, computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 49, in one embodiment, the computing device 80 may include or be in communication with one or more processing elements 82 (also referred to as processors, processing circuitry, and/or similar terms used herein interchangeably) that communicate with other elements within the computing device 80 via a bus, for example. As will be understood, the processing element 82 may be embodied in a number of different ways. For example, the processing element 82 may be embodied as one or more complex programmable logic devices (CPLDs), microprocessors, multi-core processors, coprocessing entities, application-specific instruction-set processors (ASIPs), microcontrollers, and/or controllers. Further, the processing element 82 may be embodied as one or more other processing devices or circuitry. The term circuitry may refer to an entirely hardware embodiment or a combination of hardware and computer program products. Thus, the processing element 82 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 82 may be configured for a particular use or configured to execute instructions stored in volatile or non-volatile media or otherwise accessible to the processing element 82. As such, whether configured by hardware or computer program products, or by a combination thereof, the processing element 82 may be capable of performing steps or operations according to embodiments of the present invention when configured accordingly.

In one embodiment, the computing device 80 may further include or be in communication with non-volatile media (also referred to as non-volatile storage, memory, memory storage, memory circuitry, and/or similar terms used herein interchangeably). In one embodiment, the non-volatile storage or memory may include the one or more non-volatile memories 83, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the computing device 80 may further include or be in communication with volatile media (also referred to as volatile storage, memory, memory storage, memory circuitry, and/or similar terms used herein interchangeably). In one embodiment, the volatile storage or memory may also include one or more volatile memories 84, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 82. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 80 with the assistance of the processing element 82 and operating system.

In some embodiments, the computing device 80 may also include one or more network interfaces, such as a transceiver 88 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 80 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing device 80 may include or be in communication with one or more input elements, such as a keyboard input, a mouse input, a touch screen/display input, motion input, movement input, audio input, pointing device input, joystick input, keypad input, and/or the like. The computing device 80 may also include or be in communication with one or more output elements (not shown), such as audio output, video output, screen/display output, motion output, movement output, and/or the like.

Example External Computing Entity

Figure 50:
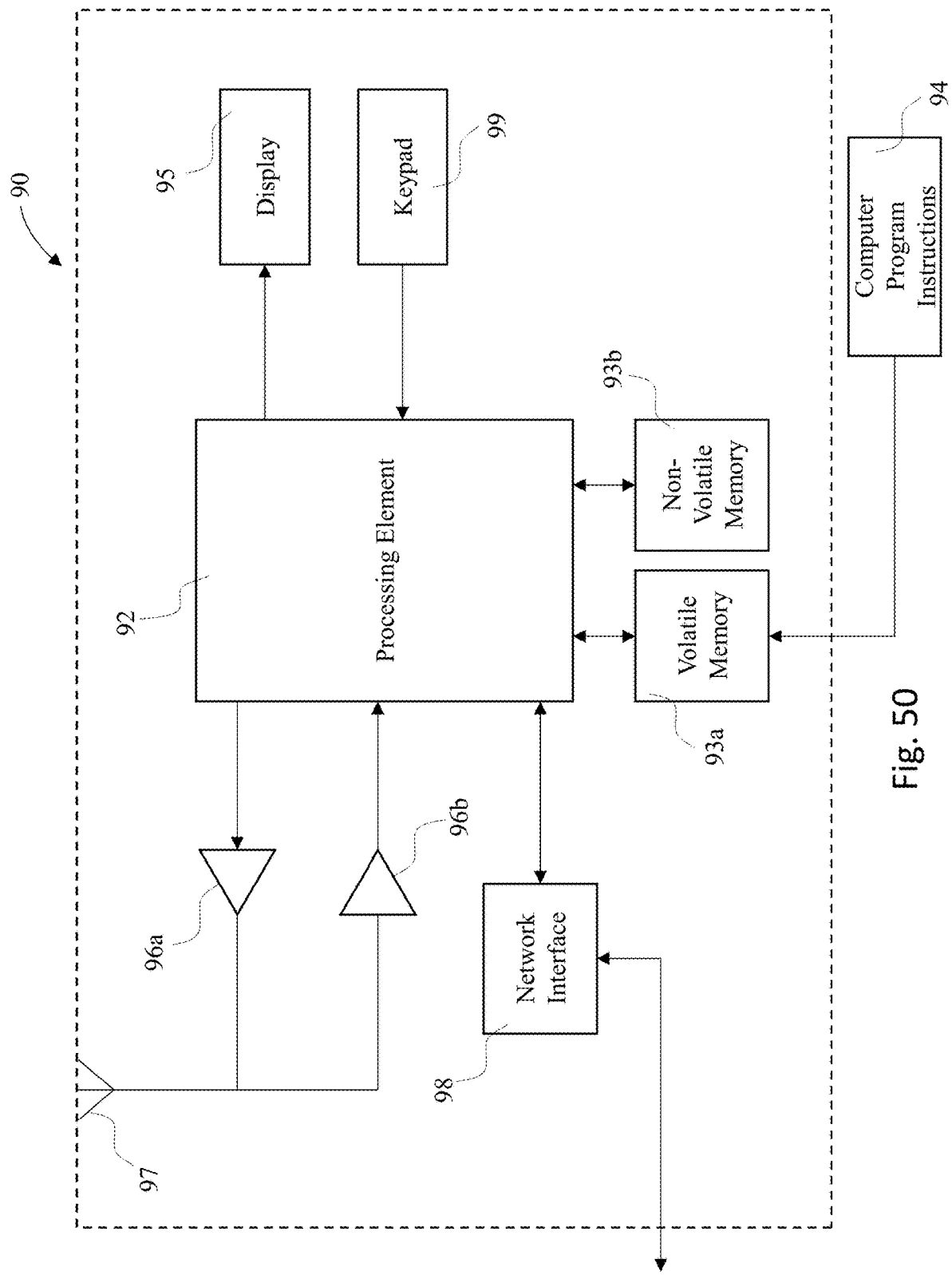
FIG. 50 illustrates a computing device configured to carry out 3D printing methods and microdevice fabrication methods described in the present disclosure, according to an embodiment discussed herein.

FIG. 50 provides an illustrative schematic representative of an external computing device 90 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The external computing device 90 can be operated by various parties. As shown in FIG. 50, the external computing device 90 can include an antenna 97, a transmitter 96a (e.g., radio), a receiver 96b (e.g., radio), and a processing element 92 (e.g., CPLDs, microprocessors, multi-core processors, coprocessing entities, ASIPs, microcontrollers, and/or controllers) that provides signals to and receives signals from the transmitter 96a and receiver 96b, correspondingly.

The signals provided to and received from the transmitter 96a and the receiver 96b, correspondingly, may include signaling information/data in accordance with air interface standards of applicable wireless systems. In this regard, the external computing device 90 may be capable of operating with one or more air interface standards, communication protocols, modulation types, and access types. More particularly, the external computing device 90 may operate in accordance with any of a number of wireless communication standards and protocols, such as those described above with regard to the computing device 80. In a particular embodiment, the external computing device 90 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing device 400 may operate in accordance with multiple wired communication standards and protocols, such as those described above with regard to the computing device 80 via a network interface 98.

Via these communication standards and protocols, the external computing device 90 can communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing device 90 can also download changes, add-ons, and updates, for instance, to its firmware, software (e.g., including executable instructions, applications, program modules), and operating system.

According to one embodiment, the external computing device 90 may include location determining aspects, devices, modules, functionalities, and/or similar words used herein interchangeably. For example, the external computing device 90 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating a position of the external computing device 90 in connection with a variety of other systems, including cellular towers, Wi-Fi access points, and/or the like. Similarly, the external computing device 90 may include indoor positioning aspects, such as a location module adapted to acquire, for example, latitude, longitude, altitude, geocode, course, direction, heading, speed, time, date, and/or various other information/data. Some of the indoor systems may use various position or location technologies, including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing device 90 may also comprise a user interface (that can include a display 95 coupled to the processing element 92) and/or a user input interface (coupled to the processing element 92). For example, the user interface may be a user application, browser, user interface, and/or similar words used herein interchangeably executing on and/or accessible via the external computing device 90 to interact with and/or cause display of information/data from the computing device 80, as described herein. The user input interface can comprise any of a number of devices or interfaces allowing the external computing device 90 to receive data, such as a keypad 99 (hard or soft), a touch display, voice/speech or motion interfaces, or other input device. In embodiments including a keypad 99, the keypad 99 can include (or cause display of) the conventional numeric (0-9) and related keys (#, *), and other keys used for operating the external computing device 90 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing device 90 can also include volatile storage or memory 93a and/or non-volatile storage or memory 93b, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory (93a, 93b) can store databases, database instances, database management systems, data, applications, programs, program modules, scripts, source code, object code, byte code, compiled code, interpreted code, machine code, executable instructions, and/or the like to implement the functions of the external computing device 90. As indicated, this may include a user application that is resident on the entity or accessible through a browser or other user interface for communicating with the computing device 80 and/or various other computing entities.

In another embodiment, the external computing device 90 may include one or more components or functionalities that are the same or similar to those of the computing device 80, as described in greater detail above. As will be recognized, these architectures and descriptions are provided for exemplary or illustrative purposes only and are not meant to limit the scope of this disclosure to one, some, or all of the various embodiments described herein.

In some embodiments, the printing apparatus/device, such as shown, e.g., in FIGS. 7, 16A-16C, 17, 18, 19, 21A, 23A-23B, etc., can comprise and/or be in communication with the computing device 80, the computing device 80 being suitable to carry out movement of the various components of the printing apparatus/device, flow rates or deposition/dispersal volumes, or the like. In some embodiments, the printing apparatus/device or a component thereof, e.g., the computing device 80, can be configured to be in communication with the external computing device 90, which can be configured to provide instructions for printing, a design file for a printed article, printing nozzle and/or non-solvent vapor dispersion apparatus path instructions, or the like to the computing device 80, which is configured to carry out printing.

FIGS. 51-56 illustrate various stereolithographic methods, such as described elsewhere herein. The methods described herein can be carried out by means, such as the computing device 80 and/or the external computing device 90.

Figure 51:
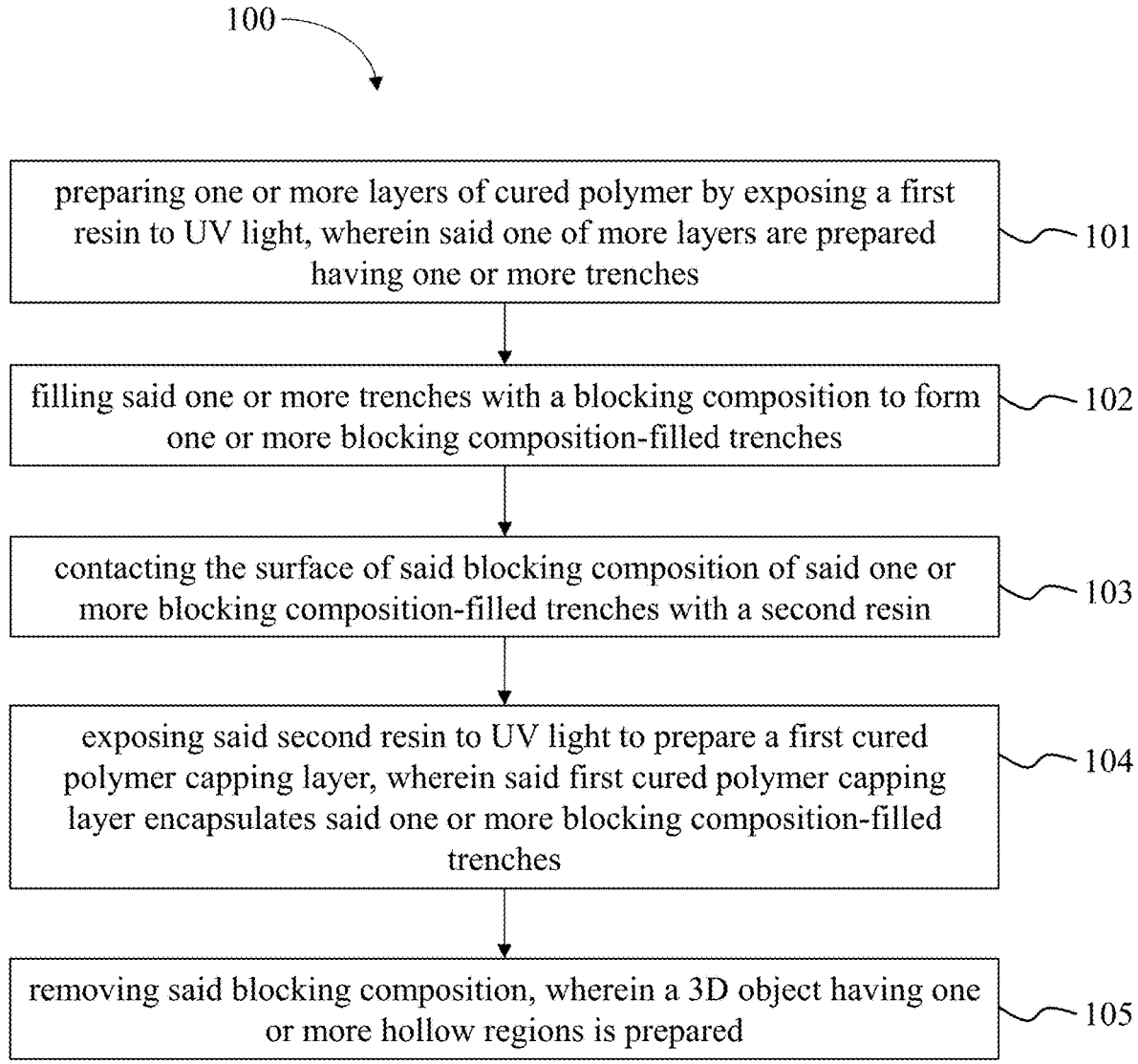
FIG. 51 illustrates a method for 3D printing microdevices, according to an embodiment discussed herein.

Referring now to FIG. 51, a method 100 is illustrated that comprises preparing one or more layers of cured polymer by exposing a first resin to UV light, wherein said one of more layers are prepared having one or more trenches, at 101. The method 100 can further comprise filling said one or more trenches with a blocking composition to form one or more blocking composition-filled trenches, at 102. The method 100 can further comprise contacting the surface of said blocking composition of said one or more blocking composition-filled trenches with a second resin, at 103. The method 100 can further comprise exposing said second resin to UV light to prepare a first cured polymer capping layer, wherein said first cured polymer capping layer encapsulates said one or more blocking composition-filled trenches, at 104. The method 100 can further comprise removing said blocking composition, wherein a 3D object having one or more hollow regions is prepared, at 105.

Figure 52:
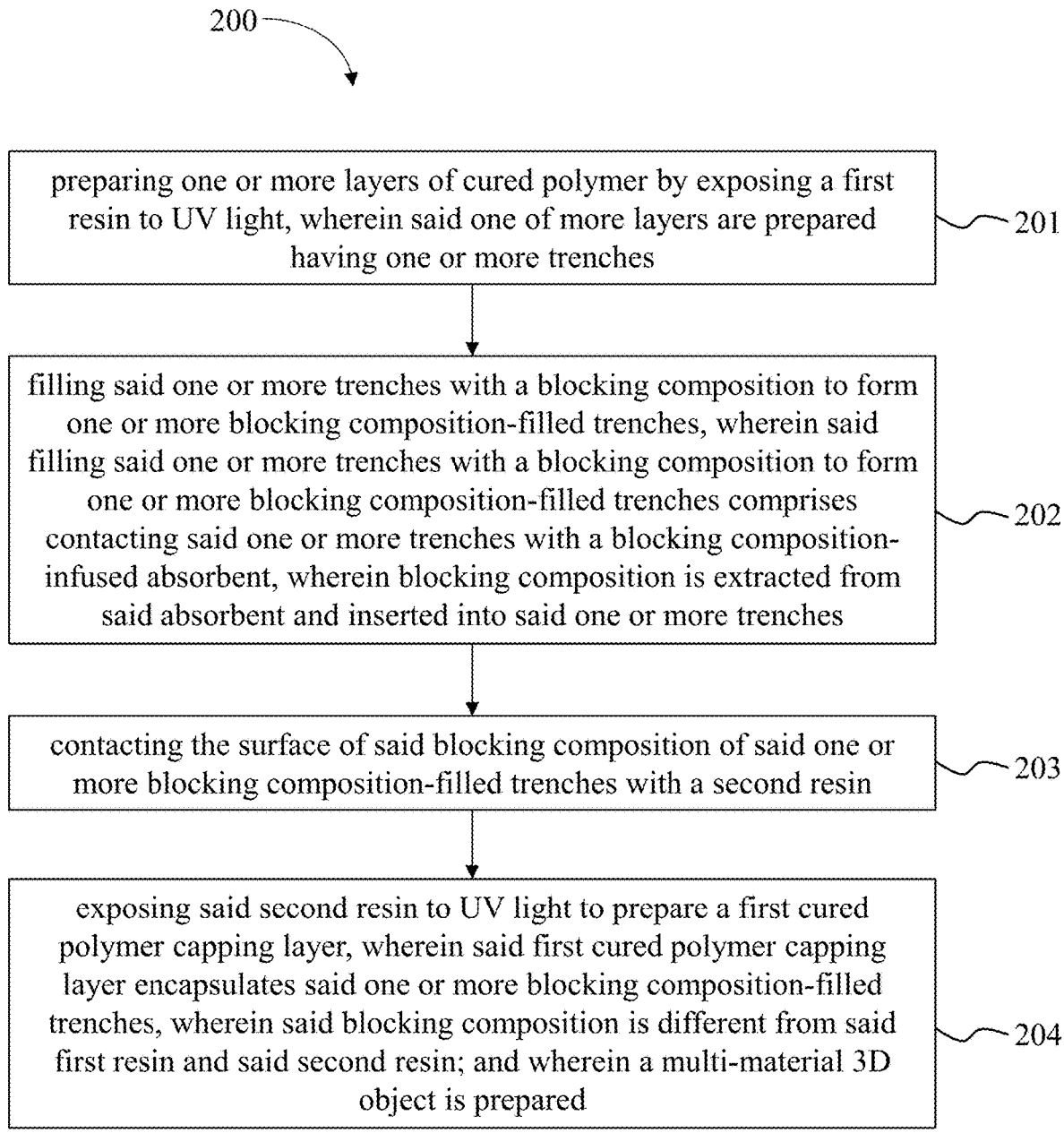
FIG. 52 illustrates a method for 3D printing microdevices, according to an embodiment discussed herein.

Referring now to FIG. 52, a method 200 is illustrated that comprises preparing one or more layers of cured polymer by exposing a first resin to UV light, wherein said one of more layers are prepared having one or more trenches, at 201. The method 200 can further comprise filling said one or more trenches with a blocking composition to form one or more blocking composition-filled trenches, wherein said filling said one or more trenches with a blocking composition to form one or more blocking composition-filled trenches comprises contacting said one or more trenches with a blocking composition-infused absorbent, wherein blocking composition is extracted from said absorbent and inserted into said one or more trenches, at 202. The method 200 can further comprise contacting the surface of said blocking composition of said one or more blocking composition-filled trenches with a second resin, at 203. The method 200 can further comprise exposing said second resin to UV light to prepare a first cured polymer capping layer, wherein said first cured polymer capping layer encapsulates said one or more blocking composition-filled trenches, wherein said blocking composition is different from said first resin and said second resin; and wherein a multi-material 3D object is prepared, at 204.

Figure 53:
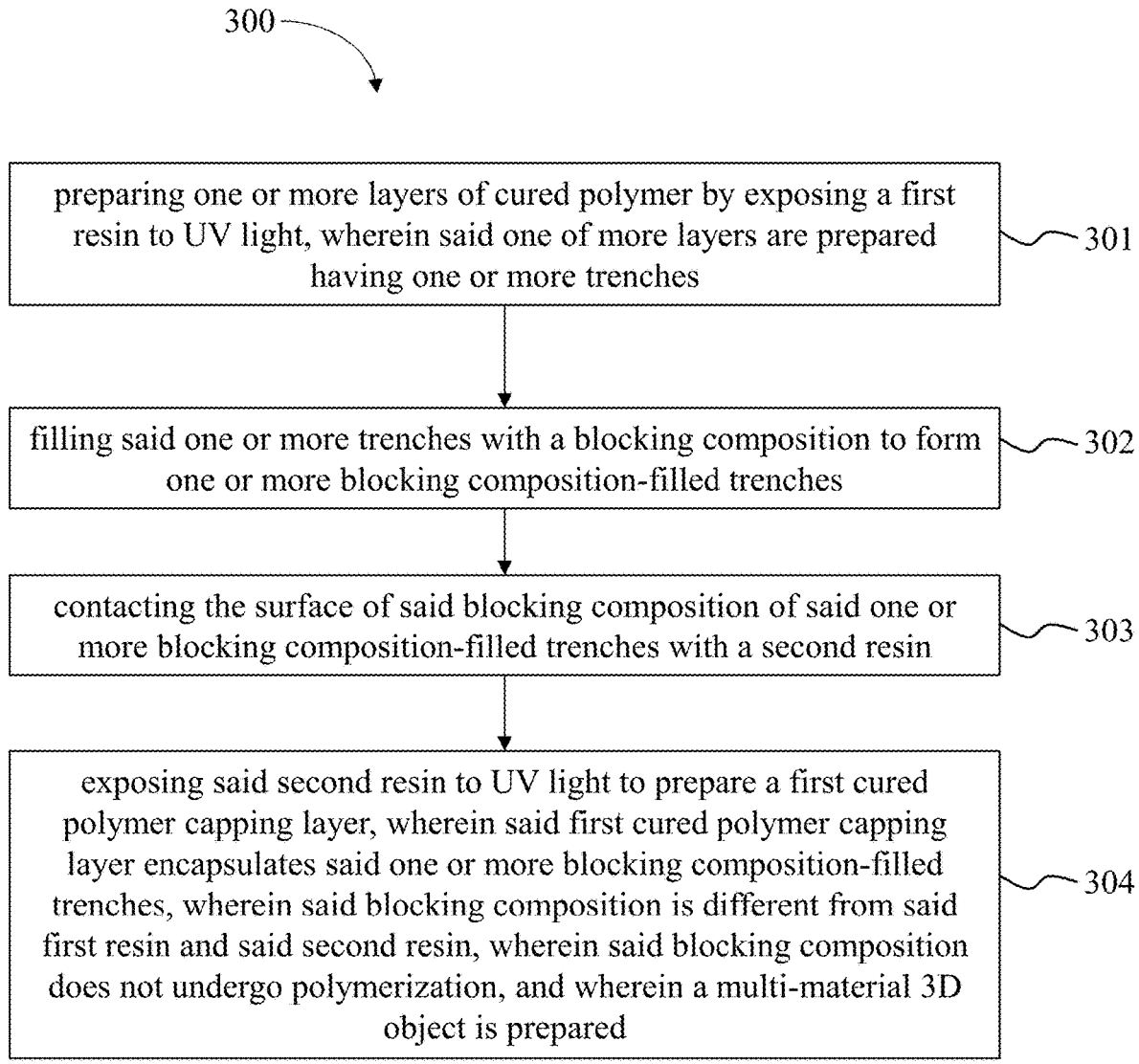
FIG. 53 illustrates a method for 3D printing microdevices, according to an embodiment discussed herein.

Referring now to FIG. 53, a method 300 is illustrated that comprises preparing one or more layers of cured polymer by exposing a first resin to UV light, wherein said one of more layers are prepared having one or more trenches, at 301. The method 300 can further comprise filling said one or more trenches with a blocking composition to form one or more blocking composition-filled trenches, at 302. The method 300 can further comprise contacting the surface of said blocking composition of said one or more blocking composition-filled trenches with a second resin, at 303. The method 300 can further comprise exposing said second resin to UV light to prepare a first cured polymer capping layer, wherein said first cured polymer capping layer encapsulates said one or more blocking composition-filled trenches, wherein said blocking composition is different from said first resin and said second resin, wherein said blocking composition does not undergo polymerization, and wherein a multi-material 3D object is prepared, at 304.

Figure 54:
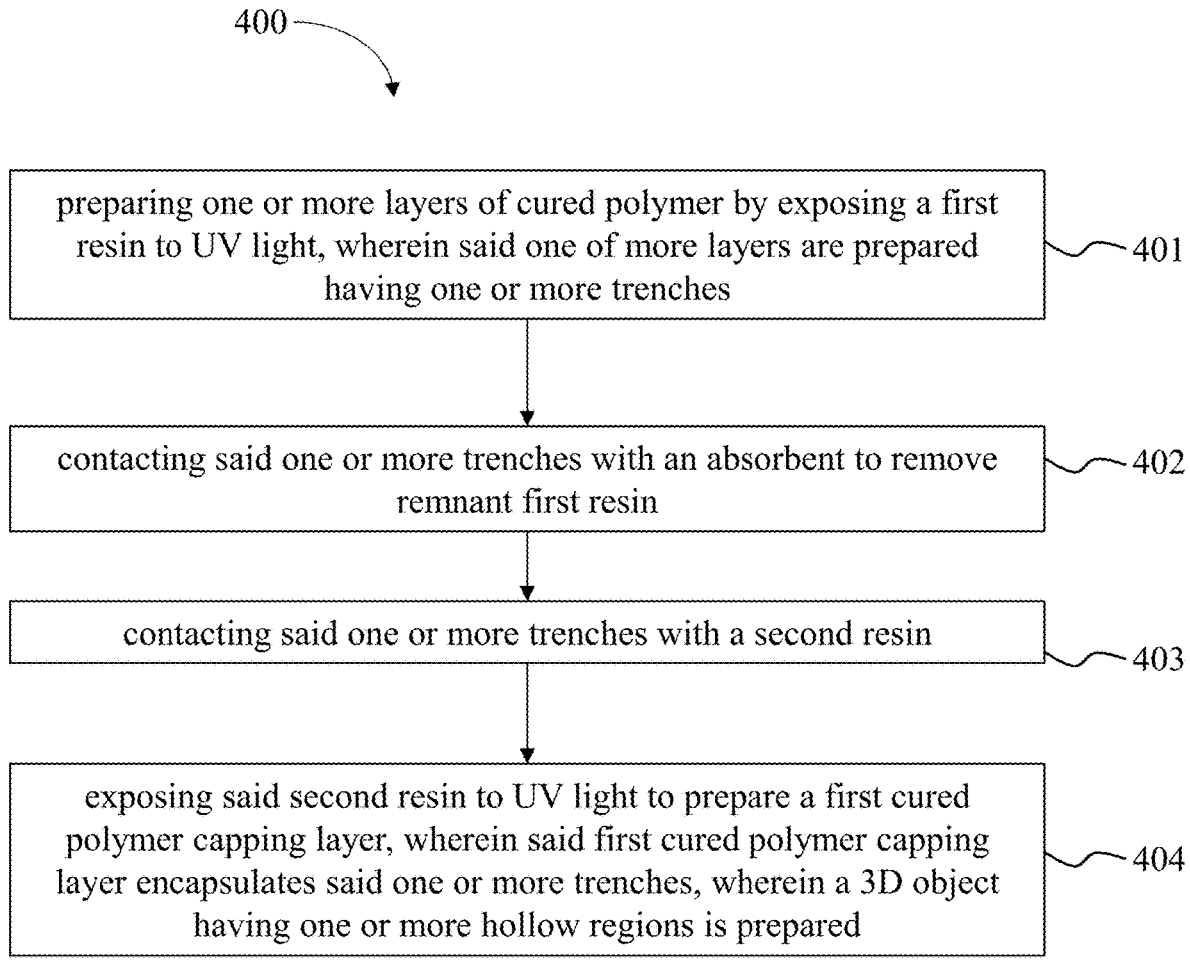
FIG. 54 illustrates a method for 3D printing microdevices, according to an embodiment discussed herein.

Referring now to FIG. 54, a method 400 is illustrated that comprises preparing one or more layers of cured polymer by exposing a first resin to UV light, wherein said one of more layers are prepared having one or more trenches, at 401. The method 400 can further comprise contacting said one or more trenches with an absorbent to remove remnant first resin, at 402. The method 400 can further comprise contacting said one or more trenches with a second resin, at 403. The method 400 can further comprise exposing said second resin to UV light to prepare a first cured polymer capping layer, wherein said first cured polymer capping layer encapsulates said one or more trenches, wherein a 3D object having one or more hollow regions is prepared, at 404.

Figure 55:
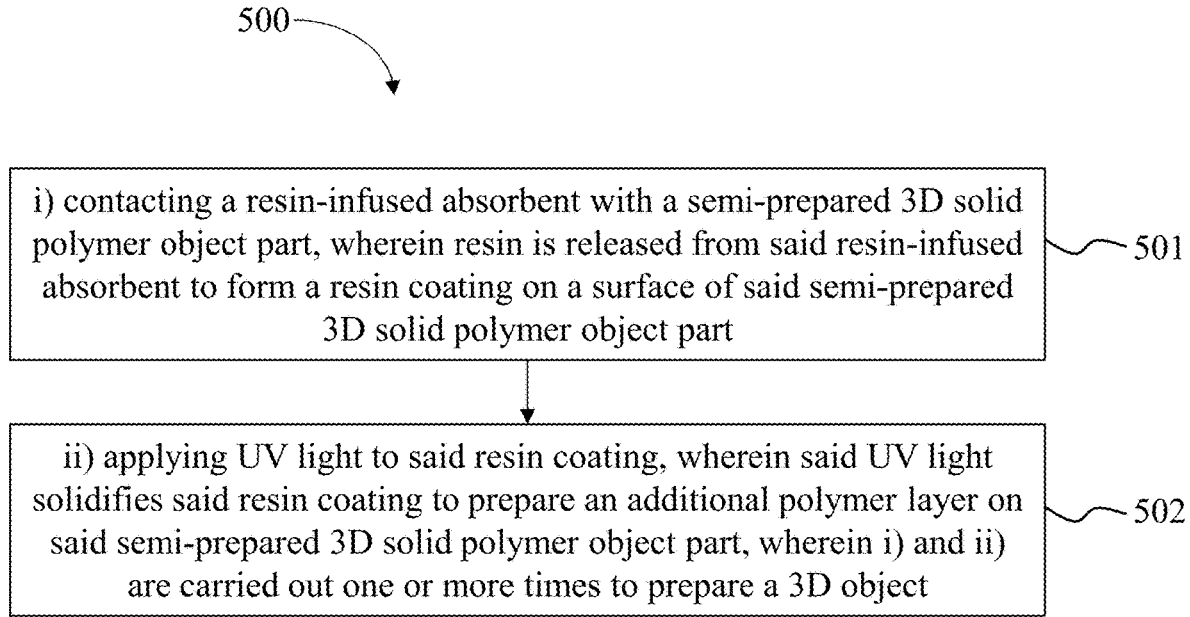
FIG. 55 illustrates a method for 3D printing microdevices, according to an embodiment discussed herein.

Referring now to FIG. 55, a method 500 is illustrated that comprises i) contacting a resin-infused absorbent with a semi-prepared 3D solid polymer object part, wherein resin is released from said resin-infused absorbent to form a resin coating on a surface of said semi-prepared 3D solid polymer object part, at 501. The method 500 can further comprise ii) applying UV light to said resin coating, wherein said UV light solidifies said resin coating to prepare an additional polymer layer on said semi-prepared 3D solid polymer object part, wherein i) and ii) are carried out one or more times to prepare a 3D object, at 502.

Figure 56:
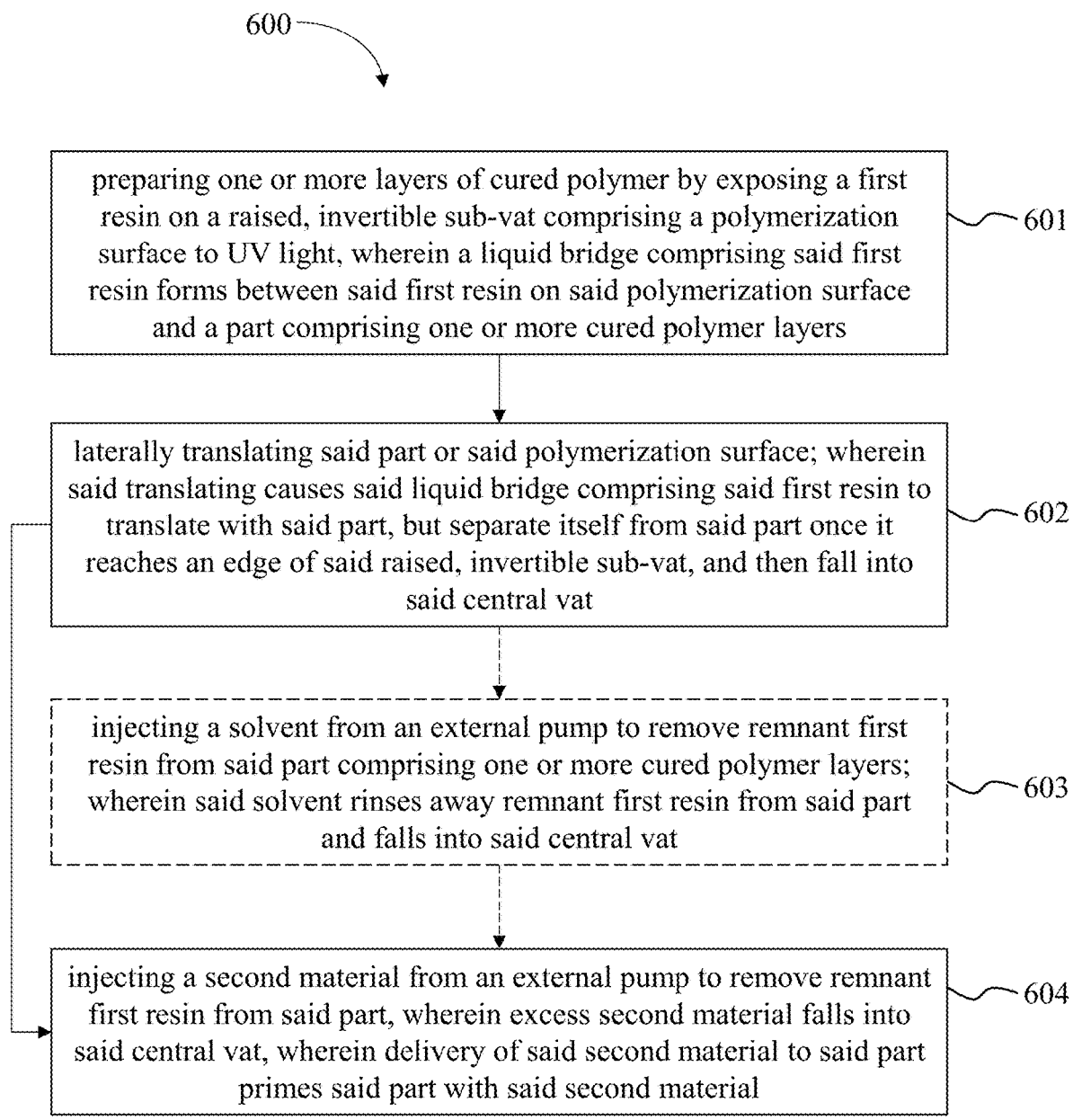
FIG. 56 illustrates a method for 3D printing microdevices, according to an embodiment discussed herein.

Referring now to FIG. 56, a method 600 is illustrated that comprises preparing one or more layers of cured polymer by exposing a first resin on a raised, invertible sub-vat comprising a polymerization surface to UV light, wherein a liquid bridge comprising said first resin forms between said first resin on said polymerization surface and a part comprising one or more cured polymer layers, at 601. The method 600 can further comprise laterally translating said part or said polymerization surface; wherein said translating causes said liquid bridge comprising said first resin to translate with said part, but separate itself from said part once it reaches an edge of said raised, invertible sub-vat, and then fall into said central vat, at 602. The method 600 can, optionally, further comprise injecting a solvent from an external pump to remove remnant first resin from said part comprising one or more cured polymer layers; wherein said solvent rinses away remnant first resin from said part and falls into said central vat, at 603. The method 600 can further comprise injecting a second material from an external pump to remove remnant first resin from said part, wherein excess second material falls into said central vat, wherein delivery of said second material to said part primes said part with said second material, at 604.

In certain embodiments of the described modular stereolithography apparatus, the substrate and the central vat (which comprises the invertible sub-vats) can be translated relative to one another.

Further, the disclosure comprises examples according to the following embodiments:

1. A stereolithographic method for preparing a 3D object having one or more hollow regions, comprising:
   preparing one or more layers of cured polymer by exposing a first resin to UV light;
   wherein said one of more layers are prepared having one or more trenches;
   filling said one or more trenches with a blocking composition to form one or more blocking composition-filled trenches;
   contacting the surface of said blocking composition of said one or more blocking composition-filled trenches with a second resin;
   exposing said second resin to UV light to prepare a first cured polymer capping layer, wherein said first cured polymer capping layer encapsulates said one or more blocking composition-filled trenches; and
   removing said blocking composition;
   wherein a 3D object having one or more hollow regions is prepared.

2. The stereolithographic method of embodiment 1, wherein said blocking composition is a liquid that is inert to photopolymerization.

3. The stereolithographic method of embodiment 1 or 2, wherein said liquid that is inert to polymerization is a solvent.

4. The stereolithographic method of embodiment 3, wherein said solvent is selected from the group consisting of isopropanol, ethyl acetate, water, ethanol, methanol, acetic acid, formic acid, dimethyl sulfoxide, and n-butanol, or a combination thereof.

5. The stereolithographic method of embodiment 1, wherein said blocking composition comprises one or more of the following:
   a) one or more monomers;
   b) one or more initiators;
   c) one or more solvents;
   d) one or more absorbers/dyes;
   e) one or more inhibitors; and optionally
   f) ceramic particles.

6. The stereolithographic method of embodiment 5, wherein said one or more monomers are selected from the group consisting of 1,6-hexanediol diacrylate (HDDA) and poly(ethylene glycol) diacrylate (PEGDA); said one or more initiators are selected from the group consisting of 4,4'-bis (dimethylamino)benzophenone, thioxanthen-9-one, 1-hydroxy-cyclohexyl-phenyl-ketone, 2,4-dinitro-1-naphthol, and diphenyl(2,4,6-trimethylbenzoyl)phosphine oxide (TPO); and said one or more absorbers/dyes are selected from the group consisting of 2,5-bis(5-tert-butyl-benzoxazol-2-yl)thiophene, avobenzone, 2,4-dinitro-1-naphthol, Nigrosin (CI 50415, Solvent black 5), and Sudan I.

7. The stereolithographic method of embodiment 1, wherein said blocking composition is selected from the group consisting of glycerol, ethylene glycol, HDDA, PEGDA, PEGDA with Sudan I absorber (e.g., with about 0.1-5 wt % Sudan I absorber), HDDA with Sudan I absorber (e.g., with 0.1-5 wt % Sudan I absorber), HDDA with fumed silica particles, HDDA or PEGDA with Sudan I absorber (e.g., with 0.1-5 wt % Sudan I absorber) and with TPO initiator (e.g., with 0.1-5 wt % TPO initiator), and polyethylene glycol or HDDA monomer with fumed silica particles, silicone oil, and polydimethylsiloxane (PDMS), or a combination thereof.

8. The stereolithographic method of embodiment 1, wherein, prior to contacting said one or more trenches with a blocking composition, the method comprises contacting said one or more trenches with a first absorbent to remove remnant first resin.

9. The stereolithographic method of any one of embodiments 1-8, further comprising contacting said first cured polymer capping layer with a second absorbent to remove remnant blocking composition and/or first resin.

10. The stereolithographic method of any one of embodiments 1-9, further comprising preparing one or more additional capping layers of cured polymer disposed on said first cured polymer capping layer, wherein said one or more additional capping layers may continue to encapsulate said blocking composition-filled trenches.

11. The stereolithographic method of embodiment 1, wherein said blocking composition is removed by vacuum.

12. The stereolithographic method of embodiment 1, wherein said blocking composition is removed by evaporation.

13. The stereolithographic method of any one of embodiments 1-12, wherein said filling said one or more trenches with a blocking composition to form one or more blocking composition-filled trenches comprises submerging said one or more trenches in said blocking composition.

14. The stereolithographic method of any one of embodiments 1-13, wherein said filling said one or more trenches with a blocking composition to form one or more blocking composition-filled trenches comprises contacting said one or more trenches with a blocking composition-infused absorbent, wherein blocking composition is extracted from said absorbent and inserted into said one or more trenches.

15. The stereolithographic method of embodiment 14, wherein said absorbent is a sponge, rubber, foam, or brush.

16. The stereolithographic method of any one of embodiments 1-13, wherein said filling said one or more trenches with a blocking composition to form one or more blocking composition-filled trenches comprises applying said blocking composition to said trenches using a pump, pipette, or syringe.

17. The stereolithographic method of any one of embodiments 1-13, wherein said contacting the surface of said blocking composition of said one or more blocking composition-filled trenches with a second resin comprises submerging said one or more blocking composition-filled trenches in said second resin.

18. A 3D object prepared by the stereolithographic method of any one of embodiments 1-17.

19. A stereolithographic method for preparing a multi-material 3D object, comprising:
preparing one or more layers of cured polymer by exposing a first resin to UV light;
wherein said one of more layers are prepared having one or more trenches;
filling said one or more trenches with a blocking composition to form one or more blocking composition-filled trenches;
wherein said filling said one or more trenches with a blocking composition to form one or more blocking composition-filled trenches comprises contacting said one or more trenches with a blocking composition-infused absorbent, wherein blocking composition is extracted from said absorbent and inserted into said one or more trenches;
contacting the surface of said blocking composition of said one or more blocking composition-filled trenches with a second resin; and
exposing said second resin to UV light to prepare a first cured polymer capping layer, wherein said first cured polymer capping layer encapsulates said one or more blocking composition-filled trenches;
wherein said blocking composition is different from said first resin and said second resin; and wherein a multi-material 3D object is prepared.

20. The stereolithographic method of embodiment 19, wherein said blocking composition is a thermally curable resin, wherein the method further comprises heating said prepared 3D object to thermally cure the blocking composition.

21. The stereolithographic method of embodiment 20, wherein said thermally curable resin is selected from the group consisting of urethane, epoxy, polyester, and silicone.

22. The stereolithographic method of embodiment 19, wherein said blocking composition is a photopolymerizable resin.

23. The stereolithographic method of embodiment 19, wherein said blocking composition is selected from the group consisting of PEGDA monomer with dispersed PEDOT:PSS particles, PEGDA monomer with colored dyes or pigments, and water with PEGDA and dispersed PEDOT:PSS particles, or a combination thereof.

24. The stereolithographic method of embodiment 19, wherein, prior to contacting said one or more trenches with a blocking composition, the method comprises contacting said one or more trenches with a first absorbent to remove remnant first resin.

25. The stereolithographic method of any one of embodiments 19-24, further comprising preparing one or more additional capping layers of cured polymer disposed on said first cured polymer capping layer.

26. A multi-material 3D object prepared by the stereolithographic method of any one of embodiments 19-26.

27. A stereolithographic method for preparing a multi-material 3D object, comprising:
preparing one or more layers of cured polymer by exposing a first resin to UV light;
wherein said one of more layers are prepared having one or more trenches;
filling said one or more trenches with a blocking composition to form one or more blocking composition-filled trenches;
contacting the surface of said blocking composition of said one or more blocking composition-filled trenches with a second resin;
exposing said second resin to UV light to prepare a first cured polymer capping layer, wherein said first cured polymer capping layer encapsulates said one or more blocking composition-filled trenches;
wherein said blocking composition is different from said first resin and said second resin;
wherein said blocking composition does not undergo polymerization; and
wherein a multi-material 3D object is prepared.

28. The stereolithographic method of embodiment 27, wherein said filling said one or more trenches with a blocking composition to form one or more blocking composition-filled trenches comprises submerging said one or more trenches in said blocking composition.

29 The stereolithographic method of embodiment 27, wherein said filling said one or more trenches with a blocking composition to form one or more blocking composition-filled trenches comprises contacting said one or more trenches with a blocking composition-infused absorbent, wherein blocking composition is extracted from said absorbent and inserted into said one or more trenches.

30. The stereolithographic method of embodiment 29, wherein said absorbent is a sponge, rubber, foam, or brush.

31. The stereolithographic method of embodiment 27, wherein said filling said one or more trenches with a blocking composition to form one or more blocking composition-filled trenches comprises applying said blocking composition to said trenches using a pump, pipette, or syringe.

32. The stereolithographic method of embodiment 27, wherein said contacting the surface of said blocking composition of said one or more blocking composition-filled trenches with a second resin comprises submerging said one or more blocking composition-filled trenches in said second resin.

33. A 3D object prepared by the stereolithographic method of any one of embodiments 27-32.

34. A stereolithographic method for preparing a 3D object having one or more hollow regions, comprising:
preparing one or more layers of cured polymer by exposing a first resin to UV light;
wherein said one of more layers are prepared having one or more trenches;
contacting said one or more trenches with an absorbent to remove remnant first resin;
contacting said one or more trenches with a second resin; and
exposing said second resin to UV light to prepare a first cured polymer capping layer, wherein said first cured polymer capping layer encapsulates said one or more trenches;
wherein a 3D object having one or more hollow regions is prepared.

35. The stereolithographic method of embodiment 34, further comprising preparing one or more additional capping layers of cured polymer disposed on said first cured polymer capping layer, and iteratively contacting said one or more trenches with an absorbent to remove remnant resin.

36. The stereolithographic method of embodiment 34, wherein said one or more hollow regions are helical-shaped.

37. A 3D object prepared by the stereolithographic method of any one of embodiments 34-36.

38. A method for dispensing or sourcing a resin in preparing a 3D object by stereolithographic means, comprising:
  i) contacting a resin-infused absorbent with a semi-prepared 3D solid polymer object part, wherein resin is released from said resin-infused absorbent to form a resin coating on a surface of said semi-prepared 3D solid polymer object part;
  ii) applying UV light to said resin coating, wherein said UV light solidifies said resin coating to prepare an additional polymer layer on said semi-prepared 3D solid polymer object part;
  wherein i) and ii) are carried out one or more times to prepare a 3D object.

39. The method of embodiment 38, wherein said absorbent in said resin-infused absorbent is selected from the group consisting of a sponge, a foam, brush, and a rubber, or a combination thereof.

40. A modular stereolithography apparatus, comprising:
  a substrate; and
  a central vat, wherein said central vat comprises two or more invertible sub-vats;
  wherein each of said invertible sub-vats can independently be inverted to form a raised surface or upright to remain a vat.

41. The modular stereolithography apparatus of embodiment 40, wherein said central vat further comprises a depression for retaining waste generated throughout a stereolithography printing process.

42. The modular stereolithography apparatus of embodiment 40 or 41, wherein said central vat comprises two invertible sub-vats.

43. The modular stereolithography apparatus of any one of embodiments 40-42, wherein each of said invertible sub-vats, when inverted to form a raised surface, or when upright to remain a vat, may function as a polymerization surface.

44. The modular stereolithography apparatus of embodiment 43, wherein said polymerization surface comprises a material selected from the group consisting of TEFLON, FEP, PDMS, and glass, or a combination thereof.

45. The modular stereolithography apparatus of any one of embodiments 40-44, wherein each of said invertible sub-vats, when upright to remain a vat, contains a material selected from the group consisting of a liquid and an absorbent.

46. The modular stereolithography apparatus of any one of embodiments 42-44, wherein one of said invertible sub-vats is inverted to form a raised surface and the other of said invertible, sub-vats is upright to remain a vat.

47. The modular stereolithography apparatus of any one of embodiments 42-44, wherein said two invertible sub-vats are inverted to form two raised surfaces.

48. The modular stereolithography apparatus of any one of embodiments 42-47, further comprising one or more external pumps for delivering a material to a 3D printed part.

49. The modular stereolithography apparatus of embodiment 48, wherein the material delivered to the 3D printed part is for use in cleaning the 3D printed part, or for use in delivering a material to the 3D printed part that will be incorporated into the 3D part.

50. The modular stereolithography apparatus of any one of embodiments 40-49, wherein said substrate and said central vat comprising said two or more invertible sub-vats can be translated relative to one another.

51. The modular stereolithography apparatus of any one of embodiments 40-50, wherein said invertible sub-vats share a wall, wherein said wall contains a slit; and wherein each of said invertible sub-vats holds an inert immiscible liquid, wherein said inert immiscible liquid is in liquid communication with each invertible sub-vat.

52. A method for cleaning and/or priming a part when alternating between different materials in fabrication of a multi-material 3D object, wherein said method leverages surface tension of a polymerization surface and a stereolithography apparatus comprising a central vat comprising at least one invertible sub-vat, said method comprising:
  preparing one or more layers of cured polymer by exposing a first resin on a raised, invertible sub-vat comprising a polymerization surface to UV light;
  wherein a liquid bridge comprising said first resin forms between said first resin on said polymerization surface and a part comprising one or more cured polymer layers;
  laterally translating said part or said polymerization surface; wherein said translating causes said liquid bridge comprising said first resin to translate with said part, but separate itself from said part once it reaches an edge of said raised, invertible sub-vat, and then fall into said central vat;
  optionally, injecting a solvent from an external pump to remove remnant first resin from said part comprising one or more cured polymer layers; wherein said solvent rinses away remnant first resin from said part and falls into said central vat;
  injecting a second material from an external pump to remove remnant first resin from said part, wherein excess second material falls into said central vat;
  wherein delivery of said second material to said part primes said part with said second material.

53. The method of embodiment 52, wherein said second material is a blocking composition or a second resin.

54. The method of embodiment 52, wherein said stereolithography apparatus comprises two invertible sub-vats.

55. The method of any one of embodiments 1-54, wherein said further comprising preparing one or more additional capping layers of cured polymer disposed on said first cured polymer capping layer, wherein said one or more additional capping layers may continue to encapsulate said blocking composition-filled trenches comprises:
  a) submerging said substrate, which comprises a semi-prepared 3D object, in a resin, wherein the resin forms a coating on the semi-prepared 3D part; and
  b) exposing the coating to UV light to cure the resin and prepare an additional capping layer;
  wherein a) and b) may be repeated to prepare additional capping layers.

57. The method of any one of embodiments 1-54, wherein preparing one or more additional capping layers of cured polymer disposed on said first cured polymer capping layer comprises:
  a) submerging the 3D object, in a resin, wherein the resin forms a coating on the 3D object; and
  b) exposing the coating to UV light to cure the resin and prepare an additional capping layer;

wherein a) and b) may be repeated to prepare additional capping layers.

58. The method of any one of embodiments 1-54, wherein said further comprising preparing one or more additional capping layers of cured polymer disposed on said first cured polymer capping layer, wherein said one or more additional capping layers may continue to encapsulate said blocking composition-filled trenches comprises:
  a) contacting said 3D object with a resin-infused absorbent, wherein resin is extracted from said absorbent and forms a layer on the 3D object; and
  b) exposing UV light to the layer to cure the resin and prepare an additional capping layer;
  wherein a) and b) may be repeated to prepare additional capping layers.

59. The method of any one of embodiments 1-54, wherein preparing one or more additional capping layers of cured polymer disposed on said first cured polymer capping layer comprises:
  a) contacting said 3D object with a resin-infused absorbent, wherein resin is extracted from said absorbent and forms a layer on the 3D object; and
  b) exposing UV light to the layer to cure the resin and prepare an additional capping layer;
  wherein a) and b) may be repeated to prepare additional capping layers.

60. A stereolithographic method of preparing a 3D object having hollow regions and/or a composition comprised of multiple materials, comprising the methods of any one of embodiments 1-17, 19-25, 27-32, 34-36, 38-39, or 52-54.

According to other embodiments, a stereolithographic apparatus can be provided for preparing a multi-material 3D object, the apparatus comprising: one or more processors; and one or more memory devices storing program codes, wherein the one or more memory devices and the program codes are configured, with the one or more processors, to cause the apparatus at least to: expose a first resin to UV light to form one or more layers of cured polymer, wherein said one of more layers of the cured polymer have one or more trenches; fill said one or more trenches of the one or more layers of the cured polymer with a blocking composition to form one or more blocking composition-filled trenches; contact a surface of said blocking composition of said one or more blocking composition-filled trenches with a second resin; expose the second resin to UV light to prepare a first cured polymer capping layer, wherein said first cured polymer capping layer encapsulates said one or more blocking composition-filled trenches; and remove said blocking composition to prepare a 3D object having one or more hollow regions formed therein. The apparatus can comprise computing devices such as those described herein (e.g., 80 and/or 90).

Efforts have been made to ensure accuracy with respect to numbers used (e.g., amounts, temperature, etc.) but some experimental errors and deviations should be accounted for.

One skilled in the art will recognize many methods and materials similar or equivalent to those described herein, which could be used in the practicing the subject matter described herein. The present disclosure is in no way limited to just the methods and materials described.

Throughout this specification and the claims, the words "comprise," "comprises," and "comprising" are used in a non-exclusive sense, except where the context requires otherwise. It is understood that examples described herein include "consisting of" and/or "consisting essentially of" examples.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller rangers is also encompassed, subject to any specifically excluded limit in the stated range. Where the stated range includes one or both of the limits, ranges excluding either or both of those included limits are also included.

Many modifications and other examples set forth herein will come to mind to one skilled in the art to which this subject matter pertains having the benefit of the teachings presented in the foregoing descriptions and the associated drawings. Therefore, it is to be understood that the subject matter is not to be limited to the specific examples disclosed and that modifications and other examples are intended to be included within the scope of the appended claims. Although specific terms are employed herein, they are used in a generic and descriptive sense only and not for purposes of limitation.

It should be appreciated that all combinations of the foregoing concepts and additional concepts discussed in greater detail below (provided such concepts are not mutually inconsistent) are contemplated as being part of the inventive subject matter disclosed herein. In particular, the combinations of claimed subject matter appearing at the end of this disclosure are contemplated as being part of the inventive subject matter disclosed herein. It should be appreciated that terminology explicitly employed herein that also may appear in any disclosure incorporated by reference should be accorded a meaning consistent with the particular concepts disclosed herein.

In some embodiments, one or more of the operations, steps, elements, or processes described herein may be modified or further amplified as described below. Moreover, in some embodiments, additional optional operations may also be included. It should be appreciated that each of the modifications, optional additions, and/or amplifications described herein may be included with the operations previously described herein, either alone or in combination, with any others from among the features described herein.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular. Further, any reference to dispensing, disposing, depositing, dispersing, conveying, injecting, inserting, communicating, and other such terms of art are not to be construed as limiting the element to any particular means or method or apparatus or system, and is taken to mean conveying the material within the receiving vessel, solution, conduit, or the like by way of any suitable method.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation. Specific equipment and materials described in the examples are for illustration only and not for purposes of limitation. For instance, any and all articles, portions of articles, structures, bulk materials, and/or the like, having any form factor, scale, dimensions, aesthetic attributes, material properties, internal structures, and/or mechanical properties, which are formed according to any of the disclosed methods, approaches, processes, or variations thereof, using any devices, equipment, apparatuses, systems, or variations thereof, using any of the build material s/resins described herein or variations thereof, are all contemplated and covered by the present disclosure. None of the examples provided are intended to, nor should they, limit in any way the scope of the present disclosure.

The various portions of the present disclosure, such as the Background, Summary, Brief Description of the Drawings, and Abstract sections, are provided to comply with requirements of the MPEP and are not to be considered an admission of prior art or a suggestion that any portion or part of the disclosure constitutes common general knowledge in any country in the world. The present disclosure is provided as a discussion of the inventor's own work and improvements based on the inventor's own work. See, e.g., *Riverwood Int'l Corp. v. R. A. Jones & Co.*, 324 F.3d 1346, 1354 (Fed. Cir. 2003).

In some embodiments, one or more of the operations, steps, or processes described herein may be modified or further amplified as described below. Moreover, in some embodiments, additional optional operations may also be included. It should be appreciated that each of the modifications, optional additions, and/or amplifications described herein may be included with the operations previously described herein, either alone or in combination, with any others from among the features described herein.

Although specific advantages have been enumerated above, various embodiments may include some, none, or all of the enumerated advantages.

Other technical advantages may become readily apparent to one of ordinary skill in the art after review of the following figures and description.

It should be understood that, although exemplary embodiments are illustrated in the figures and described below, the principles of the present disclosure may be implemented using any number of techniques, whether currently known or not. The present disclosure should in no way be limited to the examples, experimental results, exemplary embodiments, preferred configurations, illustrated equipment, disclosed processes, or particular implementations and techniques illustrated in the drawings and described below.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular. Further, any reference to dispensing, disposing, depositing, dispersing, conveying, injecting, conveying, inserting, communicating, and other such terms of art are not to be construed as limiting the element to any particular means or method or apparatus or system, and is taken to mean conveying the material within the receiving vessel, solution, conduit, or the like by way of any suitable method.

Unless otherwise indicated, all numbers expressing quantities of equipment, number of steps, material quantities, material masses, material volumes, operating conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally, the term "about," as used herein when referring to a measurable value such as an amount of weight, time, volume, ratio, temperature, etc., is meant to encompass ±50% of the stated value. For example, a value of "1,000," which would be construed from above as meaning "about 1,000," indicates a range of values from 500 to 1,500, inclusive of all values and ranges therebetween. As another example, a value of "about 1,000" should be taken to indicate any single value or sub-range of values from 500 to 1,500, inclusive of the values 500 and/or 1,500. As such, if a value of "about 1,000" is disclosed or claimed, this disclosure or claim element includes, for example, the value of 500, the value of 500.0000000000001, the value of 500.1, the value of 501, . . . the value of 1,000, . . . the value of 1,499.9999999, the value of 1,500, and all other values, ranges, or sub-ranges, therebetween, including values interstitial to adjacent integers or whole numbers, to any decimal place.

Generally, the term "substantially," as used herein when referring to a measurable value, is meant to encompass ±50% of the stated value. Generally, the term "substantially," as used herein with regard to a discrete position or orientation of a piece of equipment, component, or subcomponent, is meant to encompass the discrete position ±50% of the discrete position. Generally, the term "substantially," as used herein with regard to a location of a piece of equipment, component, or subcomponent along a total range of travel of that equipment, component, or subcomponent, is meant to encompass ±50% of the location of the equipment, component, or subcomponent with regard to the total range of travel of that piece of equipment, component, or subcomponent, including translational travel, rotational travel, and extending travel in any direction, orientation, or configuration. As such, the use of the phrase "substantially disposed within a container" would be construed from above as meaning that greater than or equal to 50% of the subject element is disposed within the container. Likewise, the use of the phrase "substantially positioned within a bath" would be construed from above as meaning that greater than or equal to 50% of the subject element is positioned within the bath.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Conventional terms in the fields of additive manufacturing, materials science, and chemistry have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation. Specific equipment and materials described in the examples are for illustration only and not for purposes of limitation. For instance, any and all articles, portions of articles, structures, bulk materials, and/or the like, having any form factor, scale, dimensions, aesthetic attributes, material properties, internal structures, and/or mechanical properties, which are formed according to any of the disclosed methods, approaches, processes, or variations thereof, using any devices, equipment, apparatuses, systems, or variations thereof, using any of the build material, printing mixture, ink, yield-stress support material, or other material compositions described herein or variations thereof, are all contemplated and covered by the present disclosure. None of the examples provided are intended to, nor should they, limit in any way the scope of the present disclosure.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that some or all of the parameters, dimensions, materials, equipment, processes, methods, and configurations described herein are meant to be preferred examples and that the actual parameters, dimensions, materials, and/or configurations will depend upon the specific application or applications for which the inventive teachings are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein "at. %" refers to atomic percent, "vol. %" refers to volume percent, and "wt. %" refers to weight percent. However, in certain embodiments when "at. %" is utilized, the values described may also describe "vol. %" and/or "wt. %," when "vol. %" is utilized, the values described may also describe "at. %" and/or "wt. %," and when "wt. %" is utilized, the values described may also describe "at. %" and/or "vol. %." For example, if "20 at. %" is described in one embodiment, in other embodiments the same description may refer to "20 wt. %" or "20 vol. %." As a result, all "at. %" values should be understood to also refer to "wt. %" in some instances and "vol. %" in other instances, all "vol. %" values should be understood to also refer to "wt. %" values in some instances and "at. %" in other instances, and all "wt. %" values should be understood to refer to "at. %" in some instances and "vol. %" in other instances.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A stereolithographic method for preparing a three-dimensional (3D) object having one or more hollow regions, the stereolithographic method comprising:
    forming one or more layers of a first resin;
    exposing the one or more layers of the first resin to ultraviolet (UV) light to at least partially cure the first resin and form one or more first cured resin layers having one or more trenches therein;
    disposing one or more volumes of a blocking composition within the one or more trenches to form one or more blocking composition-filled trenches within the one or more first cured resin layers, wherein the blocking composition comprises particles configured to modify a viscoelasticity of the blocking composition such that the blocking composition is temporarily retained within the one or more trenches formed in the one or more first cured resin layers;
    disposing one or more volumes of a second resin onto a top surface of the one or more blocking composition-filled trenches within the one or more first cured resin layers;
    exposing the one or more volumes of the second resin to UV light to at least partially cure the second resin, thereby forming one or more capping layers over the one or more blocking composition-filled trenches in the one or more first cured resin layers, wherein the one or more capping layers at least partially encapsulate the one or more blocking composition-filled trenches in the one or more first cured resin layers; and
    removing some or all of the blocking composition encapsulated within the one or more blocking composition-filled trenches of the one or more first cured resin layers to form the 3D object having the one or more hollow regions between the one or more trenches of the one or more first cured resin layers and the one or more capping layers disposed above the one or more trenches of the one or more first cured resin layers.

2. The stereolithographic method of claim 1, wherein the blocking composition comprises one or more of: a liquid that is inert to photopolymerization, a polymerization inhibitor, or a photo-absorber.

3. The stereolithographic method of claim 2, wherein the liquid that is inert to photopolymerization comprises one or more of: a solvent or a fluorinated liquid.

4. The stereolithographic method of claim 3, wherein the solvent comprises one or more of: isopropanol, ethyl acetate, water, ethanol, methanol, acetic acid, formic acid, dimethyl sulfoxide, or n-butanol.

5. The stereolithographic method of claim 1, wherein the blocking composition comprises one or more of: a monomer, an initiator, a solvent, an absorber, a dye, an inhibitor, or ceramic particles as the particles.

6. The stereolithographic method of claim 5, wherein the blocking composition comprises one or more of: 1,6-hexanediol diacrylate (HDDA), poly(ethylene glycol) diacrylate (PEGDA), 4,4'-bis(dimethylamino)benzophenone, thioxanthen-9-one, 1-hydroxy-cyclohexyl-phenyl-ketone, 2,4-dinitro-1-naphthol, diphenyl(2,4,6-trimethylbenzoyl) phosphine oxide (TPO), 2,5-bis(5-tert-butyl-benzoxazol-2-yl)thiophene, avobenzone, 2,4-dinitro-1-naphthol, Nigrosin (CI 50415, Solvent black 5), or Sudan I.

7. The stereolithographic method of claim 1, wherein the blocking composition comprises one or more of: glycerol, ethylene glycol, polyethylene glycol, HDDA, PEGDA, a Sudan I absorber, fumed silica particles as the particles, a TPO initiator, silicone oil, polydimethylsiloxane (PDMS), a liquid solvent, or a fluorinated liquid.

8. The stereolithographic method of claim 1, further comprising:
    prior to disposing the one or more volumes of the blocking composition into the one or more trenches of the one or more cured first resin layers, contacting the one or more trenches with one or more first absorbent materials to remove any portion of the first resin that remains uncured.

9. The stereolithographic method of claim 1, further comprising:
contacting the one or more capping layers with one or more second absorbent materials to remove any portion of the blocking composition not retained within the one or more trenches.

10. The stereolithographic method of claim 1, further comprising:
disposing one or more volumes of an additional resin onto the one or more capping layers to form one or more additional capping layers that at least partially encapsulate the blocking composition-filled trenches.

11. The stereolithographic method of claim 1,
wherein the removing some or all of the blocking composition encapsulated between the one or more trenches and the one or more capping layers is performed using at least one of: a partial vacuum, evaporation, or diffusion through one of the one or more trenches or the one or more capping layers.

12. The stereolithographic method of claim 1, wherein the one or more volumes of the blocking composition are disposed within the one or more trenches by at least partially submerging one or both of the one or more first cured layers or the one or more trenches in a bath comprising the blocking composition.

13. The stereolithographic method of claim 1, wherein the one or more volumes of the blocking composition are disposed within the one or more trenches by contacting the one or more trenches with a blocking composition-infused absorbent such that the one or more volumes of the blocking composition are communicated from the blocking composition-infused absorbent into the one or more trenches.

14. The stereolithographic method of claim 13, wherein the blocking composition-infused absorbent comprises one or more of: a sponge material, rubber material, a foam material, or a brush.

15. The stereolithographic method of claim 1, wherein the one or more volumes of the blocking composition are disposed within the one or more trenches to form the one or more blocking composition-filled trenches by communicating the one or more volumes of the blocking composition into the one or more trenches using one of: a pump, a pipette, or a syringe.

16. The stereolithographic method of claim 1, wherein the one or more volumes of the second resin are disposed onto the top surfaces of the one or more blocking composition-filled trenches by at least partially submerging the one or more blocking composition-filled trenches in a bath of the second resin or by contacting the one or more blocking composition-filled trenches with a second resin-infused absorbent.

17. A stereolithographic method for preparing a multi-material three-dimensional (3D) object, the stereolithographic method comprising:
forming one or more first layers of a first resin on a support surface;
forming one or more second layers of the first resin on the one or more first layers of the first resin;
exposing the first resin to ultraviolet (UV) light to form a cured first resin structure having one or more trenches formed in the one or more second layers;
communicating one or more volumes of a blocking composition into the one or more trenches of the cured first resin structure by contacting the one or more trenches with a blocking composition-infused absorbent such that the one or more volumes of the blocking composition are communicated from the blocking composition-infused absorbent and into the one or more trenches, wherein the blocking composition comprises particles configured to increase a viscoelasticity of the blocking composition such that the blocking composition is temporarily retained within the one or more trenches, the particles being further configured to absorb, reflect, or scatter UV light;
disposing one or more volumes of a second resin at least partially over the one or more trenches or onto one or more top surfaces of the one or more volumes of the blocking composition; and
exposing the one or more volumes of the second resin to UV light to at least partially cure the one or more volumes of the second resin and form one or more capping layers that encapsulate the one or more volumes of the blocking composition within the one or more trenches, thereby forming a multi-material 3D object.

18. The stereolithographic method of claim 17, wherein one or more of the first resin or the second resin comprises a thermally curable resin or a photopolymerizable resin.

19. The stereolithographic method of claim 17, wherein the blocking composition comprises one or more of: poly (ethylene glycol) diacrylate (PEGDA), Poly(3,4-ethylenedioxythiophene) (PEDOT), polystyrene sulfonate (PSS), water, dyes, pigments, PEGDA monomers with PEDOT:PSS particles dispersed therein, PEGDA monomers with colored dyes or pigments, or water with PEGDA and PEDOT:PSS particles dispersed therein.

20. A stereolithographic method for preparing a three-dimensional (3D) object, the stereolithographic method comprising:
forming one or more first layers of a first resin on a support surface;
forming one or more second layers of the first resin on the one or more first layers of the first resin;
exposing the first resin to ultraviolet (UV) light to form a cured first resin structure having one or more trenches formed in the one or more second layers;
communicating one or more volumes of a blocking composition into the one or more trenches of the cured first resin structure by submerging the one or more trenches in a blocking composition bath comprising the blocking composition such that the one or more volumes of the blocking composition are communicated into the one or more trenches, wherein the blocking composition comprises nanoparticles configured to increase a viscoelasticity of the blocking composition such that the blocking composition is temporarily retained within the one or more trenches, the nanoparticles being further configured to absorb, reflect, or scatter UV light;
disposing one or more volumes of a second resin at least partially over the one or more trenches or onto one or more top surfaces of the one or more volumes of the blocking composition communicated into the one or more trenches of the cured first resin structure; and
exposing the one or more volumes of the second resin to UV light to at least partially cure the one or more volumes of the second resin and form one or more capping layers that at least partially encapsulate the one or more volumes of the blocking composition within the one or more trenches.

21. The stereolithographic method of claim 20, wherein the one or more capping layers fully encapsulate the one or more volumes of the blocking composition within the one or more trenches, thereby forming a multi-material 3D object.

22. The stereolithographic method of claim 20, further comprising:

removing some or all of the one or more volumes of the blocking composition encapsulated within the one or more trenches of the cured first resin structure to form a 3D object having one or more hollow regions defined between the one or more trenches of the cured first resin structure and the one or more capping layers disposed above the one or more trenches of the cured first resin structure.

* * * * *